United States Patent
Maeda et al.

(10) Patent No.: US 10,230,625 B2
(45) Date of Patent: Mar. 12, 2019

(54) INFORMATION PROCESSING APPARATUS, INFORMATION PROCESSING SYSTEM, AND COMMUNICATION DEVICE

(71) Applicant: FUJITSU LIMITED, Kawasaki-shi, Kanagawa (JP)

(72) Inventors: Masahiro Maeda, Zama (JP); Koichiro Takayama, Hachioji (JP); Tomohiro Inoue, Kawasaki (JP); Shinya Hiramoto, Yokohama (JP); Shun Ando, Yokohama (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 14/924,168

(22) Filed: Oct. 27, 2015

(65) Prior Publication Data

US 2016/0191376 A1    Jun. 30, 2016

(30) Foreign Application Priority Data

Dec. 26, 2014   (JP) .................................. 2014-264679

(51) Int. Cl.
*H04L 12/703* (2013.01)
*H04L 12/707* (2013.01)
(Continued)

(52) U.S. Cl.
CPC ............ *H04L 45/28* (2013.01); *G06F 11/004* (2013.01); *G06F 11/0745* (2013.01);
(Continued)

(58) Field of Classification Search
CPC ............... G06F 11/004; G06F 11/0745; G06F 11/0751; G06F 11/0793; G06F 13/4282; G06F 15/76; H04L 1/188; H04L 43/0823; H04L 45/22; H04L 45/28
See application file for complete search history.

(56) References Cited

U.S. PATENT DOCUMENTS

2004/0123222 A1* 6/2004 Widmer .............. H04L 25/4908
714/779
2009/0182916 A1   7/2009 Inagawa et al.
(Continued)

FOREIGN PATENT DOCUMENTS

EP    2 778 944 A2    9/2014
EP    2 833 593 A1    2/2015
(Continued)

OTHER PUBLICATIONS

Extended European Search Report dated Jul. 5, 2016 in corresponding European Patent Application No. 15193262.1.
(Continued)

*Primary Examiner* — June Y Sison
(74) *Attorney, Agent, or Firm* — Staas & Halsey LLP

(57) ABSTRACT

An information processing apparatus including: an arithmetic processing unit; and a communication device configured to receive data from another information processing apparatus through a plurality of first lanes and to output the received data to the arithmetic processing unit, wherein the communication device includes a detection unit that detects a failure of the plurality of first lanes; and a control unit that performs a first degradation process of stopping use of any one of the plurality of first lanes, based on a degradation request, performs a restoration process of resuming use of a first lane for which use has been stopped, based on a restoration request, and performs a second degradation process of stopping use of a first lane for which use has been resumed, when the detection unit detects a failure of the first lane for which use has been resumed, in the restoration process.

7 Claims, 27 Drawing Sheets

(51) Int. Cl.
  *H04L 12/26* (2006.01)
  *G06F 13/42* (2006.01)
  *G06F 11/00* (2006.01)
  *G06F 11/07* (2006.01)
  *H04L 1/18* (2006.01)
  *G06F 15/76* (2006.01)

(52) U.S. Cl.
  CPC ...... *G06F 11/0751* (2013.01); *G06F 11/0793* (2013.01); *G06F 13/4282* (2013.01); *G06F 15/76* (2013.01); *H04L 1/188* (2013.01); *H04L 43/0823* (2013.01); *H04L 45/22* (2013.01)

(56) References Cited

U.S. PATENT DOCUMENTS

| | | |
|---|---|---|
| 2010/0083030 A1 | 4/2010 | Thayer |
| 2010/0153614 A1 | 6/2010 | Ushigome et al. |
| 2012/0144230 A1* | 6/2012 | Buckland ............ G06F 13/4022 714/4.5 |
| 2015/0012774 A1* | 1/2015 | Maeda ................ G06F 11/0724 714/5.1 |
| 2015/0163014 A1* | 6/2015 | Birrittella ............. H04L 1/0045 714/807 |

FOREIGN PATENT DOCUMENTS

| | | |
|---|---|---|
| JP | 2005-182485 | 7/2005 |
| JP | 2010-147702 A1 | 7/2010 |
| JP | 2013-131843 A1 | 7/2013 |
| JP | 2013-200616 | 10/2013 |
| WO | WO 2013/145240 A1 | 10/2013 |

OTHER PUBLICATIONS

Office Action in Japanese Patent Application No. 2014-264679 dated Jul. 23, 2018.

Office Action in Japanese Patent Application No. 2014-264679 dated Jul. 31, 2018.

* cited by examiner

FIG. 6

| No. | LINK-UP STATE | TRIGGER FOR LANE DEGRADATION |
|---|---|---|
| 1 | PRIOR TO LINK-UP | DETECTION OF LANE FAILURE |
| 2 | AFTER LINK-UP | DETERIORATION IN BIT ERROR RATE (THE NUMBER OF RETRANSMISSIONS WITHIN UNIT TIME EXCEEDS THRESHOLD) |
| 3 | | DETECTION OF RETRY-OUT (THE NUMBER OF CONTINUOUS RETRANSMISSIONS EXCEEDS A THRESHOLD, AND TIMEOUT OF RECEPTION OF ACK/NACK) |
| 4 | | DETECTION OF FLOW CONTROL PROTOCOL ERROR (PERIOD OF NOT RECEIVING FLOW CONTROL FRAME EXCEEDS THRESHOLD) |
| 5 | | THE NUMBER OF BIP ERRORS WITHIN PREDETERMINED PERIOD EXCEEDS THRESHOLD |
| 6 | PRIOR TO LINK-UP OR AFTER LINK-UP | SWITCHING FROM NORMAL OPERATION MODE TO LOW POWER MODE |

| No. | LINK-UP STATE | TRIGGER FOR RELEASING LANE DEGRADATION |
|---|---|---|
| 1 | PRIOR TO LINK-UP OR AFTER LINK-UP | SWITCHING FROM LOW POWER MODE TO NORMAL OPERATION MODE |

FIG. 8

| PRESENT STATE | PROCESSED DETAILS | TRANSITION CONDITIONS | TRANSITION STATE | OPERATION |
|---|---|---|---|---|
| NORM | TRANSMISSION AND RECEPTION OF DATA | EXECUTION OF LANE DEGRADATION PROCESS IS NOT DETERMINED | NORM | — |
| | | EXECUTION OF LANE DEGRADATION PROCESS IS DETERMINED | D_SUSP | FIGS. 19-21 |
| D_SUSP | PREPROCESS OF LANE DEGRADATION PROCESS | OPERATE AS RESPONDER RES (DEGRADATION LANE SPECIFICATION REQUEST TRANSMISSION) | D_RES0 | FIG. 19 |
| | | OPERATE AS RESPONDER RES (DEGRADATION REQUEST RECEPTION) | D_RES1 | FIGS. 20, 21 |
| | | OPERATE AS REQUESTER REQ | D_REQ0 | FIGS. 19-21 |
| D_RES0 | DGRD-PUSH TRANSMISSION | DGRD_REQ RECEPTION | D_RES1 | FIG. 19 |
| D_RES1 | LANE DEGRADATION PROCESS | AM DETECTION WITHIN T2 | D_RES2 | FIGS. 19-21 |
| | | AM NON-DETECTION WITHIN T2 | TIMEOUT | — |
| D_RES2 | DGRD-ACK TRANSMISSION | DGRD_COMP RECEPTION WITHIN T2 | DGRD | FIGS. 19-21 |
| | | DGRD_COMP NON-RECEPTION WITHIN T2 | TIMEOUT | — |
| D_REQ0 | DGRD-REQ TRANSMISSION | T1 HAS PASSED | D_REQ1 | FIGS. 19-21 |
| D_REQ1 | LANE DEGRADATION PROCESS | DGRD_ACK RECEPTION WITHIN T2 | D_REQ2 | FIGS. 19-21 |
| | | DGRD_ACK NON-RECEPTION WITHIN T2 | TIMEOUT | — |
| D_REQ2 | DGRD-COMP TRANSMISSION | T3 HAS PASSED | DGRD | FIGS. 19-21 |
| DGRD | TRANSMISSION AND RECEPTION OF DATA | EXECUTION OF LANE RETURN PROCESS IS NOT DETERMINED | DGRD | — |
| | | EXECUTION OF LANE RETURN PROCESS IS DETERMINED | R_SUSP | FIGS. 22-26 |
| R_SUSP | PREPROCESS OF LANE RETURN PROCESS | OPERATE AS RESPONDER RES | R_RES1 | FIGS. 22-26 |
| | | OPERATE AS REQUESTER REQ | R_REQ0 | FIGS. 22-26 |
| R_REQ0 | DGRD-REQ TRANSMISSION | T1 HAS PASSED | R_REQ1 | FIGS. 22-26 |
| R_REQ1 | LANE RETURN PROCESS | AM DETECTION, DGRD_ACK RECEPTION WITHIN T2 | R_REQ2 | FIG. 22 |
| | | AM NON-DETECTION WITHIN T2 (TOUT) | D_REQ0 | FIG. 25 |
| | | AM DETECTION, DGRD_ACK NON-RECEPTION WITHIN T2 (TOUT) | D_RES0 | FIG. 23 |
| | | AM DETECTION, DGRD_REQ RECEPTION WITHIN T2 | D_RES1 | FIG. 24 |
| R_REQ2 | DGRD-COMP TRANSMISSION | T3 HAS PASSED | NORM | FIG. 22 |
| R_RES1 | LANE RETURN PROCESS | AM DETECTION WITHIN T2 | D_RES2 | FIG. 22 |
| | | AM NON-DETECTION WITHIN T2 (TOUT) | D_REQ0 | FIG. 23 |
| | | AM DETECTION, DGRD_REQ RECEPTION WITHIN T2 | D_RES1 | FIG. 26 |
| R_RES2 | DGRD-ACK TRANSMISSION | AM DETECTION, DGRD_COMP RECEPTION WITHIN T2 | NORM | FIG. 22 |
| | | AM DETECTION, DGRD_COMP NON-RECEPTION WITHIN T2 (TOUT) | D_RES0 | FIG. 25 |
| | | AM DETECTION, DGRD_REQ RECEPTION WITHIN T2 | D_RES1 | FIG. 26 |

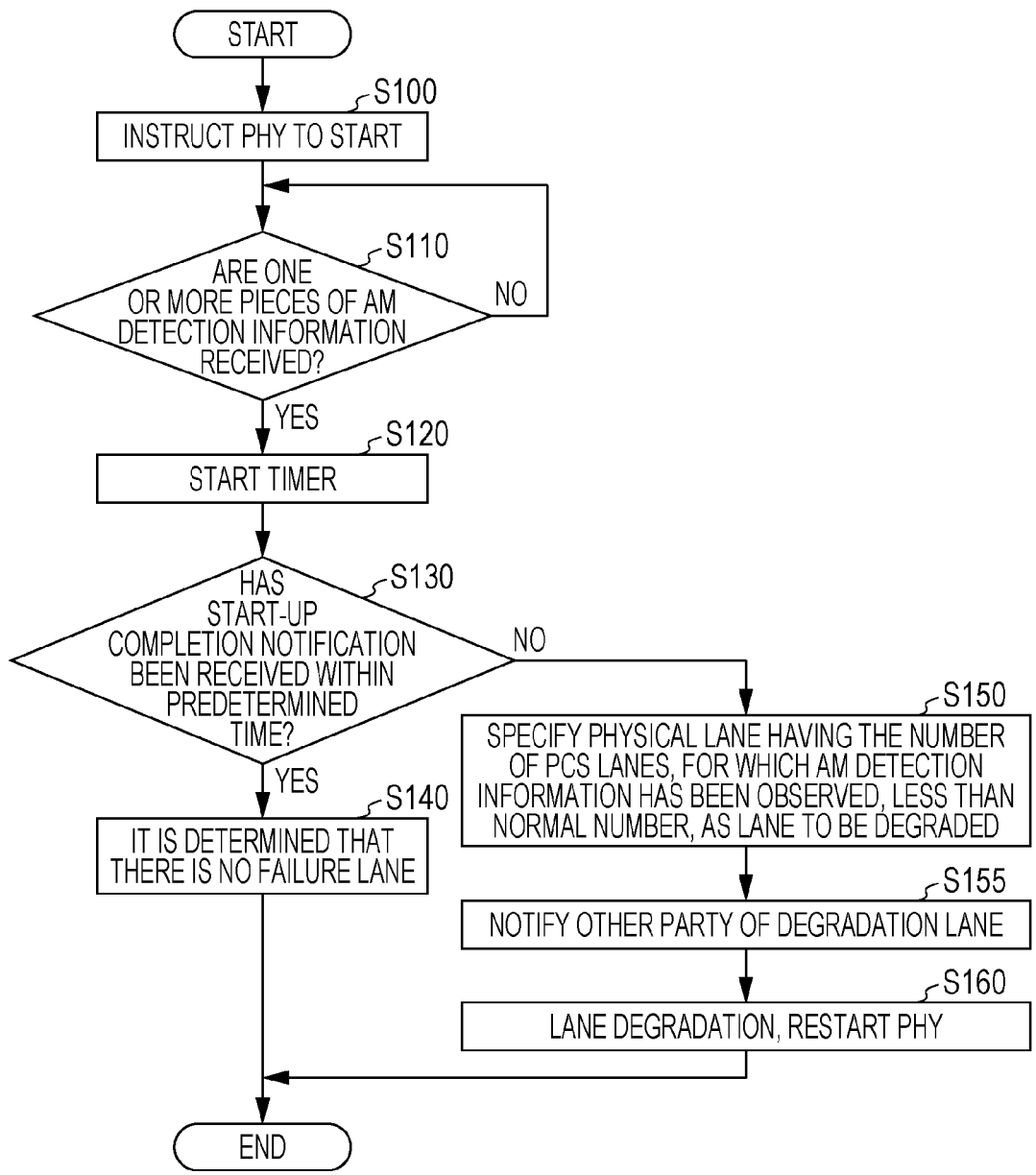

FIG. 10

| PCS LANE | DETECTION/ NON-DETECTION OF ALIGNMENT MARKER | PHYSICAL LANE | THE NUMBER OF PCS LANES FOR WHICH ALIGNMENT MARKER IS DETECTED | SPECIFICATION RESULT |
|---|---|---|---|---|
| PLr0 | DETECTION | PHLr0 | 5 | NORMAL |
| PLr1 | DETECTION | | | |
| PLr2 | DETECTION | | | |
| PLr3 | DETECTION | | | |
| PLr4 | DETECTION | | | |
| PLr5 ⋮ PLr9 | DETECTION ⋮ DETECTION | PHLr1 | 5 | NORMAL |
| PLr10 ⋮ PLr14 | DETECTION ⋮ DETECTION | PHLr2 | 5 | NORMAL |
| PLr15 | DETECTION | PHLr3 | 4 | DEGRADATION TARGET |
| PLr16 | NON-DETECTION | | | |
| PLr17 | DETECTION | | | |
| PLr18 | DETECTION | | | |
| PLr19 | DETECTION | | | |

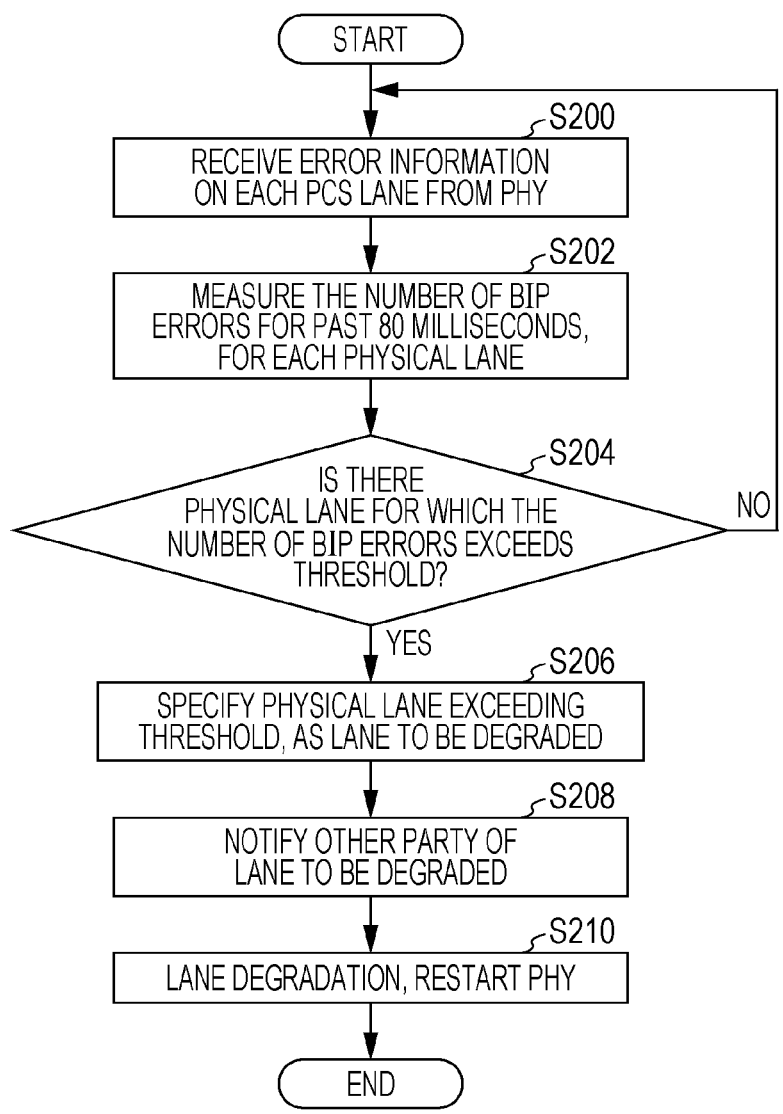

FIG. 15

| PCS LANE | BIP ERROR | PHYSICAL LANE | THE NUMBER OF BIP ERRORS WITHIN PREDETERMINED PERIOD (THRESHOLD: 3) | MEASUREMENT RESULT (FIG. 10) | MEASUREMENT RESULT (FIGS. 11 TO 13) |
|---|---|---|---|---|---|
| PLr0 | PRESENCE | PHLr0 | 5 | DEGRADATION TARGET | DEGRADATION TARGET |
| PLr1 | NONE | | | | |
| PLr2 | NONE | | | | |
| PLr3 | NONE | | | | |
| PLr4 | NONE | | | | |
| PLr5 | NONE | PHLr1 | 1 | NORMAL | NORMAL |
| ⋮ | ⋮ | | | | |
| PLr9 | NONE | | | | |
| PLr10 | NONE | PHLr2 | 2 | NORMAL | NORMAL |
| ⋮ | ⋮ | | | | |
| PLr14 | NONE | | | | |
| PLr15 | PRESENCE | PHLr3 | 4 | DEGRADATION TARGET | NORMAL |
| PLr16 | NONE | | | | |
| PLr17 | NONE | | | | |
| PLr18 | NONE | | | | |
| PLr19 | NONE | | | | |

INFORMATION PROCESSING APPARATUS, INFORMATION PROCESSING SYSTEM, AND COMMUNICATION DEVICE

CROSS-REFERENCE TO RELATED APPLICATION

This application is based upon and claims the benefit of priority of the prior Japanese Patent Application No. 2014-264679, filed on Dec. 26, 2014, the entire contents of which are incorporated herein by reference.

FIELD

The embodiments discussed herein are related to an information processing apparatus, an information processing system, and a communication device.

BACKGROUND

An information processing system such as a parallel computer system includes a plurality of information processing apparatuses which are connected through a plurality of lanes which are data transmission paths. Further, the information processing apparatus is provided with an expansion slot intended to be connected to peripheral devices such as an input and output device, and an arithmetic processing unit in the information processing apparatus transmits data through a plurality of lanes which are connected to the expansion slot. Further, a method has been proposed in which in this type of information processing apparatus, the lane connected to the expansion slot can be replaced, and degradation of a lane is restored by replacing the degraded lane with a non-used lane, when degradation occurs in a lane in use due to a failure (for example, see Japanese Laid-open Patent Publication No. 2013-200616). Further, a method has been proposed in which in communication devices which are connected with each other through a plurality of physical lanes, a certain logic lane number can be assigned to each physical lane, and thus the communication devices can be connected while avoiding a failed physical lane (for example, see Japanese Laid-open Patent Publication No. 2005-182485).

However, in a case of degrading a normal lane in which a failure does not occur and thereafter, of restoring the degraded lane, if a failure due to a certain cause occurs in the lane being restored, a communication error occurs by restoring the failed lane, and a link between communication devices is disconnected. Therefore, in a case of restoring the degraded lane, when a failure occurs in a lane for which use has been stopped by the degradation, even if the restoration of the lane is instructed, it is preferable to maintain the degradation state without restoring the lane.

In an aspect, an object is to provide an information processing apparatus, an information processing system, and a communication device in which in a case of restoring a degraded lane, when a failure occurs in a lane for which use has been stopped by the degradation, even if the restoration of the lane is instructed, the degradation state of the lane is maintained and thus disconnection in communication between information processing apparatuses is suppressed.

SUMMARY

According to an aspect of the invention, an information processing apparatus includes: an arithmetic processing unit; a storage device configured to store data processed by the arithmetic processing unit; and a communication device configured to receive data from another information processing apparatus through a plurality of first lanes and to output the received data to the arithmetic processing unit, wherein the communication device includes a detection unit that detects a failure of the plurality of first lanes; and a control unit that performs a first degradation process of stopping use of any one of the plurality of first lanes, based on a degradation request, performs a restoration process of resuming use of a first lane for which use has been stopped, based on a restoration request, and performs a second degradation process of stopping use of a first lane for which use has been resumed, when the detection unit detects a failure of the first lane for which use has been resumed, in the restoration process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a trigger for lane degradation and a trigger for releasing the lane degradation.

FIG. 8 is a diagram illustrating an example of state transition by the state machine illustrated in FIG. 7.

FIG. 9 is a diagram illustrating an example of an operation before link-up of the information processing apparatus illustrated in FIG. 2.

FIG. 10 is a diagram illustrating an example of a specification method of a physical lane to be degraded, in the operation before link-up illustrated in FIG. 9.

FIG. 11 is a diagram illustrating an example of an operation after link-up of the information processing apparatus illustrated in FIG. 2.

FIG. 15 is a diagram illustrating an example of a specification method of a physical lane to be degraded, in the operation after link-up illustrated in FIGS. 11 to 14.

DESCRIPTION OF EMBODIMENTS

Below, embodiments will be described with reference to the drawings.

Figure 1:
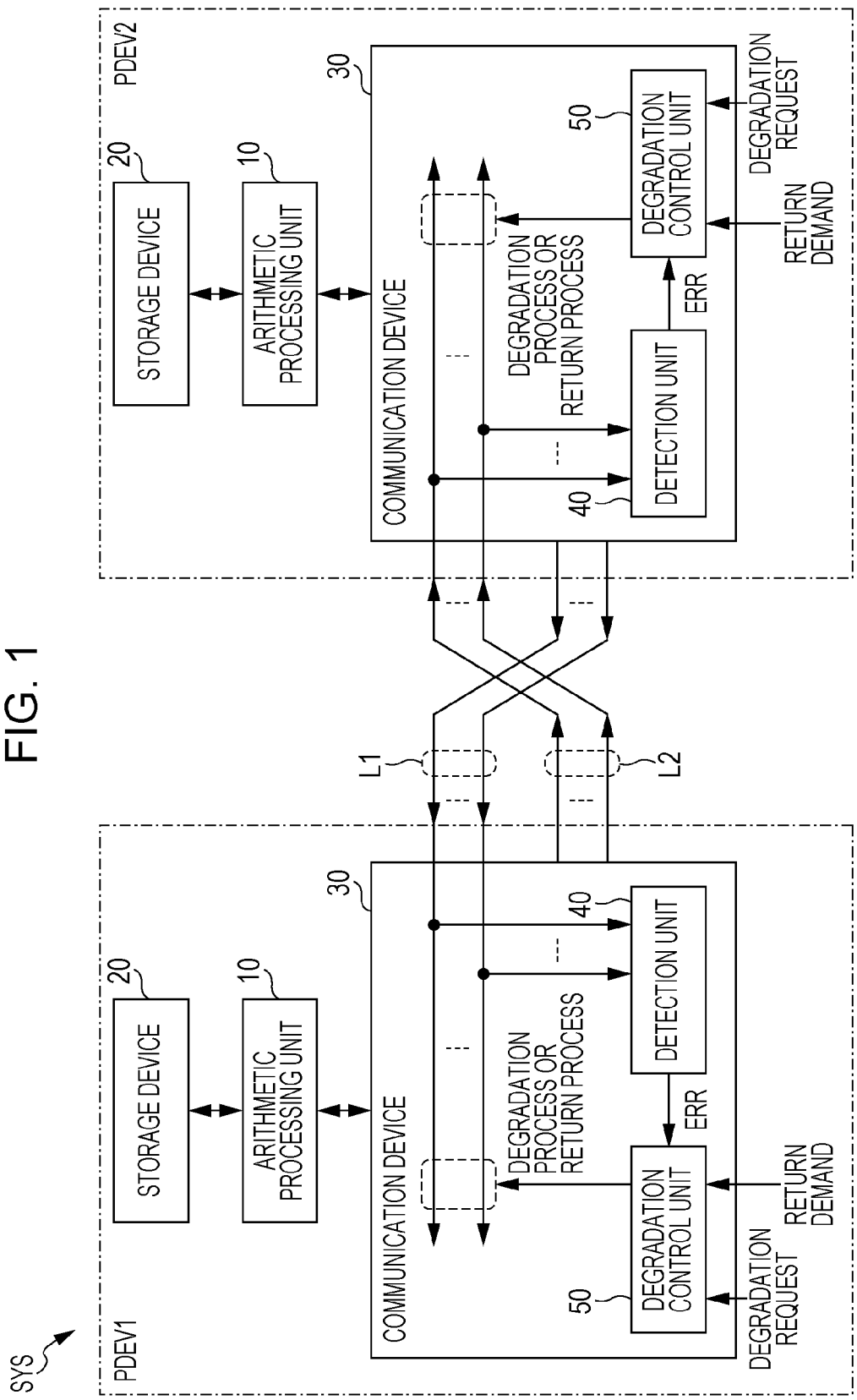
FIG. 1 is a diagram illustrating an embodiment of an information processing apparatus, an information processing system, and a communication device.

FIG. 1 illustrates an embodiment of an information processing apparatus, an information processing system, and a communication device. An information processing system SYS illustrated in FIG. 1 includes a plurality of information processing apparatuses PDEVs (PDEV1, PDEV2) which are connected with each other through a plurality of lanes L1 and a plurality of lanes L2. The information processing apparatuses PDEV1, PDEV2 transmit and receive data with each other through the lanes L1, L2. The number of information processing apparatuses PDEV included in the information processing system SYS is not limited to two. The information processing apparatuses PDEV1, PDEV2 have the same or similar configuration to each other. Therefore, hereinafter, the configuration and the function of the information processing apparatus PDEV1 will be described.

The information processing apparatus PDEV1 includes an arithmetic processing unit 10, a storage device 20, and a communication device 30. The storage device 20 stores data that is processed by the arithmetic processing unit 10. The communication device 30 includes a detection unit 40, and a degradation control unit 50, receives data from another information processing apparatus PDEV2 through the plurality of lanes L1, and outputs the received data to the arithmetic processing unit 10. The communication device 30 has a function of transmitting the data that has been output from the arithmetic processing unit 10, to the information processing apparatus PDEV2 through the lanes L2.

The detection unit 40 detects a failure of the lane L1, and outputs error information ERR indicating the occurrence of a failure to the degradation control unit 50. The degradation control unit 50 performs a degradation process of stopping the use of any of the lanes L1, based on the degradation request, and performs a restoration process of resuming the use of the lane L1 for which use has been stopped based on a restoration request. Here, the lane L1 for which use has been stopped based on a degradation request is a normal lane in which failure has not occurred. The restoration process is completed based on the confirmation of the normal transmission of data using the lane L1 for which use is resumed.

In addition, the information processing apparatus PDEV1 may transmit the degradation request information for stopping the use of any of the lanes L1, to the information processing apparatus PDEV2 through the lanes L2, based on the degradation request. When degradation request information is received from the information processing apparatus PDEV1, the information processing apparatus PDEV2 performs the degradation process of stopping the use of any lane of the lanes L1, that has been indicated by the received degradation request information. In addition, the information processing apparatus PDEV1 may transmit restoration request information for resuming the use of the lanes L1 for which the use has been stopped, to the information processing apparatus PDEV2 through the lane L2, based on the restoration request. When the restoration request information is received from the information processing apparatus PDEV1, the information processing apparatus PDEV2 performs the restoration process for resuming the use of the lanes L1 for which the use has been stopped.

Further, when error information ERR indicating the occurrence of a failure of the lane L1 for which the use has been resumed is received from the detection unit 40 during the restoration process, the degradation control unit 50 performs the degradation process of stopping the use of the lane L1 for which the use has been resumed. In this case, the degradation control unit 50 may transmit the degradation request information for stopping the use of the lane L1 for which the use has been resumed to the information processing apparatus PDEV2 through the lanes L2. When the degradation request information is received from the information processing apparatus PDEV1, the information processing apparatus PDEV2 stops the use of the lane L1 for which the use has been resumed. It is noted that the failure of the lane L1 is generated due to disconnection of the lane L1 or a failure of a circuit that transmits data to the lane L1. The degradation control unit 50 is an example of a control unit that performs the degradation process, based on the degradation request, performs the restoration process, based on the restoration request, performs the degradation process of stopping the use of the lane L1 for which the use has been resumed, based on the detection by the detection unit during the restoration process.

For example, the degradation request is generated when the operation mode of the information processing apparatus PDEV1 or the information processing system SYS transitions from the normal operation mode to the low power mode. The restoration request is generated when the operation mode of the information processing apparatus PDEV1 or the information processing system SYS transitions from the low power mode to the normal operation mode. The degradation request and the restoration request may be supplied from the arithmetic processing unit 10, based on the change of the operation mode, or may be supplied from the outside (information processing apparatus PDEV2 and the like) of the information processing apparatus PDEV1.

In addition, the degradation control unit 50 may perform the degradation process of stopping the use of any of the lanes L1, and of stopping the use of any of the lanes L2, based on the degradation request. In this case, it is preferable that the numbers of lanes L1, L2 for which use is to be stopped are equal to each other. Further, when the degradation process of the lanes L1, L2 is executed based on the degradation request, the degradation control unit 50 performs a restoration process of resuming the user of the lanes L1, L2 for which use has been stopped, based on the restoration request.

In the information processing system SYS illustrated in FIG. 1, when a failure is detected in the lane L1 for which the resumption of use is indicated during the restoration process of the lane L1, the information processing apparatus PDEV1 returns the lane L1 to the original degradation state in which the use of any one of the lanes L1 has been stopped. In this case, communication from the information processing apparatus PDEV2 to the information processing apparatus PDEV1 is successfully performed without being interrupted, and the information processing system SYS operates successfully. On the contrary, when the use of faulty lane L1 is resumed by the restoration process of the lane, the communication from the information processing apparatus PDEV2 to the information processing apparatus PDEV1 is not successfully performed, and the information processing system SYS does not operate successfully.

As described above, in the embodiment illustrated in FIG. 1, when a failure occurs in the lane L1 for which use is stopped by the degradation, even when the restoration is indicated for the lane L1, the degradation state of the lane L1 is maintained, and thus it is possible to suppress that the communication between the information processing apparatuses PDEV1 and PDEV2 is interrupted. As a result, it is possible to suppress that the reliability of the information processing system SYS is decreased.

Figure 2:
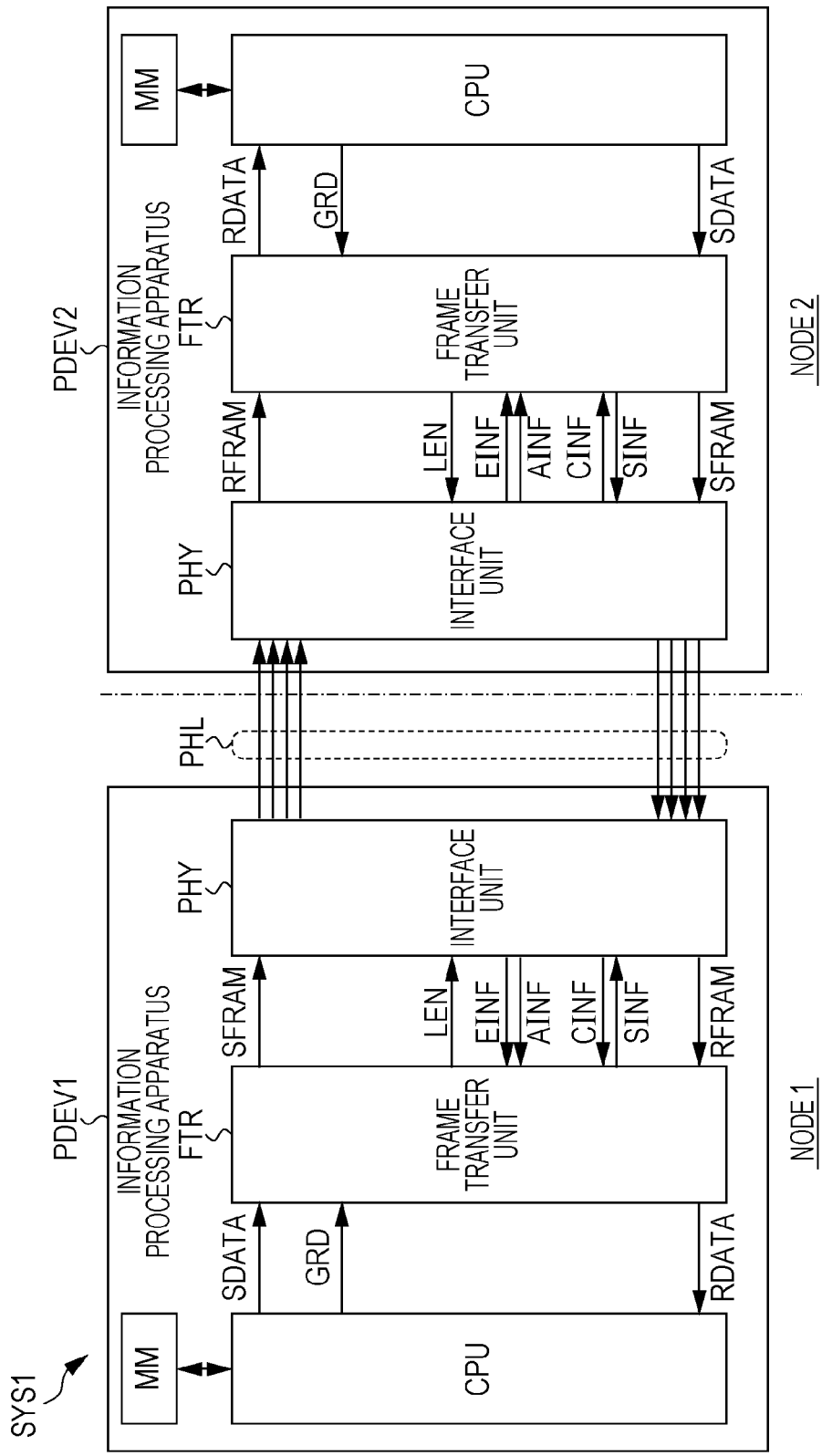
FIG. 2 is a diagram illustrating another embodiment of the information processing apparatus, the information processing system, and the communication device.

FIG. 2 is a diagram illustrating another embodiment of the information processing apparatus, the information processing system, and the communication device. An information processing system SYS1 illustrated in FIG. 2 includes a plurality of information processing apparatuses PDEV (PDEV1 and PDEV2) which are connected with each other through a link including a plurality of channels PHL (hereinafter, also referred to as physical lanes PHL). The information processing apparatuses PDEV1 and PDEV2 have a function of transferring data to each other using the plurality of physical lanes PHL. An optical transmission scheme or an electrical transmission scheme is applied to the link that connects the information processing apparatuses PDEV1 and PDEV2 with each other.

Since the information processing apparatuses PDEV1 and PDEV2 respectively correspond to nodes in the information processing system SYS1, hereinafter, the information processing apparatuses PDEV1 and PDEV2 are also referred to as nodes. The respective information processing apparatuses PDEV1 and PDEV2 includes an interface unit PHY, a frame transfer unit FTR, a central processing unit (CPU), and a main memory MM, of which each realizes the function of a physical layer. The interface unit PHY and the frame transfer unit FTR are examples of the communication device that receives data from another information processing apparatus PDEV through a plurality of physical lanes PHL, and outputs the received data to the CPU.

In addition, the information processing system SYS1 may include three or more information processing apparatuses PDEV, and in this case, each information processing apparatus PDEV is connected to predetermined number of other information processing apparatuses PDEV, through the physical lane PHL. Further, the information processing apparatus PDEV may include a plurality of sets of which each includes the interface unit PHY and frame transfer unit FTR, for one CPU.

The CPU operates based on the program stored in the main memory MM, and performs arithmetic processes. The CPU is an example of an arithmetic processing unit that performs arithmetic processes. The CPU transmits the data SDATA to the frame transfer unit FTR, and receives the data RDATA from the frame transfer unit FTR. The data RDATA may include data to be used in the calculation performed by the CPU, and the data SDATA may include the results of operations performed by the CPU.

In addition, the information processing system SYS1 has a low power mode for reducing power consumption by stopping the use of a predetermined number of physical lanes PHL among a plurality of ones. When the operation mode of the information processing system SYS1 transitions from a normal operation mode to a low power mode, and the operation mode of the information processing system SYS1 transitions from the low power mode to the normal operation mode, the CPU outputs a switching notification GRD to the frame transfer unit FTR.

The main memory MM is a storage device such as a memory module, and stores programs executed by the CPU, data processed by the CPU, and the like. The main memory MM is an example of the storage device that stores data and programs processed by the CPU, and is accessed by the CPU.

The frame transfer unit FTR is a circuit block corresponding to a higher layer (for example, a data link layer) than the physical layer corresponding to the interface unit PHY. The frame transfer unit FTR receives the data SDATA from the CPU, generates a frame data SFRAM containing the received data SDATA, and transfers the generated frame data SFRAM to the interface unit PHY. In addition, the frame transfer unit FTR receives the frame data RFRAM from the interface unit PHY, and transfers data RDATA that is included in the received frame data RFRAM to the CPU. Each of the frame data SFRAM and RFRAM includes a predetermined number of packets which is a transmission unit of data. The number of packets that each piece of frame data SFRAM and RFRAM has varies depending on the size of data contained in the packet.

Further, the frame transfer unit FTR performs control to stop the use of a predetermined number of physical lanes PHL among a plurality of ones, or control to restart the use of the stopped physical lanes PHL, based on the switching notification GRD from the CPU. In the following description, stopping the use of the physical lane PHL is also referred to as degradation or lane degradation, and restarting the use of the stopped physical lane PHL is referred to as restoration of a lane or release of lane degradation. When it is difficult to release the degraded lane due to factors such as a failure of the degraded lane in the restoration process of the lane, the frame transfer unit FTR maintains the degradation state.

Figure 3:
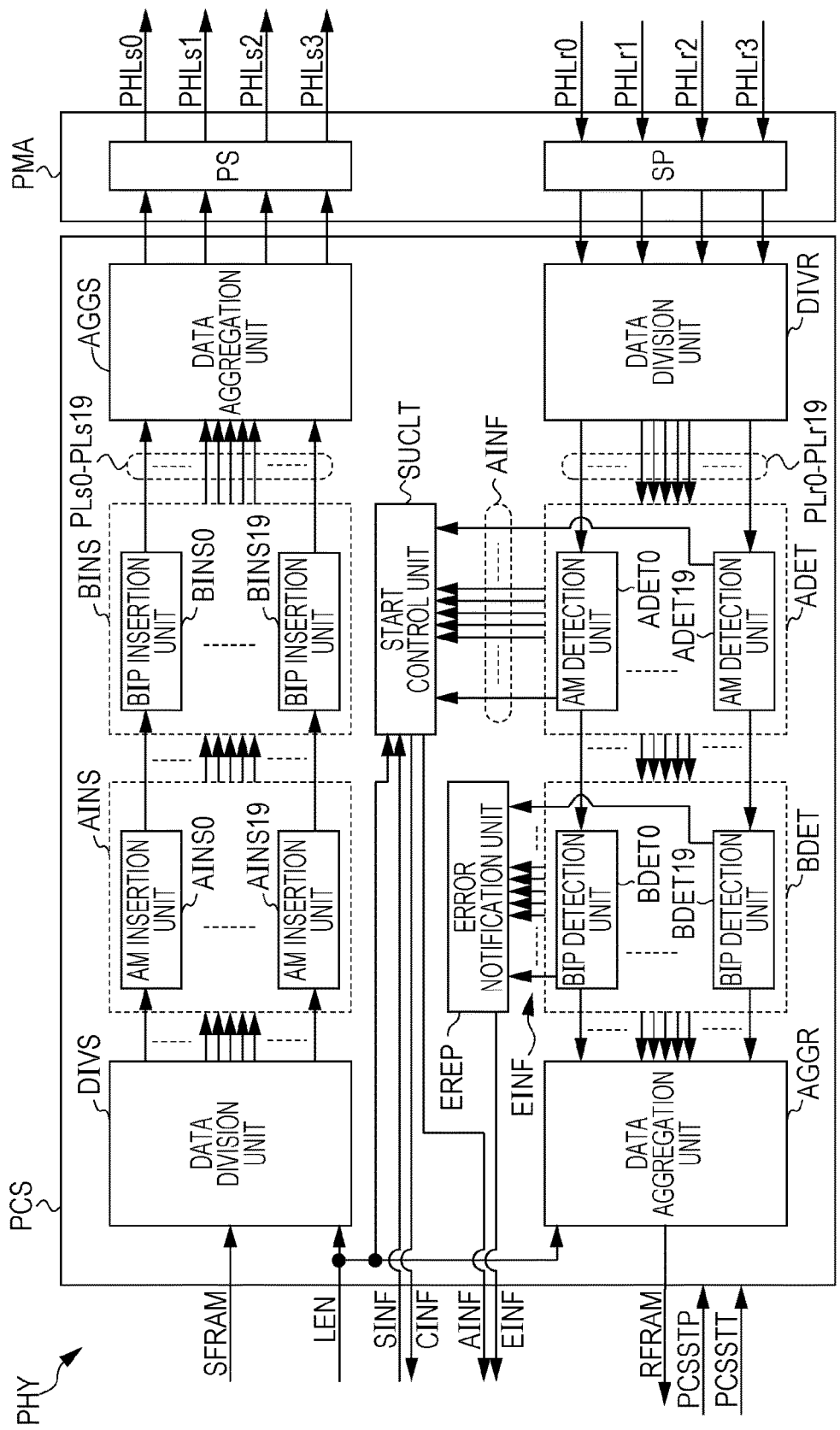
FIG. 3 is a diagram illustrating an example of an interface unit illustrated in FIG. 2.
Figure 4:
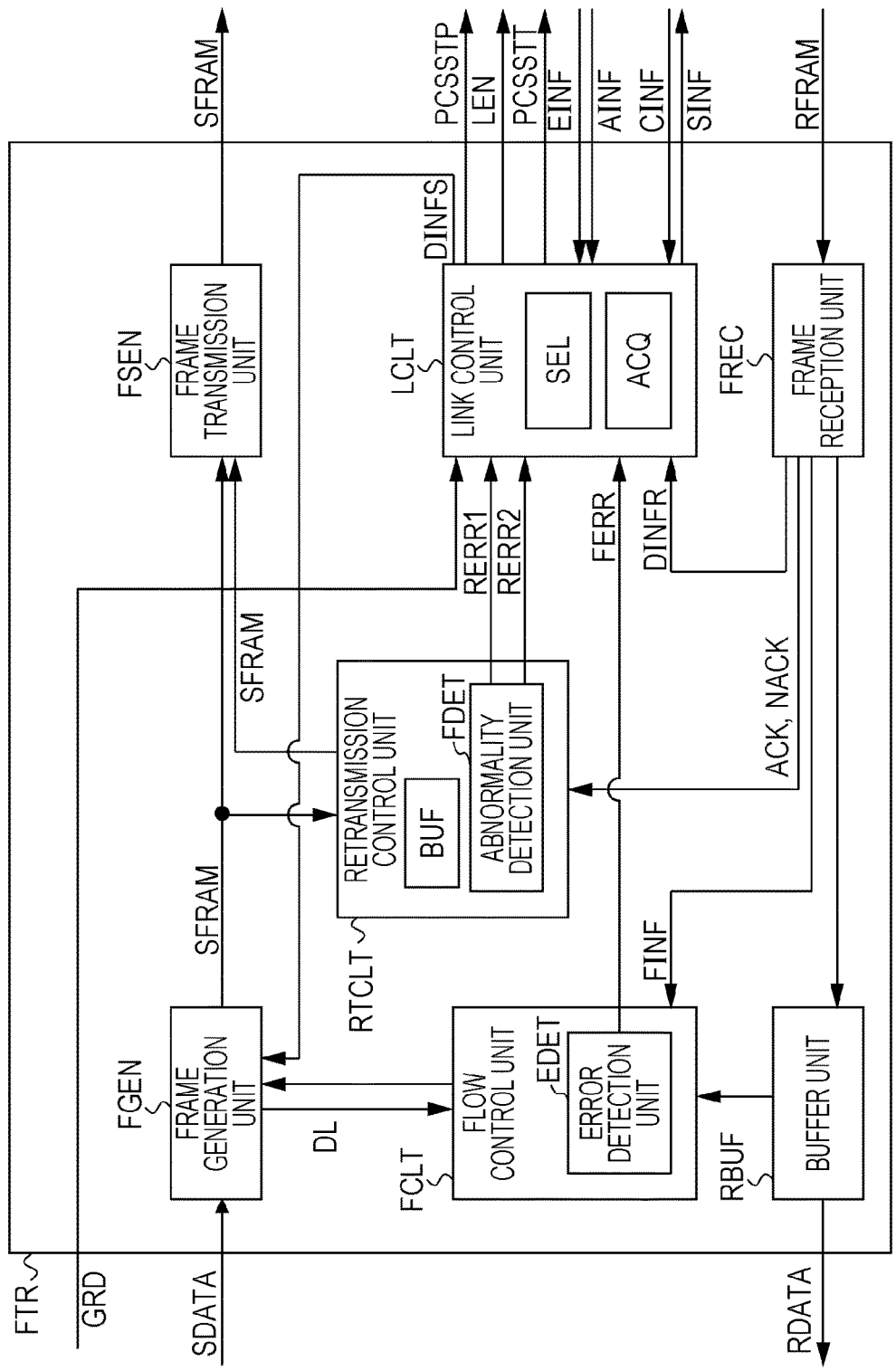
FIG. 4 is a diagram illustrating an example of a frame transfer unit illustrated in FIG. 2.

The frame transfer unit FTR outputs an instruction notification SINF instructing the interface unit PHY to start or stop a transmission and reception function of data and an enable signal LEN indicating a valid physical lane PHL, to the interface unit PHY. The frame transfer unit FTR receives a start completion notification CINF indicating that the start of the interface unit PHY has been completed and error information EINF indicating that the interface unit PHY has detected an error in the received data, from the interface unit PHY. In addition, the frame transfer unit FTR receives alignment marker detection information AINF indicating that the interface unit PHY has detected an alignment marker, from the interface unit PHY. The alignment marker is inserted at an interval of a predetermined number of data blocks in order to absorb skew in data transferred over the physical lane PHL and transmit error detection information for detecting a bit error in data. The specifications of the start completion notification CINF, the error information EINF, and the alignment marker detection information AINF will be described with reference to FIG. 3. An example of the frame transfer unit FTR is illustrated in FIG. 4.

The interface unit PHY is an example of a physical layer device corresponding to the physical layer of an open systems interconnection (OSI) reference model, and has a function conforming to Layer 1 (physical layer) of IEEE802.3ba standard. The interface unit PHY distributes the frame data SFRAM that has been received from the frame transfer unit FTR to a plurality of pieces of data, and respectively transmits them to a plurality of physical lanes PHL. In addition, the interface unit PHY collects a plurality of pieces of data received through a plurality of physical lanes PHL to the frame data RFRAM, and outputs the frame data RFRAM which are collected to the frame transfer unit FTR.

The interface unit PHY starts or stops the transmission and reception function of data, based on the instruction notification SINF from the frame transfer unit FTR. If the instruction notification SINF indicates a start instruction, the interface unit PHY performs a start process such as link-up which makes a state allowing communication with the interface unit PHY of the information processing apparatus PDEV of the other party. If the start has been completed, the interface unit PHY outputs a start completion notice CINF to the frame transfer unit FTR. If the instruction notification SINF indicates a stop instruction, the interface unit PHY performs a stop process for stopping the transmission and reception function such as disconnecting of the link.

The interface unit PHY enables or disables a predetermined number of physical lanes PHL among a plurality of ones, based on the enable signal LEN from the frame transfer unit FTR. The enabled physical lane PHL is used for transfer of information, and the disabled physical lane PHL is not used for transfer of information. When detecting an error in the data received through the physical lane PHL, the interface unit PHY outputs error information EINF to the frame transfer unit FTR. Further, when detecting an alignment marker in the data that has been received through the physical lane PHL, the interface unit PHY outputs the alignment marker detection information AINF to the frame transfer unit FTR. Hereinafter, the alignment marker detection information is also referred to as AM detection information. An example of the interface unit PHY is illustrated in FIG. 3. In addition, in the following, for ease of description, it is assumed that the error in the data received through the physical lane PHL does not occur simultaneously in both the information processing apparatuses PDEV1 and PDEV2.

If the CPU of the node 1 outputs a switching notification GRD indicating transition from the normal operation mode to the low power mode, the frame transfer unit FTR of the node 1 outputs the enable signal LEN to the interface unit PHY. The interface unit PHY causes a predetermined number of physical lanes PHL to be degraded on the transmission side and a predetermined number of physical lanes PHL to be degraded on the reception side, based on the enable signal LEN. In addition, the frame transfer unit FTR transmits a control packet indicating the degradation of the physical lane PHL of the node 2, to the node 2 through the interface unit PHY. The frame transfer unit FTR of the node 2 outputs the enable signal LEN to the interface unit PHY, based on the control packet received from the node 1. Then, the interface unit PHY of the node 2 causes a predetermined number of physical lanes PHL to be degraded on the transmission side and a predetermined number of physical lanes PHL to be degraded on the reception side, based on the enable signal LEN.

Meanwhile, if the CPU of the node 1 outputs a switching notification GRD indicating the transition from the low power mode to the normal operation mode, the frame transfer unit FTR of the node 1 outputs the enable signal LEN to the interface unit PHY. The interface unit PHY restores the predetermined number of physical lanes PHL that have been degraded on the transmission side and the predetermined number of physical lanes PHL that have been degraded on the reception side, based on the enable signal LEN. In addition, the frame transfer unit FTR transmits the control packet instructing the release of the degradation of the physical lane PHL of the node 2, to the node 2 through the interface unit PHY. The frame transfer unit FTR of the node 2 outputs the enable signal LEN to the interface unit PHY, based on the control packet received from the node 1. Then, the interface unit PHY of the node 2 restores the predetermined number of physical lanes PHL that have been degraded on the transmission side and the predetermined number of physical lanes PHL that have been degraded on the reception side, based on the enable signal LEN.

It is noted that, during the restoration process of physical lane PHL, when the data transmission using the restored physical lane PHL is not successfully performed, the frame transfer unit FTR interrupts the restoration process, and performs the degradation process of returning the physical lane PHL to the original degradation state. An example of interrupting the restoration process is illustrated in FIGS. 23 to 26.

Even when the CPU of the node 2 outputs the switching notification GRD, the same operation as the operation of the node 1 described above is performed by the node 2. Further, the switching notification GRD may be output from the CPU of either the node 1 or the node 2. Furthermore, the degradation and the release of degradation of the physical lane PHL may be performed only in the physical lane PHL of one direction (a transmission path through which data is transmitted from the node 1 to the node 2, or a transmission path through which data is transmitted from the node 2 to the node 1). In this case, the switching notification GRD includes information indicating whether to cause the physical lane PHL to be degraded or be released from the degradation in either the transmission direction or the reception direction.

FIG. 3 illustrates an example of the interface unit PHY illustrated in FIG. 2. The interface unit PHY includes a physical coding sublayer (PCS) and a physical medium attachment (PMA). The PCS distributes the data received from the frame transfer unit FTR to a plurality of PCS lanes PLs (PLs0 to PLs19), aggregates the data that has been distributed to the PCS lanes PLs corresponding to each physical lane PHL, and outputs the aggregated data. In addition, the PCS distributes the data received through the physical lane PHL to the plurality of PCS lanes PLr (PLr0 to PLr19), aggregates the data that has been distributed to the PCS lanes PLr, and outputs the aggregated data to the frame transfer unit FTR.

In FIG. 3, in order to facilitate understanding of the description, PCS lanes PLs0 to PLs4 are aggregated into a physical lane PHLs0, and PCS lanes PLr0 to PLr4 are aggregated into a physical lane PHLr0. PCS lanes PLs5 to PLs9 are aggregated into a physical lane PHLs1, and PCS lanes PLr5 to PLr9 are aggregated into a physical lane PHLr1. PCS lanes PLs10 to PLs14 are aggregated into a physical lane PHLs2, and PCS lanes PLr10 to PLr14 are aggregated into a physical lane PHLr2. PCS lanes PLs15 to PLs19 are aggregated into a physical lane PHLs3, and PCS lanes PLr15 to PLr19 are aggregated into a physical lane PHLr3. In addition, the correspondence between the PCS lane PLs and the physical lane PHLs and the correspondence between the PCS lane PLr and the physical lane PHLr may be added to information to be transmitted such as an alignment marker.

The PCS includes data division units DIVS and DIVR, AM insertion units AINS, a BIP insertion unit BINS, data aggregation units AGGS and AGGR, an AM detection unit ADET, a BIP detection unit BDET, an error notification unit EREP, and a start control unit SUCLT.

The PMA includes a parallel-to-serial converter PS and a serial-to-parallel converter SP. AM insertion units AINS (AINS0 to AINS19) and BIP insertion units BINS (BINS0 to BINS19) are respectively provided for PCS lanes PLs0 to PLs19. AM detection units ADET (ADET0 to ADET19) and BIP detection units BDET (BDET0 to BDET19) are respectively provided for PCS lanes PLr0 to PLr19.

The data division unit DIVS selects a PCS lane PLs corresponding to a valid physical lane PHLs indicated by the enable signal LEN that is received from the frame transfer unit FTR. The PCS lane PLs selected by the enable signal LEN is a valid lane through which data is transferred, and the PCS lane PLs that is not selected by the enable signal LEN is an invalid lane through which data is not transferred.

For example, the data division unit DIVS codes the frame data SFRAM that has been received from the frame transfer unit FTR, in groups of 64 bits, to data of 66 bits (64B/66B coding). Then, the data division unit DIVS outputs the coded 66-bit blocks to the AM insertion unit AINS corresponding to the PCS lane PLs, by allocating the coded 66-bit blocks to a valid PCS lane PLs in units of blocks.

Each AM insertion unit AINS inserts the alignment marker at an interval of a predetermined number of blocks that have been received from the data division unit DIVS, and outputs the block and the alignment marker to the corresponding BIP insertion units BINS (BINS0 to BINS19). For example, each AM insertion unit AINS inserts the alignment marker at an interval of 16383 blocks. In other words, each AM insertion unit AINS inserts the alignment markers at a predetermined period. In addition, the operation of the AM insertion unit AINS corresponding to the PCS lane PLs that is not selected by the enable signal LEN which is received by the data division unit DIVS may be stopped.

Each BIP insertion unit BINS calculates the parity bit interleaved parity (BIP) of data included in the alignment marker and 16383 blocks, and stores the calculated parity BIP in a predetermined area in the alignment marker. Each BIP insertion unit BINS outputs the alignment marker storing the parity BIP and the block, to a data aggregation unit AGGS. In addition, the alignment marker has an area for storing an identifier of the PCS lane, and the information processing apparatus PDEV of a transmission destination of the data is able to recognize correspondence with the PCS lane of the information processing apparatus PDEV of a transmission source of data, by decrypting the alignment marker. In addition, the operation of the BIP insertion unit BINS corresponding to the PCS lane PLs that is not selected by the enable signal LEN which is received by the data division unit DIVS may be stopped.

The data aggregation unit AGGS aggregates the data that has been received from the BIP insertion unit BINS to a data group, for each unit of five PCS lanes PLs (for example, PLs0 to PLs4), and outputs each of the aggregated data groups to the parallel-to-serial converter PS of the PMA. In addition, in the data aggregation unit AGGS, with respect to the circuit corresponding to the PCS lane PLs that is not selected by the enable signal LEN which is received by the data division unit DIVS, the operation may be stopped.

The parallel-to-serial converter PS of the PMA converts each of the four data groups that have been received from the data aggregation unit AGGS into serial data. For example, when a bit width of each data group is 32 bits, the parallel-to-serial converter PS converts 32-bit parallel data into one bit serial data. The parallel-to-serial converter PS transmits each of the converted serial data to the information processing apparatus PDEV which is the transmission destination of data, through physical lanes PHLs0 to PHLs3.

The physical lanes PHLs0 to PHLs3 are referred to as physical lanes PHLr0 to PHLr3 in the information processing apparatus PDEV which is the transmission destination of data. In addition, in the parallel-to-serial converter PS, with respect to the circuit corresponding to the PCS lane PLs that is not selected by the enable signal LEN which is received by the data division unit DIVS, the operation may be stopped. Further, when the optical signal is transmitted through the physical lanes PHLs0 to PHLs3, the photoelectric converter that converts an electrical signal into an optical signal is disposed between the parallel-to-serial converter PS and the physical lane PHLs0 to PHLs3.

The serial-to-parallel converter SP of the PMA receives serial data from the information processing apparatus PDEV which is the transmission source of data, through the respective physical lanes PHLr0 to PHLr3. The physical lanes PHLr0 to PHLr3 are referred to as physical lanes PHLs0 to PHLs3 in the information processing apparatus PDEV which is the transmission source of data. The serial-to-parallel converter SP generates four data groups by converting each piece of serial data into parallel data, and outputs each of the generated data groups to the data division unit DIVR.

For example, when a bit width of each data group is 32 bits, the serial-to-parallel converter SP converts one bit serial data into 32-bit parallel data. In addition, in the serial-to-parallel converter SP, with respect to the circuit corresponding to the PCS lane PLr that is not selected by the enable signal LEN which is received by the data aggregation unit AGGR, the operation may be stopped. Further, when the optical signal is transmitted through the physical lanes PHLs0 to PHLs3, a photoelectric converter that converts an optical signal into an electrical signal is disposed between the respective physical lanes PHLr0 to PHLr3 and the serial-to-parallel converter SP.

The data division unit DIVR distributes each data group that has been received from the serial-to-parallel converter SP into five PCS lanes PLr (for example, PLr0 to PLr4). The data division unit DIVR outputs the data which has been distributed to each of the PCS lanes PLr0 to PLr19, to the corresponding AM detection units ADET (ADET0 to ADET19). In addition, in the data division unit DIVR, with respect to the circuit corresponding to the PCS lane PLr that is not selected by the enable signal LEN which is received by the data aggregation unit AGGR, the operation may be stopped.

Each AM detection unit ADET outputs the data and the alignment marker that have been received from the data division unit DIVR, to respective BIP detection units BDET (BDET0 to BDET19). When detecting the alignment marker from the data received from the data division unit DIVR, each AM detection unit ADET outputs the AM detection information AINF indicating that the alignment marker has been detected, to the start control unit SUCLT. In addition, with respect to the AM detection unit ADET corresponding to the PCS lane PLr that is not selected by the enable signal LEN which is received by the data aggregation unit AGGR, the operation may be stopped.

Each BIP detection unit BDET outputs the data that has been received from the AM detection unit ADET, to the data aggregation unit AGGR. Further, each BIP detection unit BDET detects the code error in the data that has been received from each AM detection unit ADET, using a parity BIP included in the alignment marker. Each BIP detection unit BDET outputs the detection result of a code error as the error information EINF, to the error notification unit EREP. In addition, with respect to the BIP detection unit BDET corresponding to the PCS lane PLr that is not selected by the enable signal LEN which is received by the data aggregation unit AGGR, the operation may be stopped.

The data aggregation unit AGGR selects a PCS lane PLr corresponding to a valid physical lane PHL from a plurality of PCS lanes PLr (PLr0 to PLr19), based on the enable signal LEN that is received from the frame transfer unit FTR. Here, a decrease in the number of valid physical lanes PHL and the number of PCS lanes PLr based on the enable signal LEN is referred to as lane degradation. An increase in the number of valid physical lanes PHL and the number of PCS lanes PLr based on the enable signal LEN is referred to as restoration of the degraded physical lane PHL, release of degradation of the physical lane PHL, or restart of the physical lane PHL for which use has been stopped.

In addition, the data aggregation unit AGGR decodes data obtained by the information processing apparatus PDEV of a transmission source performing 64B/66B coding, for each valid PCS lane PLr. Then, the data aggregation unit AGGR generates the frame data RFRAM by aggregating the data obtained by being decoded for each PCS lane PLr, and outputs the generated frame data RFRAM to the frame transfer unit FTR illustrated in FIG. 2.

If the start control unit SUCLT receives an instruction notification SINF indicating a start instruction of the transmission and reception function of data, it performs a start process of starting the interface unit PHY. After the execution of the start process, if the alignment marker is detected from all valid PCS lanes PLr which are selected in response to the enable signal LEN, the start control unit SUCLT outputs a start completion notification CINF indicating the start completion to the frame transfer unit FTR.

In addition, the start control unit SUCLT outputs the AM detection information AINF on the PCS lane PLr which is received from each AM detection unit ADET to the frame transfer unit FTR. The start control unit SUCLT includes a register that holds the AM detection information AINF that is received from each AM detection unit ADET.

It becomes possible for the frame transfer unit FTR to detect skew between the data received through the physical lanes PHLr0 to PHLr3 by receiving AM detection information AINF indicating the detection of alignment markers for every PCS lane PLr. Then, the frame transfer unit FTR can align the receive timing of the data, based on the detected skew (de-skew process).

The error notification unit EREP outputs the error information EINF on the PCS lane PLr that is received from each BIP detection unit BDET, to the frame transfer unit FTR. The error notification unit EREP includes a register that holds the error information EINF that is received from each BIP detection unit BDET.

When a stop signal PCSSTP is received from the frame transfer unit FTR, the PCS stops the data transmission operation and the data reception operation. In addition, when a start signal PCSSTT is received from the frame transfer unit FTR, the PCS starts the data transmission operation and the data reception operation.

The configuration of the interface unit PHY is not limited to the example illustrated in FIG. 3. For example, the start control unit SUCLT may not output the AM detection information AINF to the frame transfer unit FTR, and each AM detection unit ADET may output AM detection information AINF to the frame transfer unit FTR. Further, for example, the error information EINF may be output directly from each BIP detection unit BDET to the frame transfer unit FTR. Furthermore, the number of PCS lanes PL (PLs and PLr) is not limited to 20, and the number of physical lanes PHL (PHLs and PHLr) is not limited to four.

As described in FIG. 2, the interface unit PHY causes the lane PHL to be degraded or restores the degraded physical lane PHL, based on the enable signal LEN that has been generated by the frame transfer unit FTR. Thus, even when using the interface unit PHY without a function of specifying a failed lane (hereinafter, referred to as a failed lane specification function), it is possible to control degradation of the physical lane PHL. Therefore, the information processing system SYS1 can maintain the link by causing the failed physical lane PHL to be degraded, and perform a process such as a parallel computation using a node (information processing apparatus PDEV) including the failed physical lane PHL.

In addition, the information processing system SYS1 causes a predetermined number of physical lanes PHL to be degraded based on an instruction of switching from the normal mode to the low power mode, and restores the degraded physical lane PHL based on an instruction of switching from the low power mode to the normal mode. If there is a plurality of types of low power modes, the number of physical lanes PHL to be degraded may be set according to the type of the low power mode.

FIG. 4 illustrates an example of the frame transfer unit FTR illustrated in FIG. 2. The frame transfer unit FTR includes a frame generation unit FGEN, a frame transmission unit FSEN, a retransmission control unit RTCLT, a frame reception unit FREC, a buffer unit RBUF, a flow control unit FCLT, and a link control unit LCLT.

The frame generation unit FGEN generates the frame data SFRAM by converting information such as data SDATA that has been received from the CPU or degradation information DINFS that has been received from the link control unit LCLT into a frame format. The frame generation unit FGEN outputs the generated frame data SFRAM to the frame transmission unit FSEN and the retransmission control unit RTCLT. In addition, the frame generation unit FGEN outputs information DL indicating the data length of the frame data SFRAM to the flow control unit FCLT.

The frame transmission unit FSEN includes a buffer that holds the frame data SFRAM that has been received from the frame generation unit FGEN or the frame data SFRAM that has been received from the retransmission control unit RTCLT. The frame transmission unit FSEN transmits the frame data SFRAM that has been held in the buffer to the interface unit PHY.

In addition, there is a case where the clock used in the frame transfer unit FTR and the clock used in the interface unit PHY are different from each other. In this case, the buffer of the frame transmission unit FSEN synchronizes the frame data SFRAM that has been received in synchronization with the clock used in the frame transfer unit FTR to the clock used in the interface unit PHY, and outputs the synchronized frame data to the interface unit PHY. In other words, the frame transmission unit FSEN performs switching of clocks which are asynchronous with each other in the frame transfer unit FTR and the interface unit PHY.

The frame reception unit FREC includes a buffer that holds the frame data RFRAM that is received from the interface unit PHY. The frame reception unit FREC outputs the received frame data RFRAM to the buffer unit RBUF. The frame data RFRAM that is received by the frame reception unit FREC corresponds to the frame data SFRAM that is transmitted from the frame transfer unit FTR of the information processing apparatus PDEV which is the transmission source.

The buffer of the frame reception unit FREC, similarly to the buffer of the frame transmission unit FSEN, synchronizes the frame data RFRAM that has been received in synchronization with the clock used in the interface unit PHY, to the clock used in the frame transfer unit FTR, and outputs the synchronized frame data to the buffer unit RBUF. In other words, the frame reception unit FREC performs switching of clocks which are asynchronous with each other in the frame transfer unit FTR and the interface unit PHY.

The frame reception unit FREC has a detection function of a control packet (data link layer packet: DLLP). When it is detected that the flow control information FINF representing the free space of the buffer unit RBUF of the information processing apparatus PDEV which is a transmission destination of the data is contained in the packet DLLP, the frame reception unit FREC outputs the detected flow control information FINF to the flow control unit FCLT. Here, the flow control information FINF is transmitted using a flow control frame. For example, a credit release notification indicating that the buffer unit RBUF of the information processing apparatus PDEV which is a transmission destination of the data is vacant, is included in the flow control information FINF.

The frame reception unit FREC detects whether or not link control information is included in the packet DLLP, and here, the link control information indicates the link-up or link-down of the data link layer, degradation information DINFR regarding degradation of physical lane PHL, and the like. If the link control information is included in the packet DLLP, the frame reception unit FREC outputs the detected link control information as degradation information DINFR to link control unit LCLT. In addition, the link-down indicates that communication is interrupted between the interface units PHY in the information processing apparatuses PDEV that transmit and receive data. The degradation information DINFR corresponds to the degradation information DINFS that is transmitted from the link control unit LCLT of the information processing apparatus PDEV which is the transmission source of data.

In addition, the frame reception unit FREC detects whether or not the packet DLLP includes an acknowledgment signal ACK or a negative acknowledgment signal NACK responding to the frame data SFRAM which has been transmitted by the frame transmission unit FSEN. If the packet DLLP includes an acknowledgment signal ACK or a negative acknowledgment signal NACK, the frame reception unit FREC outputs the acknowledgment signal ACK or the negative acknowledgment signal NACK, which are detected, to the retransmission control unit RTCLT.

The buffer unit RBUF sequentially stores the frame data RFRAM that has been received from the frame reception unit FREC, and sequentially outputs the stored frame data RFRAM as data RDATA to the CPU.

The flow control unit FCLT includes an error detection unit EDET. The flow control unit FCLT performs a flow control to adjust the transmission timing of the frame data SFRAM, based on the free space of the buffer unit RBUF of the information processing apparatus PDEV which is the transmission destination of data and the data length DL of the frame data SFRAM. For example, when receiving the flow control information FINF indicating that there is no space in the buffer unit RBUF of the information processing apparatus PDEV which is the transmission destination, the flow control unit FCLT controls the frame generation unit FGEN so as to suppress the transmission of the frame data SFRAM.

In addition, the flow control unit FCLT periodically receives information indicating a free state of the buffer unit RBUF from the buffer unit RBUF. The flow control unit FCLT periodically transmits the received information indicating a free state to the flow control unit FCLT of the information processing apparatus PDEV of the other party, through the frame generation unit FGEN and the frame transmission unit FSEN. The frame reception unit FREC of the information processing apparatus PDEV of the other party detects information indicating a free state of the buffer unit RBUF, as flow control information FINF.

If the period during which the flow control information FINF has not been received exceeds a threshold (for example, 200 microseconds), in other words, the flow control information FINF is not periodically received, the error detection unit EDET of the flow control unit FCLT determines that the fault has occurred in the flow control. In this case, the error detection unit EDET outputs a flow control protocol error notification FERR indicating that the fault has occurred in the channel PHL or the like, to the link control unit LCLT. Hereinafter, the flow control protocol error notification FERR is referred to as the FCPE notification FERR.

The retransmission control unit RTCLT includes a fault detection unit FDET and a buffer BUF. The buffer BUF holds the frame data SFRAM that has been received from the frame generation unit FGEN. The retransmission control unit RTCLT receives an acknowledgment signal ACK and a negative acknowledgment signal NACK from the frame reception unit FREC. When the reception process of the transmitted data has been successfully completed by the information processing apparatus PDEV which is the transmission destination, the acknowledgment signal ACK is output from the frame transfer unit FTR of the information processing apparatus PDEV which is the transmission destination, as a packet DLLP. When the reception process of the transmitted data has not been successfully completed by the information processing apparatus PDEV which is the transmission destination, the negative acknowledgment signal NACK is output from the frame transfer unit FTR of the information processing apparatus PDEV which is the transmission destination, as a packet DLLP.

When receiving the negative acknowledgment signal NACK, the retransmission control unit RTCLT outputs the frame data SFRAM held in the buffer BUF, to the frame transmission unit FSEN, and causes the frame transmission unit FSEN to retransmit the frame data SFRAM.

When deterioration in a bit error rate, a retry-out, or the like is detected based on the acknowledgment signal ACK and the negative acknowledgment signal NACK from the frame reception unit FREC, the fault detection unit FDET determines that fault has occurred in the process related to retransmission. When the number of retransmissions within a predetermined time exceeds a threshold (for example, retransmission requests (in other words, when the negative acknowledgment signal (NACK)) are generated 255 or more times during 24 seconds), the deterioration in the bit error rate is detected. When there is no acknowledgment signal ACK and negative acknowledgment signal NACK for the frame data SFRAM that has been transmitted, and the number of continuous retransmissions exceeds a threshold, the retry-out is detected. For example, when the acknowledgment signal ACK or the negative acknowledgment signal NACK was not received until 12.62 milliseconds has elapsed since the frame data SFRAM was transmitted, retry-out is determined. Further, when the number of continuous retransmissions exceeds 255 times, retry-out is determined.

When detecting the deterioration in the bit error rate, the fault detection unit FDET outputs a retransmission error notification RERR1 to the link control unit LCLT, and when retry-out is detected, the fault detection unit FDET outputs a retransmission error notification RERR2 to the link control unit LCLT.

The link control unit LCLT includes an information acquisition unit ACQ and a selection unit SEL. The information acquisition unit ACQ receives the AM detection information AINF indicating the detection of an alignment marker that has been transmitted from the information processing apparatus PDEV of the transmission source of data, from the interface unit PHY for every PCS lane. Further, the information acquisition unit ACQ receives the error information EINF indicating the detection of the results of a code error for the data that has been transmitted from the information processing apparatus PDEV of the transmission source of data, from the interface unit PHY for every PCS lane.

The selection unit SEL specifies the physical lane PHL of a degradation target based on either the AM detection information AINF or the error information EINF that has been received through the information acquisition unit ACQ. The physical lane PHL of the degradation target is a physical lane PHL corresponding to the failed PCS lane or the failed physical lane PHL.

The selection unit SEL detects that failure occurs on the path (including components on the path) on any of the PCS lane and the physical lane PHL, based on the AM detection information AINF received through the information acquisition unit ACQ, during the start process before the link-up of the interface unit PHY. The selection unit SEL detects that failure occurs on the path of any of the PCS lane and the physical lane PHL, based on the error information EINF received through the information acquisition unit ACQ, after link-up of the interface unit PHY.

Further, the selection unit SEL detects that failure occurs on the path of any of the PCS lane and the physical lane PHL, based on a FCPE notification FERR and retransmission error notifications RERR1 and REER2, after link-up of the interface unit PHY.

Then, the selection unit SEL specifies the degraded physical lane PHL, based on the detection result of a failure, and outputs the enable signal LEN corresponding to the specified physical lane PHL. In addition, the selection unit SEL specifies the physical lane PHL to be degraded or the physical lane PHL for which the degradation is to be released, based on the switching notification GRD from the CPU, before the link-up of the interface unit PHY or after the link-up of the interface unit PHY. The selection unit SEL outputs the enable signal LEN corresponding to the specified physical lane PHL. In addition, the selection unit SEL outputs the stop signal PCSSTP to interface unit PHY so as to stop the operation of the interface unit PHY, before outputting the enable signal LEN (before the switching of the physical lane PHL). Then, the selection unit SEL outputs the start signal PCSSTT to the interface unit PHY so as to start the operation of the interface unit PHY, after outputting the enable signal LEN (after the switching of the physical lane PHL).

The link control unit LCLT performs the control such as control of the interface unit PHY, the control of the link, the degradation of physical lane PHL, or the like. For example, with respect to control of the interface unit PHY, the link control unit LCLT outputs an instruction notification SINF instructing the start of the interface unit PHY, to the interface unit PHY. In addition, the link control unit LCLT receives a start completion notification CINF indicating that the start of the interface unit PHY has been completed, from the interface unit PHY. In addition, the link control unit LCLT outputs an instruction notification SINF instructing the interface unit PHY to stop its operation, to the interface unit PHY.

Figure 5:
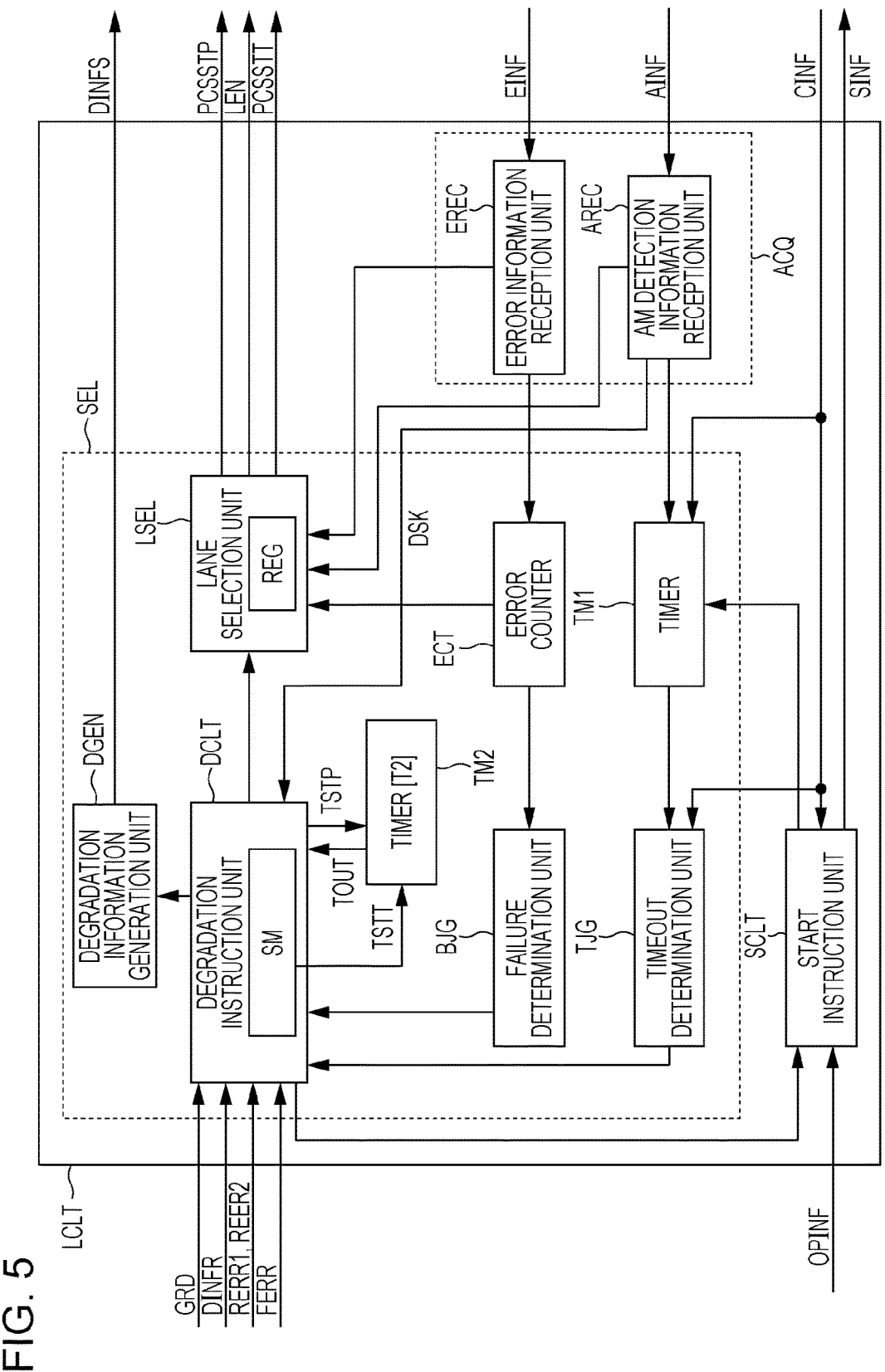
FIG. 5 is a diagram illustrating an example of a link control unit illustrated in FIG. 4.
Figure 7:
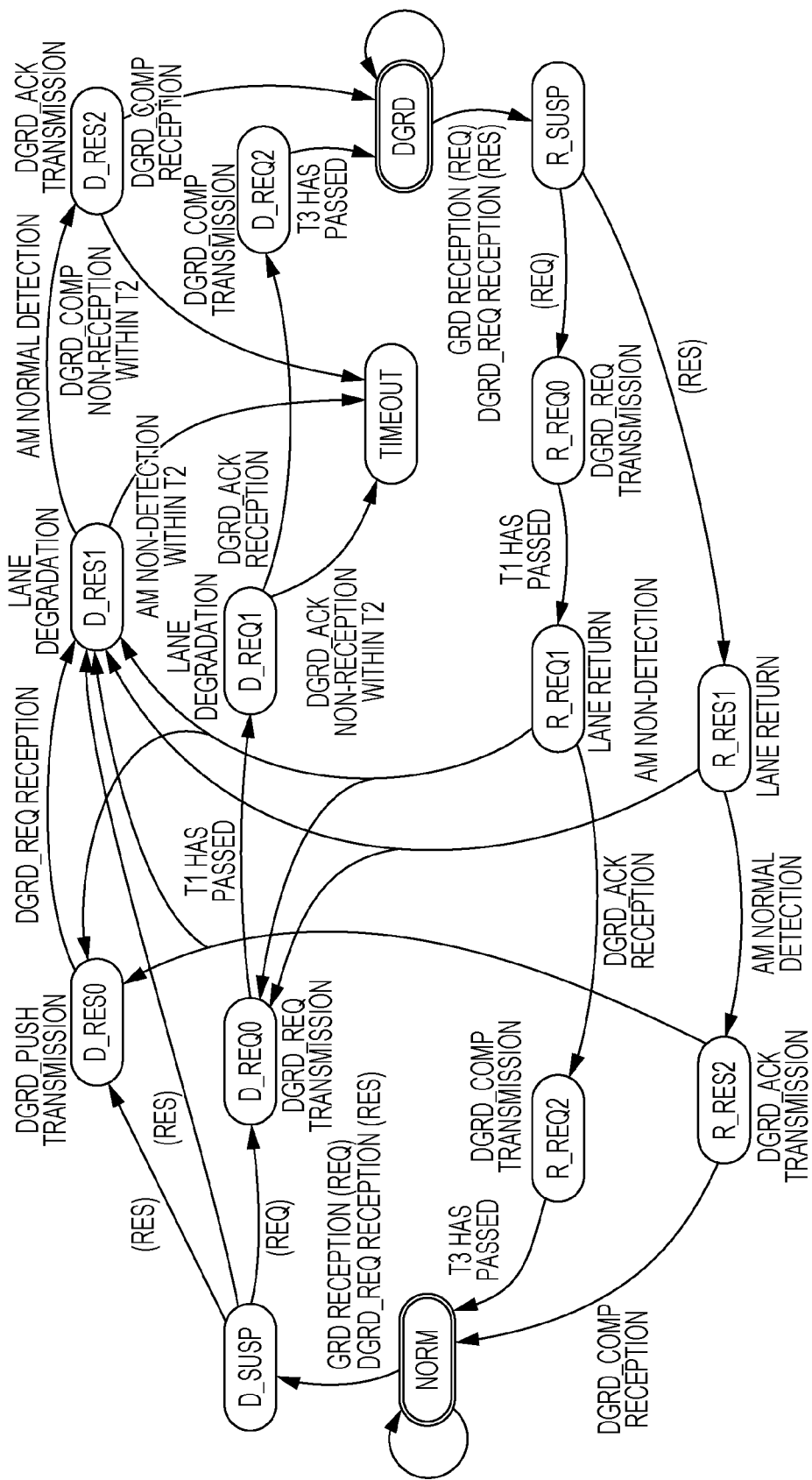
FIG. 7 is a diagram illustrating an example of state control by a state machine that causes a degradation instruction unit illustrated in FIG. 5 to operate.

FIG. 5 illustrates an example of the link control unit LCLT illustrated in FIG. 4. The link control unit LCLT includes a start instruction unit SCLT, an information acquisition unit ACQ, and a selection unit SEL. The information acquisition unit ACQ includes an error information reception unit EREC and an AM detection information reception unit AREC. The selection unit SEL includes a timer TM1, a timeout determination unit TJG, an error counter ECT, a failure determination unit BJG, a degradation instruction unit DCLT, a timer TM2, a lane selection unit LSEL, and a degradation information generation unit DGEN. The degradation instruction unit DCLT operates according to the state transition by the state machine SM. An example of the state machine SM is illustrated in FIG. 7.

The start instruction unit SCLT receives a user instruction OPINF instructing the start of the interface unit PHY from the CPU. When detecting that the start or stop has been instructed to the interface unit PHY by the user operating the operation unit or the like of the information processing apparatus PDEV, the CPU outputs the user instruction OPINF to the frame transfer unit FTR. The start instruction unit SCLT outputs the instruction notification SINF instructing the start of the interface unit PHY, to the interface unit PHY, based on the user instruction OPINF. In addition, when the start instruction for the interface unit PHY is, for example, the first instruction after the information processing apparatus PDEV is turned on, the start instruction unit SCLT starts the timer TM1. If the start of the interface unit PHY has been completed, the start instruction unit SCLT receives the start completion notification CINF indicating the completion of the start, from the interface unit PHY.

In addition, when receiving a user instruction OPINF instructing the stop of the interface unit PHY from the CPU, the start instruction unit SCLT outputs the instruction notification SINF instructing the stop of the interface unit PHY, to the interface unit PHY.

The start instruction unit SCLT receives a notification instructing the restart of the interface unit PHY from the degradation instruction unit DCLT. In this case, the start instruction unit SCLT outputs, for example, the instruction notification SINF instructing the stop of the interface unit PHY, to the interface unit PHY, and then outputs the instruction notification SINF instructing the start of the interface unit PHY, to the interface unit PHY. In addition, the start instruction unit SCLT does not enable the timer TM1 at the time of restart.

The AM detection information reception unit AREC receives the AM detection information AINF of each PCS lane PLr from the interface unit PHY. When receiving, for example, one or more pieces of AM detection information AINF indicating that the alignment marker has been detected, the AM detection information reception unit AREC outputs a start instruction signal for causing the timer TM1 to start measurement, to the timer TM1. Further, when confirming the detection of the alignment marker AM corresponding to all PCS lanes PLr that has been set to be valid, the AM detection information reception unit AREC outputs a deskew signal DSK to degradation instruction unit DCLT and the timer TM2, based on the AM detection information AINF.

The AM detection information reception unit AREC outputs the AM detection information AINF of each PCS lane PLr, to the lane selection unit LSEL. In addition, the AM detection information reception unit AREC may periodically read the AM detection information AINF from the interface unit PHY, by using, for example, the alignment detection information notification function which is defined in IEEE802.3ba standard.

For example, when receiving the start instruction signal from the AM detection information reception unit AREC, the timer TM1 starts the measurement of a predetermined time (for example, 4 milliseconds). The timer TM1 stops the measurement in response to the start completion notification CINF received from the interface unit PHY. When the measurement of the predetermined time is ended, the timer TM1 outputs information indicating the elapse of the predetermined time, to the timeout determination unit TJG.

When the start completion notification CINF has not been received from the interface unit PHY until the predetermined time has elapsed, the timeout determination unit TJG determines that the failure of the physical lane PHL has occurred. Then, the timeout determination unit TJG outputs information indicating that the failure of the physical lane PHL has occurred, to the degradation instruction unit DCLT.

The error information reception unit EREC receives the error information EINF of each PCS lane PLr from the interface unit PHY. The error information reception unit EREC outputs the error information EINF of each PCS lane PLr to the lane selection unit LSEL and the error counter ECT. In addition, the error information reception unit EREC may periodically read the number of errors which is obtained from the parity BIP from the interface unit PHY, by using, for example, the BIP error number notification function which is defined in IEEE802.3ba standard.

The error counter ECT calculates the number of parity BIP errors that has occurred for a predetermined period (for example, 80 milliseconds) for each physical lane PHL, based on the error information EINF of each PCS lane PLr that is received from the error information reception unit EREC. The error counter ECT outputs information indicating the number of parity BIP errors of each physical lane PHL, to the failure determination unit BJG and the lane selection unit LSEL.

The failure determination unit BIG determines whether or not a failure has occurred in the physical lane PHL or the like (hereinafter, referred to as a lane failure), based on the information indicating the number of parity BIP errors for each physical lane PHL within the predetermined period. When it is determined that a lane failure has occurred, the failure determination unit BIG outputs the information indicating that the lane failure has occurred, to the degradation instruction unit DCLT.

The degradation instruction unit DCLT receives the switching notification GRD from the CPU illustrated in FIG. 2, receives the degradation information DINFR from the frame reception unit FREC illustrated in FIG. 4, and receives the retransmission error notifications RERR1 and RERR2 from the fault detection unit FDET of the retransmission control unit RTCLT illustrated in FIG. 4. The switching notification GRD is an example of a degradation request for instructing the stop of the use of the physical lane PHL, or a restoration request instructing the resumption of the use of the physical lane PHL for which use has been stopped. Further, the degradation instruction unit DCLT receives the FCPE notification FERR from the error detection unit EDET of the flow control unit FCLT illustrated in FIG. 4, and receives the information indicating that the lane failure has occurred, from the timeout determination unit TJG and the failure determination unit BJG, respectively. The degradation instruction unit DCLT outputs, for example, information indicating whether or not to execute the lane degradation, information indicating whether or not to release the lane degradation, and the like, to the lane selection unit LSEL.

When the information processing apparatus PDEV receives the demand for lane degradation from the information processing apparatus PDEV of the communication destination, the degradation instruction unit DCLT of the information processing apparatus PDEV that has received the demand outputs the start instruction signal TSTT to start the timer TM2. Further, the information processing apparatus PDEV that transmits the demand for the lane degradation outputs the start instruction signal TSTT to start the timer TM2, in a case of transition to a state where the demand for the lane degradation is to be transmitted (D_REQ0 in FIG. 7).

Further, the degradation instruction unit DCLT of the information processing apparatus PDEV including a CPU that has output the switching notification GRD to release the lane degradation outputs the start instruction signal TSTT to start the timer TM2, based on the switching notification GRD. After the output of the start instruction signal TSTT, when information indicating the completion of the release of the lane degradation (for example, a command DGRD_ACK illustrated in FIG. 22) is received from the information processing apparatus PDEV of the communication destination, the degradation instruction unit DCLT outputs a stop signal TSTP to stop the operation of the timer TM2. Further, when the deskew signal DSK is not received from the AM detection information reception unit AREC, in other words, the alignment marker AM of at least one of valid PCS lanes PL is not successfully received, the degradation instruction unit DCLT suppresses the output of the stop signal TSTP.

In addition, after the output of the start instruction signal TSTT, when the timeout signal TOUT is received from the timer TM2, the degradation instruction unit DCLT determines the occurrence of a failure of the physical lane PHL for which degradation is to be released, interrupts the lane degradation restoration process, and performs the degradation process to return the state to the original degradation state. The timer TM2 to be controlled based on the start instruction signal TSTT and the stop signal TSTP and the degradation instruction unit DCLT that detects a failure of the physical lane PHL based on the timeout signal TOUT from the timer TM2 are examples of a failure detection unit.

The example of the degradation process of interrupting the lane degradation restoration process and returning the lane to the original degradation state is illustrated in FIGS. 23 to 26. It is noted that the failure of the physical lane PHL is determined when the physical lane PHL itself has failed, or the data transfer through the physical lane PHL is not successfully performed due to a failure of the interface unit PHY.

Further, when the information processing apparatus PDEV receives a restoration request for releasing the lane degradation from the information processing apparatus PDEV of the communication destination, the degradation instruction unit DCLT of the information processing apparatus PDEV that has received the restoration request outputs the start instruction signal TSTT to start the timer TM2. For example, the restoration request for releasing the lane degradation that has been received from the information processing apparatus PDEV of the communication destination is the command DGRD_REQ illustrated in FIG. 22. When information (for example, command DGRD_COMP illustrated in FIG. 22) indicating the completion of the release of the lane degradation is received from the information processing apparatus PDEV of the communication destination after the output of the start instruction signal TSTT, the degradation instruction unit DCLT outputs the stop signal TSTP to stop the operation of the timer TM2. In addition, when the deskew signal DSK is not received from the AM detection information reception unit AREC, the degradation instruction unit DCLT suppress the output of the stop signal TSTP. Further, when the timeout signal TOUT is received from the timer TM2 after the output of the start instruction signal TSTT, the degradation instruction unit DCLT determines the occurrence of a failure of the physical lane PHL for which degradation is to be released, interrupts the lane degradation restoration process, and performs the degradation process to return the state to the original degradation state. The example of the restoration process of interrupting the lane degradation restoration process and returning the state to the original degradation state is illustrated in FIGS. 23 to 26.

The timer TM2 starts the measurement of a predetermined time T2 (for example, several seconds) based on the reception of the start instruction signal TSTT, and stops the measurement of the predetermined time based on the reception of the stop signal TSTP. When the stop signal TSTP is not received until a predetermined time T2 has elapsed after the start of the measurement based on the start instruction signal TSTT, the timer TM2 determines that time is out, and outputs a timeout signal TOUT to the degradation instruction unit DCLT.

The AM detection information reception unit AREC and the timer TM2 are examples of the detection unit that detects a failure of the physical lane PHLr. The degradation instruction unit DCLT and the degradation information generation unit DGEN are examples of the control unit that performs the degradation process of stopping the use of the physical lane PHL based on the degradation request and the restoration process of resuming the use of the physical lane PHL for which use is stopped, based on the restoration request. Further, the degradation instruction unit DCLT and the degradation information generation unit DGEN are examples of the control unit that performs the degradation process of stopping the use of the physical lane PHL for which use has been resumed when a failure is detected in the physical lane PHL for which use has been resumed, during the restoration process.

In addition, the degradation instruction unit DCLT may output the start instruction signal TSTT to be output based on the switching notification GRD, and the start instruction signal TSTT to be output based on the reception of the restoration request for releasing the lane degradation, as physically separate signals, to the timer TM2. In this case, the timer TM2 may measure predetermined times T21 and T22 (FIG. 24) which are different from one another based on two respective start instruction signals TSTT. In addition, a predetermined time T2 that timer TM2 measures at the time of execution of the lane degradation, and a predetermined time T2 that the timer TM2 measures at the time of execution of the release of the lane degradation may be different from each other.

In addition, when detecting the failure of a certain physical lane PHLr through which data is received, the degradation instruction unit DCLT may output the information indicating the physical lane PHLr to be degraded, and information indicating which physical lane PHLs degrades through which data is transmitted, to the lane selection unit LSEL. In this case, for example, the physical lanes PHLr2 to PHLr3 and the physical lanes PHLs2 to PHLs3 corresponding to the physical lanes PHLr2 to PHLr3 are degraded. The information indicating the physical lane PHLs to be degraded and the information indicating the physical lane PHLr to be degraded are transmitted as a control packet to the information processing apparatus PDEV of the communication destination. The information processing apparatus PDEV of the communication destination performs the degradation of the physical lanes PHLs and PHLr.

Similarly, when any of the physical lanes PHLs through which data is transmitted is degraded, the degradation instruction unit DCLT may output the information indicating the physical lane PHLs to be degraded and the information indicating which physical lane PHLr is to be degraded through which data is received, to the lane selection unit LSEL. The degradation of the physical lane PHLs is performed based on the degradation instruction included in the control packet received from the information processing apparatus PDEV of the communication destination. That is, the degradation of the physical lane PHLs is performed, if the degradation information DINFR is included in the control packet DLLP that has been received from a node of the communication partner (that is, if the node of the communication partner detects a failure in the physical PHLr through which data is received). In this case, for example, the physical lanes PHLs2 to PHLs3, and the physical lanes PHLr2 to PHLr3 corresponding to the physical lanes PHLs2 to PHLs3 are degraded. In addition, the information processing apparatus PDEV of the communication destination causes the physical lane PHLr based on the detection of an error and the physical lane PHLs to be degraded.

Thus, the use of a predetermined number of physical lanes PHLr and PHLs is stopped in both the information processing apparatuses PDEV1 and PDEV2, based on the detection of the error in the data received through the physical lane PHLr.

The degradation instruction unit DCLT outputs information for executing the lane degradation or information for releasing the lane degradation, based on the reception of the switching notification GRD from the CPU, to the lane selection unit LSEL. Further, the degradation instruction unit DCLT outputs the information for generating the degradation information DINFS to be transmitted to the information processing apparatus PDEV of the communication destination, to the degradation information generation unit DGEN.

The lane selection unit LSEL includes a register REG provided with an area for storing information indicating the degradation or the restoration of the lane, for each of the physical lanes PHLs0 to PHLs3, and PHLr0 to PHLr3. The lane selection unit LSEL sets the register REG, based on the information for executing lane degradation and information for releasing the lane degradation, which are received from the degradation instruction unit DCLT. In other words, the register REG is set based on error information EINF and AINF, a FCPE notification FERR, retransmission error notifications RERR1 and RERR2, which are from the interface unit PHY, and a switching notification GRD from the CPU.

Without being particularly limited, in the register REG, an area corresponding to the physical lane PHL used for data transfer (does not degrade) is set to logic 1, and an area corresponding to the physical lane PHL which is not used for data transfer (degrade) is set to logic 0. Then, the lane selection unit LSEL, based on the information that has been set in the register REG, generates an enable signal LEN for enabling or disabling a physical lane PHL used for data transfer with the information processing apparatus PDEV of the communication destination, and outputs it to the interface unit PHY. Further, the lane selection unit LSEL outputs the stop signal PCSSTP to the PCS before changing the register REG in order to generate the enable signal LEN, and causes the PCS to stop the data transmission operation and data reception operation. In addition, the lane selection unit LSEL outputs the start signal PCSSTT to the PCS after changing the register REG, and causes the PCS to start the data transmission operation and data reception operation.

The degradation information generation unit DGEN generates degradation information DINFS instructing the information processing apparatus PDEV of the communication destination to execute lane degradation or degradation information DINFS instructing to determine a failure of the physical lane PHL, based on the information received from the degradation instruction unit DCLT. The degradation information generation unit DGEN outputs the degradation information DINFS to the frame generation unit FGEN illustrated in FIG. 4. As a result, the degradation information DINFS is transferred as degradation information DINFR to the information processing apparatus PDEV of the communication destination.

The configuration of the link control unit LCLT is not limited to the example illustrated in FIG. 5. For example, the start instruction unit SCLT may enable the timer TM1, even at the time of restart.

FIG. 6 illustrates an example of a trigger for lane degradation and a trigger for releasing the lane degradation.

The lane degradation is performed in response to detection of failure in the PCS lane PL and the physical lane PHL, during the start process prior to the link-up of the information processing apparatus PDEV.

After the link-up of the information processing apparatus PDEV, if the number of retransmissions within a unit time exceeds a threshold and the fault detection unit FDET outputs a retransmission error notification RERR1 based on the detection of deterioration in a bit error rate, the lane degradation is performed. Further, after the link-up of the information processing apparatus PDEV, if the number of continuous retransmissions exceeds a threshold and the fault detection unit FDET outputs a retransmission error notification RERR2 based on the detection of retry-out, the lane degradation is performed. The retry-out is detected, for example, if there is no response (acknowledgment signal ACK or negative acknowledgment signal NACK) for the transmitted frame data SFRAM, or the number of continuous retransmissions exceeds a threshold.

After the link-up of the information processing apparatus PDEV, if the flow control frame is not received over a predetermined period of time, and the flow control unit FCLT has output an FCPE notification FERR based on the detection of the flow control protocol error, the lane degradation is performed. After the link-up of the information processing apparatus PDEV, if the number of parity BIP errors within the predetermined period exceeds the threshold, the lane degradation is performed.

In addition, before and after the link-up of the information processing apparatus PDEV, if the switching notification GRD for switching the information processing apparatus PDEV from the normal operation mode to the low power mode is output from the CPU (firmware), the lane degradation is performed.

Meanwhile, before and after the link-up of the information processing apparatus PDEV, if the switching notification GRD for switching the information processing apparatus PDEV from the low power mode to the normal operation mode is output from the CPU, the release of the degraded physical lane PHL is performed.

In addition, when the lane degradation is performed due to the failure of the physical lane PHL or the PCS lane PL, after the failed component is replaced, the information processing system SYS1 is restarted. The information processing system SYS1 which has been restarted performs a link-up process by using all of the physical lanes PHL. Therefore, only when the information processing apparatus PDEV is switched from the low power mode to the normal operation mode, the release of the degraded physical lane PHL is performed.

FIG. 7 is a diagram illustrating an example of state control by a state machine SM that causes the degradation instruction unit DCLT illustrated in FIG. 5 to operate. The reference numerals NORM indicated by oval double line represents the normal state before the execution of the lane degradation, and the reference numerals DGRD indicated by oval double line represents the degradation state during the execution of the lane degradation.

When a failure is detected in the physical lane PHLr on the reception side in the normal state NORM, since the state machine SM causes the information processing apparatus PDEV to operate as a requester REQ that outputs a lane degradation command DGRD_REQ, the state proceeds to the state D_SUSP. For example, the failure of the physical lane PHLr on the reception side is determined, when a flow control protocol error has been detected (No. 4 in FIG. 6) or the number of parity BIP errors within a predetermined time period exceeds the threshold (No. 5 in FIG. 6). Alternatively, when the switching notification GRD executing lane degradation is received from the CPU (No. 6 in FIG. 6), since the state machine SM causes the information processing apparatus PDEV to operate as the requester REQ, the state proceeds to the state D_SUSP.

Meanwhile, when a request for specification of the physical lane PHLs to be degraded is made to the information processing apparatus PDEV of the communication destination, since the state machine SM causes the information processing apparatus PDEV to operate as a responder RES outputting the degradation lane specification request DGRD_PUSH, the state proceeds to the state D_SUSP. The responder RES is an information processing apparatus PDEV that receives the command DGRD_REQ for lane degradation. For example, when deterioration of the bit error rate is detected (No. 2 in FIG. 6) or the retry-out is detected (No. 3 in FIG. 6), a request for specification of the physical lane PHL to be degraded is determined.

Figure 18:
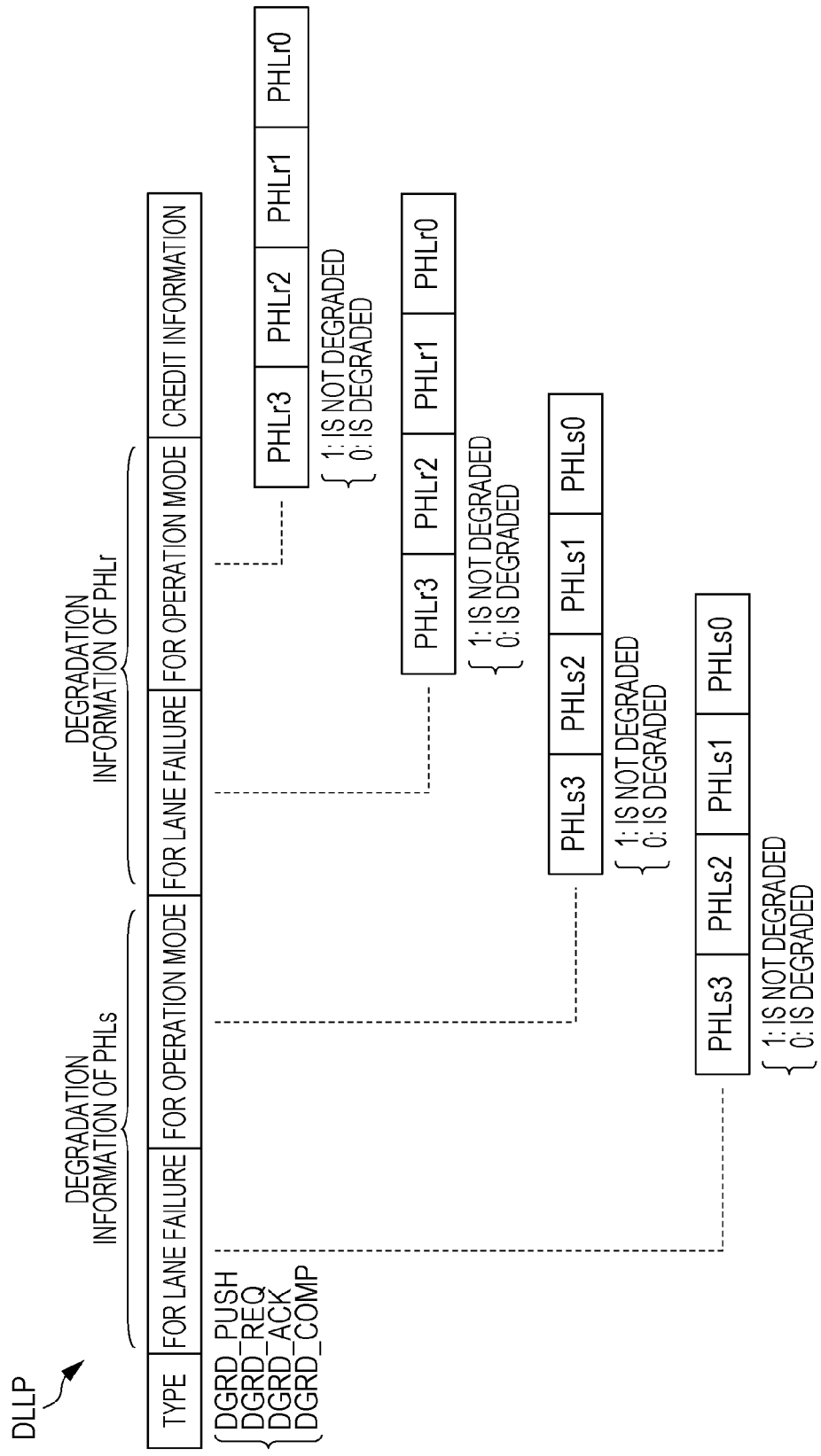
FIG. 18 is a diagram illustrating an example of a degradation control packet used for lane degradation and for releasing a degraded lane.

The requester REQ proceeds from the state D_SUSP to the state D_REQ0, repeatedly transmits a command DGRD_REQ instructing lane degradation (degradation request) to the information processing apparatus PDEV of the communication destination, and after the elapse of a predetermined time T1, proceeds to the state D_REQ1. As illustrated in FIG. 18, the command DGRD_REQ includes the information on the physical lane PHL for which use is to be stopped. The requester REQ performs the lane degradation of stopping the use of a predetermined physical lane PHL in the state D_REQ1, and proceeds to the state D_REQ2, based on the reception of the command DGRD_ACK indicating the completion of the lane degradation from the information processing apparatus PDEV of the communication destination.

When a command DGRD_ACK is not received within a predetermined time T2 in the state D_REQ1, the requester REQ determines that time is out. The predetermined time T2 is a time to be measured after the transition to the state D_REQ0, and is measured by the timer TM2 illustrated in FIG. 5. When the timeout is determined, the information processing system SYS1 illustrated in FIG. 2 performs a timeout process, stops the communication using the physical lane PHL, and notifies a higher device of the occurrence of a communication error. In other words, a link between the information processing apparatuses PDEV1, PDEV2 is disconnected, and the communication function between the information processing apparatuses PDEV1, PDEV2 is stopped.

The requester REQ repeatedly transmits a command DGRD_COMP indicating the completion of the lane degradation to the information processing apparatus PDEV of the communication destination, in the state D_REQ2, and after the elapse of a predetermined time T3, proceeds to the degradation state DGRD. The degradation process of the physical lane PHL on the requester REQ is completed.

Meanwhile, a command DGRD_PUSH requesting for specification of a physical lane PHLs to be degraded (degradation lane specification request) is transmitted to the information processing apparatus PDEV of the communication destination, the responder RES proceeds from the state D_SUSP to the state D_RES0. In the state D_RES0, the responder RES repeatedly transmits the command DGRD_PUSH (degradation lane specification request) to the information processing apparatus PDEV of the communication destination. When the command DGRD_REQ for lane degradation (degradation request) is received from the information processing apparatus PDEV of the communication destination in state D_RES0, the responder RES proceeds to the state D_RES1. In the state D_RES1, the lane degradation to stop the use of the physical lane PHL that is indicated by the command DGRD_REQ is performed.

When the alignment markers AM of all of the valid PCS lanes PL are successfully detected in the state D_RES1, the responder RES that performs the lane degradation proceeds to the state D_REQ2, and transmits the command DGRD_ACK to the information processing apparatus PDEV of the communication destination. Meanwhile, when the alignment marker AM of any one of the valid PCS lanes PL within a predetermined time T2 is not successfully received in the state D_RES1, the responder RES determines that time is out. The predetermined time T2 is a time (for example, 5 seconds) after the transition to the state D_RES0, and is measured by the timer TM2 illustrated in FIG. 5.

In addition, since the alignment marker AM is transmitted for every code block 64B/66B of 16384 pieces, the transmission interval of the alignment marker AM is, for example, about 210 microseconds. The alignment marker AM is an example of control information transmitted from another information processing apparatus PDEV at a first time interval through the respective physical lanes PHL. The AM detection unit ADET illustrated in FIG. 4 and the AM detection information reception unit AREC illustrated in FIG. 5 are examples of a control information detection unit that detects control information (in other words, an alignment marker AM) that is transmitted from another information processing apparatus PDEV at the first time interval through the respective physical lanes PHL.

When the command DGRD_COMP indicating the completion of the lane degradation is received from the information processing apparatus PDEV of the communication destination, in the state D_RES2, the responder RES proceeds to the degradation state DGRD, and completes the degradation process of the physical lane PHL on the responder RES side. When the command DGRD_COMP is not received within the predetermined time T2 from the transition to the state D_RES0, the responder RES determines that time is out in the state D_RES2.

Meanwhile, when the switching notification GRD for releasing the lane degradation is received from the CPU in the degradation state DGRD (No. 7 in FIG. 6), the state machine SM proceeds to the state R_SUSP. By transition to the state R_SUSP based on the switching notification GRD, the information processing apparatus PDEV operates as the requester REQ that outputs the command DGRD_REQ. In addition, in the transition process from the degradation state DGRD to the normal state NORM, the command RGRD_REQ is a command (restoration request) instructing the release of the lane degradation. Further, when the command DGRD_REQ to release the lane degradation is received from the information processing apparatus PDEV of the communication destination, in the degradation state DGRD, the state machine SM transitions to the state R_SUSP, in order to cause the information processing apparatus PDEV to operate as the responder RES.

The requester REQ transitions from the state R_SUSP to the state R_REQ0, and repeatedly transmits the command DGRD_REQ for releasing the lane degradation to the information processing apparatus PDEV of the communication destination, and after the elapse of the predetermined time T1, the requester REQ transitions to the state R_REQ1. As illustrated in FIG. 18, the command DGRD_REQ includes information of the physical lane PHL for which use is resumed.

The requester REQ performs the lane degradation restoration process of resuming the use of a predetermined physical lane PHL in the state R_REQ1. The requester REQ proceeds to the state R_REQ2, based on the reception of the command DGRD_ACK indicating the completion of the release of the lane degradation from the information processing apparatus PDEV of the communication destination. In addition, as illustrated in FIG. 8, when the alignment markers AM of all of the valid PCS lanes are detected within a predetermined time T2, and the command DGRD_ACK indicating the completion of the release of the lane degradation is received, the transition to the state R_REQ2 is performed.

If there is a PCS lane for which the alignment marker AM is not detected within the predetermined time T2 in the state R_REQ1, the requester REQ interrupts the lane degradation restoration process, regardless of receiving the command DGRD_ACK for the release of the lane degradation. The predetermined time T2 is a time after the transition to the state R_REQ0, and is measured by the timer TM2 illustrated in FIG. 5. The interruption of the lane degradation restoration process is performed when a timeout signal TOUT is output to the degradation instruction unit DCLT from the timer TM2. Then, the requester REQ proceeds to the state D_REQ0 in order to return to the original degradation state.

Further, when the alignment markers AM of all of the valid PCS lanes are detected but the command DGRD_ACK for the release of the lane degradation is not received, within the predetermined time T2 in the state R_REQ1, the requester REQ interrupts the lane degradation restoration process. Then, the requester REQ proceeds to the state D_RES0 in order to return the physical lane PHL to the original degradation state. Further, when the command DGRD_REQ for returning the physical lane PHL to the original degradation state in the state R_REQ1 is received from the information processing apparatus PDEV of the communication destination, the requester REQ interrupts the lane degradation restoration process, and proceeds to the state D_RES1.

The requester REQ repeatedly transmits the command DGRD_COMP indicating the completion of the release of the lane degradation, to the information processing apparatus PDEV of the communication destination, in the state R_REQ2, and after the elapse of a predetermined time T3, the requester REQ transitions to the normal state NORM. The degradation restoration process of the physical lane PHL on the requester REQ side is completed.

Meanwhile, the responder RES transitions from the state R_SUSP to the state R_RES1, and performs the lane degradation restoration process of resuming the use of the physical lane PHL which is indicated by the command DGRD_REQ. Thereafter, when the alignment markers AM of all of the valid PCS lanes PL are successfully detected within the predetermined time T2, the responder RES proceeds to the state R_RES2, and transmits the command DGRD_ACK to the information processing apparatus PDEV of the communication destination.

When the alignment marker AM of at least one of valid PCS lanes PL is not successfully received within the predetermined time T2, in the state R_RES1, the responder RES interrupts the lane degradation restoration process, and proceeds to the state D_REQ0. Further, when the command DGRD_REQ for returning the physical lane PHL to the original degradation state in the state R_RES1 is received from the information processing apparatus PDEV of the communication destination, the responder RES interrupts the lane degradation restoration process, and proceeds to the state D_RES1.

When the command DGRD_COMP indicating the completion of the lane degradation is received from the information processing apparatus PDEV of the communication destination, in the state D_RES2, the responder RES proceeds to the degradation state DGRD, and completes the degradation process of the physical lane PHL on the responder RES side. When the alignment markers AM of all of the valid PCS lanes are detected within the predetermined time T2, but the command DGRD_COMP is not received, in the state R_RES2, the responder RES interrupts the lane degradation restoration process, and proceeds to the state D_RES0. Further, when the command DGRD_REQ for returning the physical lane PHL to the original degradation state in the state R_RES2 is received from the information processing apparatus PDEV of the communication destination, the responder RES interrupts the lane degradation restoration process, and proceeds to the state D_RES1.

FIG. 8 is a diagram illustrating an example of state transition by the state machine SM illustrated in FIG. 7. With respect to the transition of state illustrated in FIG. 7, the detailed description thereof is omitted.

The state NORM and the state DGRD are in a state in which data is transmitted and received between the information processing apparatuses PDEV. Each information processing apparatus PDEV which is in a state NORM maintains the state NORM until the execution of the lane degradation process is determined. When the execution of the lane degradation process is determined, the state of the state machine SM transitions from the state NORM to the state D_SUSP. In the state D_SUSP, the pre-process of the lane degradation process is executed. When the information processing apparatus PDEV operates as the responder RES in the state D_SUSP, and the lane degradation lane specification request is transmitted to the information processing apparatus PDEV of the communication destination, the state of the state machine SM transitions to the state D_RES0. Meanwhile, when the information processing apparatus PDEV operates as the responder RES in the state D_SUSP, and the lane degradation request is received from the information processing apparatus PDEV of the communication destination, the state of the state machine SM transitions to the state D_RES1. When the information processing apparatus PDEV operates as the requester REQ in the state D_SUSP, the state transitions to the state D_REQ0.

Meanwhile, the information processing apparatus PDEV which is in a state DGRD maintains the state DGRD until the execution of the lane restoration process is determined. When the execution of the lane restoration process is determined, the state of the state machine SM transitions from the state DGRD to the state R_SUSP. In the state R_SUSP, the pre-process of the lane restoration process is executed. When the information processing apparatus PDEV operates as the responder RES in the state R_SUSP, the state of the state machine SM transitions to the state R_RES1. When the information processing apparatus PDEV operates as the requester REQ in the state R_SUSP, the state of the state machine SM transitions to the state R_REQ0.

When the information processing apparatus PDEV that is executing the lane restoration process as the requester REQ or the responder RES detects the timeout (TOUT) of the predetermined time T2, the state of the state machine SM proceeds to the state D_REQ0 or the state D_RES0 (FIG. 7). Further, when the information processing apparatus PDEV that is executing the lane restoration process as the requester REQ or the responder RES receives the command DGR-D_REQ from the information processing apparatus PDEV of the communication destination, the state of the state machine SM proceeds to the state D_RES1. Thus, when it is difficult to restore the physical lane PHL due to a failure or the like, the physical lane PHL can be returned to the original degradation state DGRD, without stopping the information processing system SYS1 by the timeout. As a result, it is possible to suppress that the communication between the information processing apparatus PDEV is interrupted, and to improve the reliability of the information processing system SYS1.

FIG. 9 illustrates an example of an operation before link-up of the information processing apparatus PDEV illustrated in FIG. 2. Incidentally, FIG. 9 illustrates an example of the operations of the frame transfer unit FTR illustrated in FIG. 4 and the link control unit LCLT illustrated in FIG. 5.

Both the information processing apparatuses PDEV1 and PDEV2 illustrated in FIG. 2 perform the operation illustrated in FIG. 9 independently of each other. When the user instruction OPINF is received from the CPU illustrated in FIG. 2, the operation illustrated in FIG. 9 is performed by the link control unit LCLT illustrated in FIGS. 4 and 5. Incidentally, the operation illustrated in FIG. 9 may be implemented by hardware or may be implemented by software such as a control program executed by a CPU mounted in the frame transfer unit FTR.

In step S100, the start instruction unit SCLT instructs the interface unit PHY to perform a start process, depending on the user instruction OPINF instructing the start of the interface unit PHY. The interface unit PHY that has received the start instruction performs the start process, and starts transmitting and receiving link-up frames between interface units PHY.

Next, in step S110, the AM detection information reception unit AREC determines whether or not one or more pieces of AM detection information AINF are received, the AM detection information AINF being received together with the link-up frames. In other words, the AM detection information reception unit AREC determines whether or not the AM detection information AINF has been observed in one or more PCS lanes PL.

If one or more pieces of AM detection information AINF are received, the operation proceeds to step S120. Meanwhile, if one piece of AM detection information AINF is not also received, the operation returns to step S110.

In step S120, the timer TM starts measuring a predetermined time (for example, 4 milliseconds) based on the observation of one or more PCS lanes PL having data including the alignment marker.

Next, in step S130, the timeout determination unit TJG determines whether or not a start completion notification CINF is received from the interface unit PHY, until a predetermined time has elapsed. In other words, the timeout determination unit TJG determines whether or not the alignment marker is detected in all PCS lanes PL until a predetermined time has elapsed since the alignment marker is first detected.

If the start completion notification CINF is received until the predetermined time has elapsed, the operation of the link control unit LCLT proceeds to step S140. Meanwhile, if the start completion notification CINF is not received until the predetermined time has elapsed, the operation proceeds to step S150.

In step S140, because the alignment marker is detected in all PCS lanes PL, the link control unit LCLT determines that there is no failure lane, and ends the process (hereinafter, referred to as the lane degradation process) relating to lane degradation, without performing the lane degradation.

Meanwhile, in step S150, the lane selection unit LSEL specifies a physical lane for which the number of PCS lanes PL having the detected AM detection information AINF therein is less than a normal number (five pieces corresponding to one physical lane PHL in FIG. 3) as a physical lane PHL to be degraded. For example, the physical lane PHL for which degradation is specified is any of the physical lanes PHLr0 to PHLr3 on the reception side which receives the data. In addition, the lane selection unit LSEL may specify the physical lanes PHLr to be degraded on the reception side, and the physical lanes PHLs on the transmission side corresponding to the physical lanes PHLr to be degraded, as degradation targets.

Figure 14:
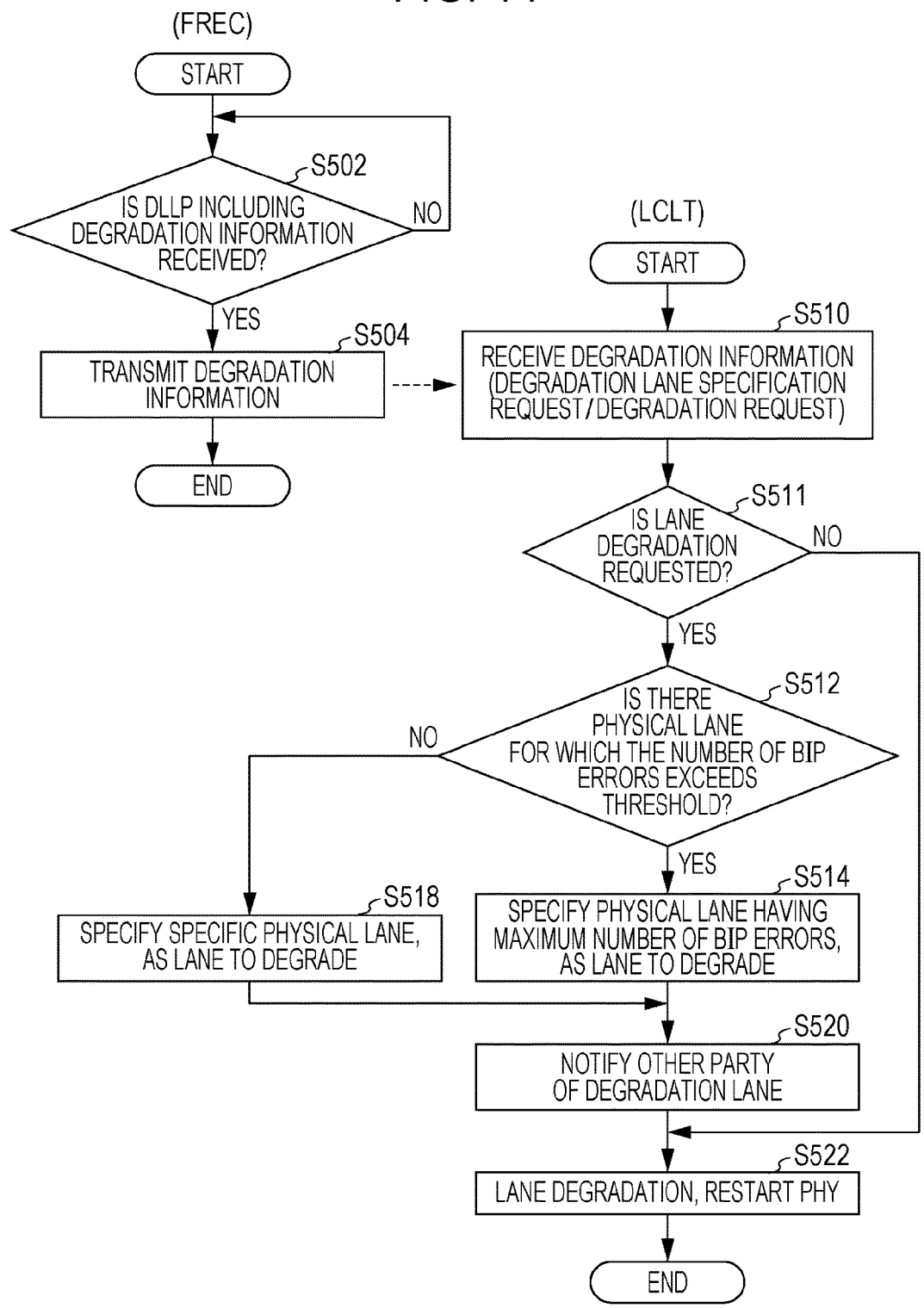
FIG. 14 is a diagram illustrating another example of the operation after link-up of the information processing apparatus illustrated in FIG. 2.

Next, in step S155, the frame transfer unit FTR transmits the degradation information DINFS indicating the physical lane PHL (physical lane PHL to be degraded) that has been specified in step S150, as a packet DLLP, to the information processing apparatus PDEV of a communication destination. The frame transfer unit FTR of the information processing apparatus PDEV of the communication destination receives the degradation request packet DLLP including the degradation information DINFS. The link control unit LCLT of the information processing apparatus PDEV of the communication destination outputs an enable signal LEN to stop the use of the physical lane PHL which is indicated by the degradation information DINFS (on the reception side, DINFR). For example, the physical lane PHL for which use has been stopped by the information processing apparatus PDEV of the communication destination is any of the physical lanes PHLs0 to PHLs3 on the transmission side which transmits data. In addition, the information processing apparatus PDEV of the communication destination may stop the use of the physical lane PHLr on the reception side corresponding to the physical lane PHLs to be degraded on the transmission side, as well as any of the physical lanes PHLs on the transmission side. An example of the operation causing the information processing apparatus PDEV of the communication destination to degrade the physical lane PHL by step S155 is illustrated in FIG. 14.

Next, in step S160, the lane selection unit LSEL performs the lane degradation, so as not to use the physical lane PHL (physical lane PHL to be degraded) specified in step S150. The lane selection unit LSEL outputs the enable signal LEN to stop the use of the physical lane PHL (physical lane PHL to be degraded) specified in step S150. Further, the lane selection unit LSEL selects the physical lane PHL for use in data transfer with the information processing apparatus PDEV of the communication destination, from physical lanes PHL other than the specified physical lane PHL, and outputs the enable signal LEN to use the selected physical lane PHL. The interface unit PHY of the information processing apparatus PDEV of the communication destination is restarted.

The degradation instruction unit DCLT outputs a notification for instructing the restart of the interface unit PHY, to the start instruction unit SCLT. The start instruction unit SCLT instructs the interface unit PHY to perform restart, based on an instruction from the degradation instruction unit DCLT.

In addition, in the restart of the interface unit PHY which is performed during the degradation of the physical lane PHL, the contents which have been set in step S160 are taken over with to the setting for enabling the physical lane PHL (the value of the enable signal LEN). Further, in the link-up after the restart of the interface unit PHY which is performed during the degradation of the physical lane PHL, since the physical lane PHL to be degraded is determined before the restart, the operation illustrated in FIG. 9 is not performed.

From the above, even when using the interface unit PHY without a function of specifying a failed lane, the frame transfer unit FTR can specify the physical lane PHL to be degraded before link-up by referring to the AM detection information AINF and the like. In addition, the information processing apparatus PDEV may execute the lane degradation process illustrated in FIG. 9, also during the restart of the interface unit PHY.

FIG. 10 illustrates an example of a method of specifying the physical lane PHL to be degraded, in the operation before link-up illustrated in FIG. 9.

In the example illustrated in FIG. 10, in the physical lane PHLr0, the alignment markers are detected in all PCS lanes PLr0 to PLr4, and the number of PCS lanes PLr having the detected alignment markers therein is determined as "5". In the physical lane PHLr1, since the alignment markers are detected in all PCS lanes PLr5 to PLr9, the number of PCS lanes PLr having the detected alignment markers therein is determined as "5". In the physical lane PHLr2, since alignment markers are detected in all PCS lanes PLr10 to PLr14, the number of PCS lanes PLr having the detected alignment markers therein is determined as "5".

In the physical lane PHLr3, the alignment markers are detected in PCS lanes PLr15, and PLr17 to PLr19, and the alignment markers are not detected in a PCS lane PLr16. Therefore, the number of PCS lanes PLr having the detected alignment markers therein is determined as "4".

Therefore, in step S150 illustrated in FIG. 9, the lane selection unit LSEL specifies the physical lane PHLr3 for which the number of PCS lanes PLr having the detected alignment markers therein is less than a normal number "5" as a physical lane PHL to be degraded. Meanwhile, the physical lanes PHLr0 to PHLr2 for which the number of PCS lanes PLr having the detected alignment markers therein is the normal number "5" is determined as a normal physical lane PHLr. In this way, the lane selection unit LSEL specifies the lane PHL to be degraded based on the AM detection information AINF.

In addition, for example, in FIG. 10, if the alignment marker is not detected in at least one of the PCS lanes PLr10 to PLr14 corresponding to the physical lane PHLr2, the lane selection unit LSEL specifies the physical lane PHLr2 as a lane to be degraded. In other words, the lane selection unit LSEL sets physical lanes PHLr including the PCS lanes PLr without the detected alignment markers therein, as a degradation target. Further, when there is a plurality of physical lanes PHLr including the PCS lanes PLr without the detected alignment markers therein, the lane selection unit LSEL determines the plurality of physical lanes PHLr as the physical lane PHL to be degraded.

FIG. 11 illustrates an example of the operation after link-up of the information processing apparatus PDEV illustrated in FIG. 2. In the operation illustrated in FIG. 11, if the number of parity BIP errors within the predetermined period exceeds a threshold (for example, "the number of BIP errors within predetermined period exceeds threshold" depicted in FIG. 6), the lane degradation is performed.

Both the information processing apparatuses PDEV1 and PDEV2 illustrated in FIG. 2 perform the operation illustrated in FIG. 11 independently of each other. If the frame transfer unit FTR illustrated in FIG. 4 receives the error information EINF from the interface unit PHY, the operation illustrated in FIG. 11 is started. Incidentally, the operation illustrated in FIG. 11 may be implemented only by hardware or may be implemented by software such as a control program executed by a CPU mounted in the frame transfer unit FTR.

In step S200, the error information reception unit EREC illustrated in FIG. 5 receives the error information EINF of each PCS lane PL from the interface unit PHY.

Next, in step S202, the error counter ECT illustrated in FIG. 5 measures the number of parity BIP errors for the past 80 milliseconds for each physical lane PHL. For example, the error counter ECT counts errors in the parity BIP of each physical lane PHL that have occurred for the past 80 milliseconds, with the reception of the error information EINF as a reference, and updates the count value at an interval of about 20 milliseconds.

Next, in step S204, the failure determination unit BJG illustrated in FIG. 5 determines whether or not there is a physical lane PHLr for which the number of parity BIP errors calculated in step S202 exceeds a threshold (for example, "255"). When there is the physical lane PHLr for which the number of parity BIP errors exceeds the threshold (when the trigger for lane degradation is detected), the operation of the link control unit LCLT proceeds to step S206.

Meanwhile, in step S204, when there is no physical lane PHLr for which the number of parity BIP errors exceeds the threshold, the operation of the link control unit LCLT returns to step S200. In other words, when the number of parity BIP errors for the past 80 milliseconds is the threshold or less in all physical lanes PHLr, the operation of the link control unit LCLT returns to step S200.

In step S206, the lane selection unit LSEL illustrated in FIG. 5 specifies the physical lane PHLr for which the number of parity BIP errors for the past 80 milliseconds exceeds threshold, as a lane to be degraded. For example, the physical lane PHL for which degradation is specified is any of the physical lanes PHLr0 to PHLr3 on the reception side which receives the data. In addition, the lane selection unit LSEL may specify the physical lanes PHLr to be degraded on the reception side, and the physical lanes PHLs on the transmission side corresponding to the physical lanes PHLr to be degraded, as degradation targets.

The failure determination unit BJG notifies the degradation instruction unit DCLT that there is the physical lane PHL to be degraded. Thus, the degradation instruction unit DCLT instructs the lane selection unit LSEL so as to cause the physical lane PHL to be degraded which has the number of parity BIP errors exceeding the threshold.

Then, the lane selection unit LSEL determines the physical lane PHL to be degraded, based on, for example, the number of parity BIP errors calculated by the error counter ECT in step S202. In addition, the lane selection unit LSEL may receive the information indicating the physical lane PHL having the number of parity BIP errors for the past 80 milliseconds exceeding the threshold, from the failure determination unit BIG.

Next, in step S208, the frame transfer unit FTR transmits the degradation information DINFS indicating the physical lane PHL (physical lane PHL to be degraded) that has been specified in step S206, as a packet DLLP, to the information processing apparatus PDEV of a communication destination. The frame transfer unit FTR of the information processing apparatus PDEV of the communication destination receives the degradation request packet DLLP including the degradation information DINFS. The link control unit LCLT of the information processing apparatus PDEV of the communication destination outputs an enable signal LEN to stop the use of the physical lane PHL on the transmission side which is indicated by the degradation information DINFS (on the reception side, DINFR). For example, the physical lane PHL for which use has been stopped by the information processing apparatus PDEV of the communication destination is any of the physical lanes PHLs0 to PHLs3 on the transmission side which transmits data. In addition, the information processing apparatus PDEV of the communication destination may stop the use of the physical lane PHLr on the reception side corresponding to the physical lane PHLs to be degraded on the transmission side, as well as any of the physical lanes PHLs on the transmission side. An example of the operation causing the information processing apparatus PDEV of the communication destination to degrade the physical lane PHL by step S208 is illustrated in FIG. 14.

In step S210, in the same manner as in step S160 illustrated in FIG. 9, the link control unit LCLT performs the lane degradation, and instructs the interface unit PHY to restart. In other words, the lane selection unit LSEL outputs the enable signal LEN to stop the use of the physical lane PHLr (physical lane PHLr to be degraded) specified in step S206. In addition, the lane selection unit LSEL selects the physical lane PHLr through which data is received from the information processing apparatus PDEV of a communication destination, among the physical lanes PHLr excluding the physical lane PHLr to be degraded, and outputs an enable signal LEN to enable the selected physical lane PHLr. Then, the frame transfer unit FTR restarts the interface unit PHY.

In addition, when the operation illustrated in FIG. 11 is performed after the degradation of the physical lane PHL is already performed, the physical lane PHL for which use has been stopped before the execution of the operation illustrated in FIG. 11 is not included in the selection target physical lane PHL. In this case, the selection target physical lane PHL is the physical lane PHL obtained by excluding the physical lanes PHL specified in step S206 (physical lane PHL to be degraded) from the physical lanes PHL that have been used before the execution of the operation illustrated in FIG. 11.

In addition, in the restart of the interface unit PHY which is performed due to lane degradation, the contents which have been set in step S210 are taken over to the setting for enabling the physical lane PHL (the value of the enable signal LEN). Further, in the link-up after the restart of the interface unit PHY which is performed during the lane degradation, since the physical lane PHL to be degraded is determined before the restart, the operation illustrated in FIG. 9 is not performed.

In the operation illustrated in FIG. 11, the lane selection unit LSEL specifies the physical lane PHL to be degraded, based on the error information EINF indicating that there is an error in data transmitted from the information processing apparatus PDEV of a communication destination to the interface unit PHY. Therefore, even when using the interface unit PHY without a function of specifying a failed lane, the frame transfer unit FTR can specify the physical lane PHL to be degraded after link-up by referring to the error information EINF and the like.

Figure 12:
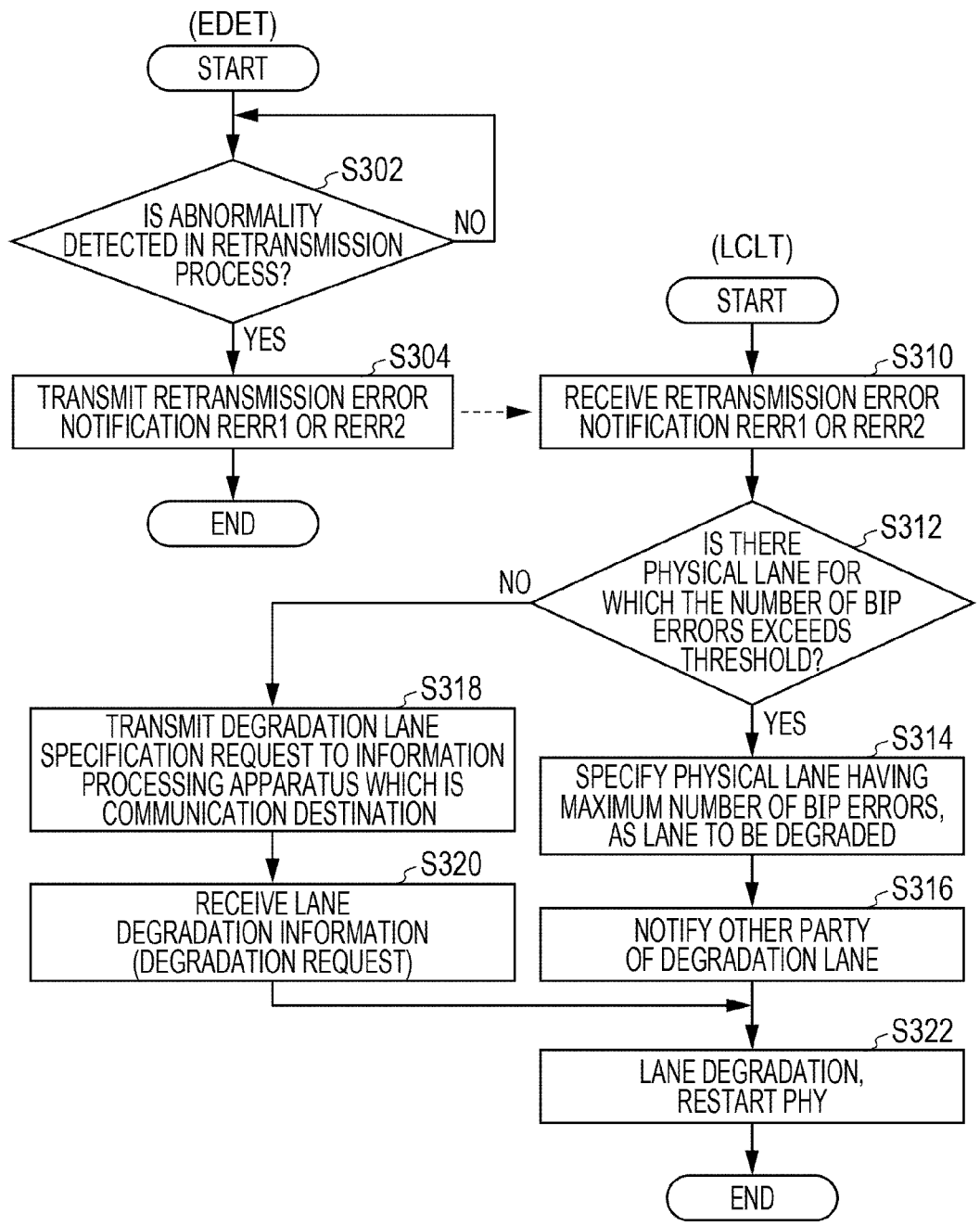
FIG. 12 is a diagram illustrating another example of the operation after link-up of the information processing apparatus illustrated in FIG. 2.

FIG. 12 illustrates another example of the operation of the information processing apparatus PDEV illustrated in FIG. 2 after link-up. In the operation illustrated in FIG. 12, if the fault in the retransmission process (for example, "deterioration in a bit error rate" or "detection of retry-out" depicted in FIG. 6) is detected, the lane degradation is performed.

Both the information processing apparatuses PDEV1 and PDEV2 illustrated in FIG. 2 perform the operation illustrated in FIG. 12 independently of each other. The operation illustrated in FIG. 12 is performed by the frame transfer unit FTR illustrated in FIG. 4. In addition, the operation illustrated in FIG. 12 may be implemented only by hardware or by software such as a control program performed by the CPU mounted in the frame transfer unit FTR.

In FIG. 12, steps S302 and S304 correspond to the process of detecting the trigger of lane degradation, and are repeatedly performed by the fault detection unit FDET after the link-up. Steps S310 to S322 are performed by the link control unit LCLT based on the detection of a fault in the retransmission process by the fault detection unit FDET.

In step S302, the fault detection unit FDET illustrated in FIG. 4 determines whether or not fault has occurred in the process related to retransmission (retransmission process), based on the packet DLLP that the frame reception unit FREC has received from the information processing apparatus PDEV of the communication destination. For example, when deterioration in a bit error rate or retry-out is detected, the fault detection unit FDET determines that fault has occurred in the retransmission process.

For example, when retransmission requests (NACK)) of a threshold (for example, 255) or more times during a predetermined time (24 seconds) are received from the information processing apparatus PDEV of the communication destination, the fault detection unit FDET determines the deterioration in the bit error rates. In addition, when either the acknowledgment signal ACK or the negative acknowledgment signal NACK has not been received until a predetermined time (for example, 12.62 milliseconds) has elapsed since the frame data SFRAM is transmitted, the fault detection unit FDET determines retry-out. Alternatively, when the number of continuous retransmission requests exceeds a threshold (for example, 255 times), the fault detection unit FDET determines retry-out.

If the fault occurs in the retransmission processing, the operations of the fault detection unit FDET, the process proceeds to step S304, if the fault is not generated in the retransmission processing, the operation of the fault detection unit FDET returns to step S302. In other words, when the fault in the retransmission process has not occurred, the fault detection unit FDET continues the process of detecting the fault in the retransmission process, in step S302.

In step S304, when the deterioration of bit error rate is detected, the fault detection unit FDET transmits the retransmission error notification RERR1 to the link control unit LCLT, and when the retry-out is detected, the fault detection unit FDET transmits the retransmission error notification RERR2 to the link control unit LCLT.

Meanwhile, in step S310, the degradation instruction unit DCLT of the link control unit LCLT receives any of the retransmission error notifications RERR1 and REER2 from the fault detection unit FDET. Thus, the link control unit LCLT starts the lane degradation process when fault occurs in the retransmission process.

Next, in step S312, in the same manner as in step S204 illustrated in FIG. 11, the failure determination unit BJG illustrated in FIG. 5 determines whether or not there is a physical lane PHL having the number of parity BIP errors of data that is received from the information processing apparatus PDEV of the communication destination exceeding a threshold within a predetermined period. In other words, it is identified whether the fault occurred in the retransmission process is due to the physical lane PHLr through which data is received from the information processing apparatus PDEV of a communication destination or due to the physical lane PHLs through which data is transmitted to the information processing apparatus PDEV of a communication destination. In addition, the link control unit LCLT counts the number of parity BIP errors within a predetermined period, by using the error counter ECT for each physical lane PHL, in parallel with the operation illustrated in FIG. 12. For example, the number of parity BIP errors of each physical lane PHL in the predetermined period is calculated in step S202 of FIG. 11.

If there is the physical lane PHLr having the number of parity BIP errors exceeding the threshold, it is determined that there is a high possibility of the existence of a failure in the physical lane PHLr or the like through which data is received from the information processing apparatus PDEV of a communication destination, and the operation of the link control unit LCLT proceeds to step S314. Meanwhile, if there is no physical lane PHLr having the number of parity BIP errors exceeding the threshold, it is determined that there is a high possibility of the existence of a failure in the physical lane PHLs or the like through which data is transmitted to the information processing apparatus PDEV of the communication destination, and the operation of the link control unit LCLT proceeds to step S318. In addition, the threshold of step S312 may be the same value as the threshold of the step S204 of FIG. 11, or may be a different value therefrom.

In step S314, the lane selection unit LSEL illustrated in FIG. 5 specifies the physical lane PHLr having the greatest number of parity BIP errors within the predetermined period, as the physical lane PHL to be degraded. In addition, the lane selection unit LSEL may specify the physical lanes PHLr to be degraded on the reception side, and the physical lanes PHLs on the transmission side corresponding to the physical lanes PHLr to be degraded, as degradation targets. For example, the lane selection unit LSEL specifies the physical lane PHL to be degraded due to the detection of a failure, based on the number of parity BIP errors within the predetermined period (for example, during the past 80 milliseconds). In other words, when fault in the process related to retransmission is detected, the lane selection unit LSEL specifies the physical lane PHL to be degraded, based on the error information EINF for a predetermined period.

In this case, as compared to the case of specifying the physical lane PHL to be degraded based on the parity BIP immediately before a fault is detected in the retransmission process, the lane selection unit LSEL can accurately specify the physical lane PHL to be degraded due to a failure, without being affected from noise or the like. Hereinafter, the specification accuracy when specifying the physical lane PHL to be degraded due to a failure is also referred to as a specification accuracy of a lane to be degraded.

Next, in step S316, in the same manner as in step S208 illustrated in FIG. 11, the frame transfer unit FTR transmits the degradation information DINFS indicating the physical lane PHL that has been specified in step S314, as a packet DLLP, to the information processing apparatus PDEV of a communication destination. Then, the link control unit LCLT of the information processing apparatus PDEV of the communication destination outputs an enable signal LEN to stop the use of the physical lane PHL on the transmission side which is indicated by the packet DLLP (degradation request) including the degradation information DINFS. Here, the physical lane PHL for which use has been stopped by the information processing apparatus PDEV of the communication destination is any of the physical lanes PHLs0 to PHLs3 on the transmission side which transmits data. In addition, the information processing apparatus PDEV of the communication destination may stop the use of the physical lane PHLr on the reception side corresponding to the physical lane PHLs to be degraded on the transmission side, as well as any of the physical lanes PHLs on the transmission side. After step S316, the operation proceeds to step S322.

Meanwhile, in step S318, the link control unit LCLT transmits, to the information processing apparatus PDEV of a communication destination, a degradation lane specification request for determining the failure of the physical lane PHLs or the like through which data is transmitted to the information processing apparatus PDEV of the communication destination. For example, the degradation information generation unit DGEN outputs the degradation information DINFS for making a request for specification of a physical lane PHLs to be degraded to the information processing apparatus PDEV of the communication destination, and to the frame generation unit FGEN. Here, the physical lane PHLs through which data is transmitted to the information processing apparatus PDEV of the communication destination is a physical lane PHLr through which the data is received, in the information processing apparatus PDEV of the communication destination.

The information processing apparatus PDEV of the communication destination which has received the degradation lane specification request performs the process for specifying the physical lane PHLr to be degraded. The information processing apparatus PDEV of the communication destination which has specified the physical lane PHLr to be degraded transmits a degradation request packet DLLP including the degradation information DINFS indicating the physical lane PHLr to be degraded, to the information processing apparatus PDEV which is the request source of the lane degradation process. The information processing apparatus PDEV which is the request source of the lane degradation process is the information processing apparatus PDEV that has transmitted the degradation lane specification request packet DLLP. Thus, the frame reception unit FREC illustrated in FIG. 4 receives the degradation request packet DLLP which is a response to the degradation lane specification request packet DLLP, from the information processing apparatus PDEV of the communication destination. In addition, the information processing apparatus PDEV of the communication destination that has received the degradation lane specification request may specify the physical lanes PHLr to be degraded on the reception side, and the physical lanes PHLs on the transmission side corresponding to the physical lanes PHLr to be degraded, as degradation targets.

Next, in step S320, the degradation instruction unit DCLT receives the degradation information DINFS (degradation request) for requesting the degradation, as a result of the lane degradation process that is requested to the information processing apparatus PDEV of the communication destination in step S318. Thus, the lane selection unit LSEL can select a physical lane PHL and the like to be used for data transfer.

In step S322, the link control unit LCLT performs the lane degradation, and instructs the interface unit PHY to restart. For example, the lane selection unit LSEL outputs the enable signal LEN to stop the use of the physical lane PHLr (physical lane PHLr to be degraded) specified in step S314. In addition, the lane selection unit LSEL selects the physical lane PHLr through which data is received from the information processing apparatus PDEV of the communication destination, among the physical lanes PHLr other than the physical lane PHLr to be degraded, and outputs an enable signal LEN to enable the selected physical lane PHLr. In addition, the lane selection unit LSEL may output an enable signal LEN to stop the use of the physical lane PHLs to be degraded, as well as an enable signal LEN to stop the use of the physical lane PHLr.

Alternatively, the lane selection unit LSEL outputs the enable signal LEN to stop the use of the physical lane PHLs to be degraded that is included in the degradation information DINFS which is received in step S320. In this case, the lane selection unit LSEL may output an enable signal LEN to stop the use of the physical lane PHLr as well as the enable signal LEN to stop the use of the physical lane PHLs.

In addition, when the operation illustrated in FIG. 12 is performed after the degradation of the physical lane PHL is already performed, the physical lane PHL for which use has been stopped before the execution of the operation illustrated in FIG. 12 is not included in the selection target physical lane PHL. In this case, the selection target physical lane PHL is the physical lane PHL obtained by excluding the physical lanes PHL specified in step S314 (physical lane PHL to be degraded) from the physical lanes PHL that have been used before the execution of the operation illustrated in FIG. 12.

Further, the degradation instruction unit DCLT outputs a notification for instructing the restart of the interface unit PHY, to the start instruction unit SCLT. Then, the start instruction unit SCLT instructs the interface unit PHY to perform restart, in response to the instruction of the restart from the degradation instruction unit DCLT.

In addition, in the restart of the interface unit PHY which is performed during the degradation of the physical lane PHL, the contents which have been set in step S322 are taken over to the setting for enabling the physical lane PHL (the value of the enable signal LEN). Further, in the link-up after the restart of the interface unit PHY which is performed during the degradation of the physical lane PHL, since the physical lane PHL to be degraded is determined before the restart, the operation illustrated in FIG. 9 is not performed.

From the above, even when using the interface unit PHY without a function of specifying a failed lane, if fault is detected in the retransmission process, the frame transfer unit FTR can specify the physical lane PHL to be degraded after link-up, based on the error information EINF or the like.

The operation after the link-up of the information processing apparatus PDEV is not limited to this example. For example, the lane selection unit LSEL may specify the physical lane PHL to be degraded, based on the number of parity BIP errors at a time when fault in the retransmission process is detected, or immediately before or after the time.

Figure 13:
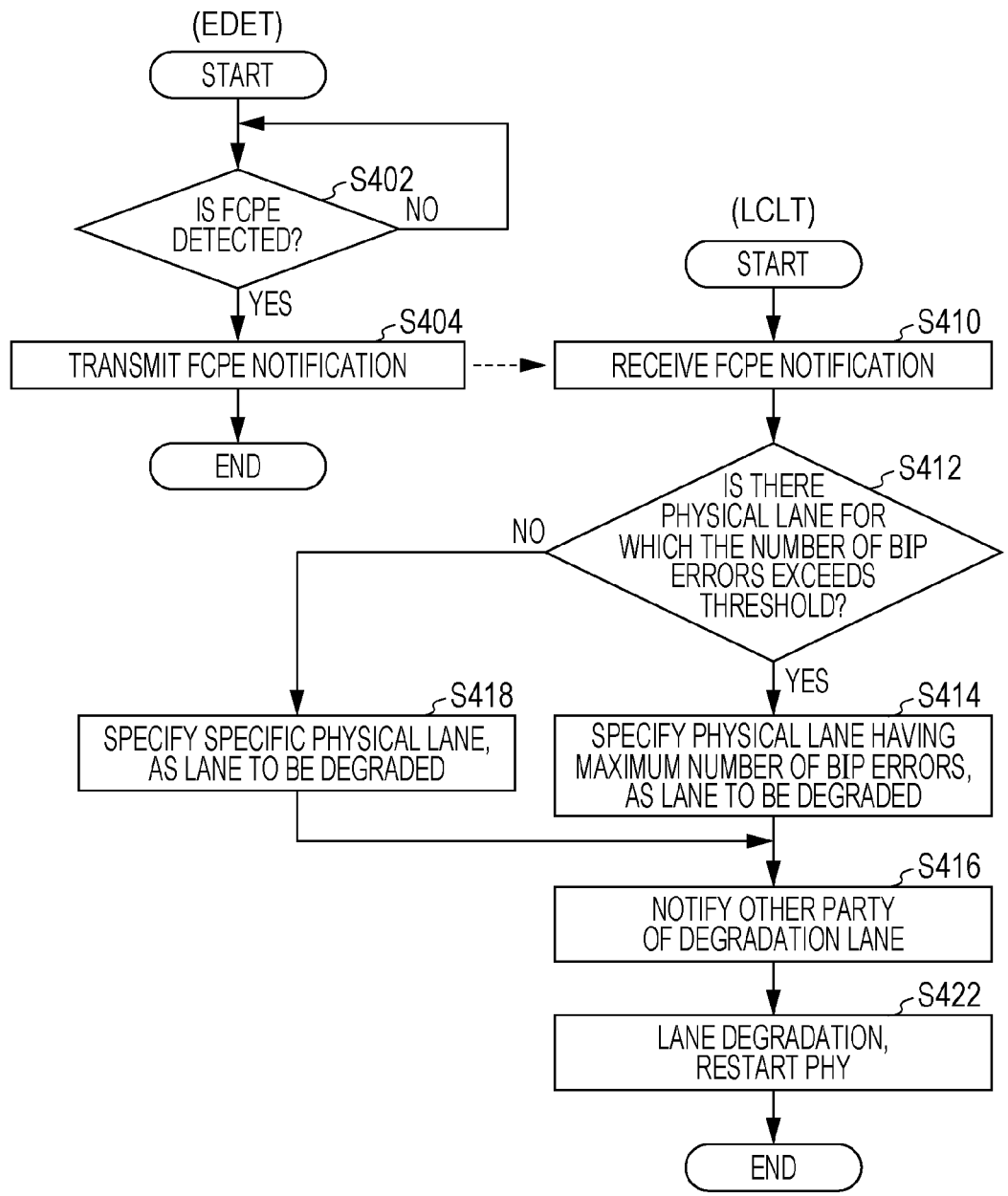
FIG. 13 is a diagram illustrating another example of the operation after link-up of the information processing apparatus illustrated in FIG. 2.

FIG. 13 illustrates another example of the operation of the information processing apparatus PDEV after the link-up illustrated in FIG. 2. In the operation illustrated in FIG. 13, if the fault in the flow control for transmitting data to the information processing apparatus PDEV of the communication destination (for example, "detection of the flow control protocol error" depicted in FIG. 6) is detected, the lane degradation is performed.

Both the information processing apparatuses PDEV1 and PDEV2 illustrated in FIG. 2 perform the operation illustrated in FIG. 13 independently of each other. The operation illustrated in FIG. 13 is performed by the frame transfer unit FTR illustrated in FIG. 4. In addition, the operation illustrated in FIG. 13 may be implemented only by hardware, or may be implemented by software such as the control program executed by the CPU mounted in the frame transfer unit FTR.

In FIG. 13, steps S402 and S404 correspond to the process of detecting the trigger of lane degradation, and are performed by the error detection unit EDET. Further, steps S410 to S422 are performed by the link control unit LCLT.

In step S402, the error detection unit EDET illustrated in FIG. 4 determines whether or not to detect the FCPE. For example, if the length of the period when the flow control frame (flow control information FINF) is not received exceeds the threshold (for example, 200 microseconds), the error detection unit EDET detects the occurrence of FCPE.

If the FCPE is detected, the operation of the error detection unit EDET proceeds to step S404. Meanwhile, if the FCPE is not detected, the operation of the error detection unit EDET returns to step S402. In other words, if fault has not occurred in the flow control, the error detection unit EDET continues the process of detecting the fault in the flow control.

In step S404, error detection unit EDET outputs FCPE notification FERR indicating that the fault has occurred in the flow control to the link control unit LCLT. As a result, link control unit LCLT, in step S410, receives the FCPE notification FERR.

In step S410, the degradation instruction unit DCLT of the link control unit LCLT illustrated in FIG. 5 receives the FCPE notification FERR from the error detection unit EDET, and starts the lane degradation process in the case where fault occurs in the flow control.

Next, in step S412, in the same manner as in step S312 illustrated in FIG. 12, the failure determination unit BJG illustrated in FIG. 5 determines whether or not there is a physical lane PHLr for which the number of parity BIP errors of data from the information processing apparatus PDEV of the communication destination exceeds a threshold within a predetermined period. If there is the physical lane PHLr for which the number of parity BIP errors exceeds the threshold, the occurrence of the FCPE is determined based on a failure of the physical lane PHLr or the like through which data is received from the information processing apparatus PDEV of the communication destination, and the operation of the link control unit LCLT proceeds to step S414. Meanwhile, even if there is no physical lane PHLr for which the number of parity BIP errors exceeds the threshold, it is determined that there is a high possibility of the occurrence of the FCPE based on a failure of the physical lane PHLr or the like through which data is received from the information processing apparatus PDEV of the communication destination. In this case, the operation of the link control unit LCLT proceeds to step S418. In addition, the threshold of step S412 may be the same value as the threshold of the step S204 of FIG. 11, or may be a different value therefrom.

In step S414, in the same manner as in step S314 illustrated in FIG. 12, the lane selection unit LSEL specifies the physical lane PHLr having the greatest number of parity BIP errors within the predetermined period, as the lane to be degraded. In addition, the lane selection unit LSEL may specify the physical lanes PHLr to be degraded on the reception side, and the physical lanes PHLs on the transmission side corresponding to the physical lanes PHLr to be degraded, as degradation targets. Here, the detection time interval of the FCPE (for example, 4.5 microseconds) is shorter as compared to the detection time interval of the parity BIP error (for example, 210 microseconds). Therefore, when the FCPE is detected based on a fixed failure, there is a concern that the history of the parity BIP errors (the number of parity BIP errors within a predetermined period) may not fully reflect the situation up to the detection of the FCPE. Therefore, if the physical lane PHLr to be degraded is specified based on the history of the parity BIP error, there is a concern that the specification accuracy of the physical lane PHLr to be degraded is reduced. Therefore, for example, when executing the process of steps S412 and S414, the lane selection unit LSEL refers to detection information (error information EINF) on the parity BIP errors at a time when FCPE is detected, or immediately before or after the time. After step S414, the operation proceeds to step S416.

Meanwhile, in step S418, since there is no difference in the number of the parity BIP errors between the physical lanes PHLr through which data is received, the lane selection unit LSEL specifies the specific physical lane PHLr as a lane to be degraded. For example, the specific physical lanes PHLr are selected according to a predetermined order. In addition, in step S418, if the number of parity BIP errors within the predetermined period is one or more and is a threshold or less, the lane selection unit LSEL may specify the physical lane PHLr having the greatest number of parity BIP errors within the predetermined period, as the physical lane PHL to be degraded. In addition, the lane selection unit LSEL may specify the physical lanes PHLr to be degraded on the reception side, and the physical lanes PHLs on the transmission side corresponding to the physical lanes PHLr to be degraded, as degradation targets.

After the operation illustrated in FIG. 13, when the FCPE is detected again, the degradation of the physical lane PHLr selected in step S418 in the previous operation is released, and in step S418, a new physical lane PHLr is selected. In other words, regardless of the detection of the FCPE, if there is no difference in the number of parity BIP errors, the physical lanes PHLr are alternately selected until the FCPE is no longer detected.

Next, in step S416, the frame transfer unit FTR transmits the degradation information DINFS indicating the physical lane PHL (physical lane PHL to be degraded) that has been specified in step S414 or step S418, as a packet DLLP, to the information processing apparatus PDEV of a communication destination. The operation of the step S416 is similar to the operation of step S208 illustrated in FIG. 11. The link control unit LCLT of the information processing apparatus PDEV of the communication destination which is notified of a degradation lane outputs an enable signal LEN to stop the use of the physical lane PHL which is indicated by the packet DLLP (degradation request) including the degradation information DINFS.

Next, in step S422, similar to step S210 illustrated in FIG. 11, the link control unit LCLT performs the lane degradation and instructs the restart of the interface unit PHY. For example, lane selection unit LSEL outputs an enable signal LEN to stop the use of the physical lane PHLr which is specified in step S414 or step S418 (physical lane PHLr to be degraded). Further, the lane selection unit LSEL selects the physical lane PHLr through which data is received from the information processing apparatus PDEV of the communication destination, among the physical lanes PHLr excluding physical lanes PHLr to be degraded, and outputs the enable signal LEN to enable the selected physical lane PHLr. Then, the frame transfer unit FTR restarts the interface unit PHY.

In addition, for example, when the operation illustrated in FIG. 13 is performed after the degradation of the physical lane PHL is already performed, the physical lane PHL for which use has been stopped before the execution of the operation of FIG. 13 is not included in the selection target physical lane PHL. In this case, the selection target physical lane PHL is the physical lane PHL obtained by excluding the physical lanes PHL specified in step S414 or step S418 (physical lane PHL to be degraded) from the physical lanes PHL that have been used before the execution of the operation of FIG. 13.

Further, the degradation instruction unit DCLT outputs a notification for instructing the restart of the interface unit PHY, to the start instruction unit SCLT. Then, the start instruction unit SCLT instructs the interface unit PHY to restart, in response to, for example, the instruction of the restart from the degradation instruction unit DCLT.

Thus, for example, if the fault in the flow control is detected, the lane selection unit LSEL selects the physical lane PHL for use in data transfer with the external device, based on the error information EINF.

In addition, in the restart of the interface unit PHY which is performed during the degradation of the physical lane PHL, the contents which have been set in step S422 are taken over to the setting for enabling the physical lane PHL (the value of the enable signal LEN). Further, in the link-up after the restart of the interface unit PHY which is performed during the degradation of the physical lane PHL, since the physical lane PHL to be degraded is determined before the restart, the operation illustrated in FIG. 9 is not performed.

From the above, even when using the interface unit PHY without a function of specifying a failed lane, if fault is detected in the flow control, the frame transfer unit FTR can specify the physical lane PHL to be degraded after link-up, based on the error information EINF or the like.

The operation after the link-up of the information processing apparatus PDEV is not limited to this example. For example, the process of step S418 may be omitted. In this case, for example, step S412 may be repeated until the parity BIP error is detected. In addition, in step S412, if there is no physical lane PHL having the number of parity BIP errors exceeding the threshold, the frame transfer unit FTR may execute the same operations as step S318 and S320 illustrated in FIG. 12, instead of step S418.

FIG. 14 illustrates another example of the operation of the information processing apparatus PDEV illustrated in FIG. 2 after the link-up. In the operation illustrated in FIG. 14, the degradation of the physical lane PHLs is performed if the degradation request for the physical lane PHLs is received from the information processing apparatus PDEV of a communication destination that has detected the trigger of the degradation of the physical lane PHLr. Alternatively, the degradation of the physical lane PHLr is performed if the degradation lane specification request for desiring the degradation of the failed physical lane PHLr is received from the information processing apparatus PDEV of a communication destination.

Both the information processing apparatuses PDEV1 and PDEV2 illustrated in FIG. 2 perform the operation illustrated in FIG. 14 independently of each other. In FIG. 14, steps S502 and S504 correspond to the process of detecting trigger for lane degradation, and are performed by the frame reception unit FREC illustrated in FIG. 4. In addition, steps S510 to S522 are performed by the link control unit LCLT illustrated in FIG. 4 and FIG. 5. In addition, the operation illustrated in FIG. 14 may be implemented only by hardware, or may be implemented by software such as the control program performed by the CPU mounted in the frame transfer unit FTR.

In step S502, the frame reception unit FREC determines whether or not the control packet DLLP including the degradation information DINFR is received. The degradation information DINFR included in the control packet DLLP is a degradation request packet DLLP for indicating the physical lane PHL to be degraded or a degradation lane specification request packet DLLP instructing the detection of the physical lane PHL to be degraded.

When the degradation request packet DLLP or the degradation lane specification request packet DLLP is received, the operation of the frame reception unit FREC proceeds to step S504. Meanwhile, when either the degradation request packet DLLP or the degradation lane specification request packet DLLP is not received, the operation of the frame reception unit FREC returns to step S502.

In step S504, the frame reception unit FREC outputs the degradation information DINFR that is included in the degradation request packet DLLP or the degradation lane specification request packet DLLP which is received in step S502, to the link control unit LCLT illustrated in FIG. 4. As a result, the link control unit LCLT receives the degradation information DINFR, in step S510.

In step S510, the degradation instruction unit DCLT of the link control unit LCLT receives the degradation information DINFR from the frame reception unit FREC. As a result, the link control unit LCLT starts a lane degradation process when a trigger of the lane degradation is detected in the information processing apparatus PDEV of a communication destination.

Next, in step S511, the degradation instruction unit DCLT determines whether or not the degradation information DINFR received in step S510 indicates the degradation lane specification request instructing the detection of a physical lane PHLr to be degraded. When the degradation information DINFR indicates a degradation lane specification request, the operation of the link control unit LCLT proceeds to step S512. Meanwhile, when the degradation information DINFR is not the degradation lane specification request (in other words, in the case of a degradation request indicating the physical lane PHL to be degraded), the operation of the link control unit LCLT proceeds to step S522.

Next, in step S512, in the same manner as in step S204 illustrated in FIG. 11, the failure determination unit BJG determines whether or not there is a physical lane PHLr for which the number of parity BIP errors of data that is received from the information processing apparatus PDEV of the communication destination exceeds a threshold within a predetermined period. In addition, the link control unit LCLT measures the number of parity BIP errors within a predetermined period, by using, for example, the error counter ECT for each physical lane PHL, in parallel with the operation illustrated in FIG. 14. For example, the number of parity BIP errors of each physical lane PHL within the predetermined period is calculated in step S202 of FIG. 11.

If there is the physical lane PHLr having the number of parity BIP errors exceeding the threshold, the operation of the link control unit LCLT proceeds to step S514. Meanwhile, if there is no physical lane PHLr having the number of parity BIP errors exceeding the threshold, the operation of the link control unit LCLT proceeds to step S518. In addition, the threshold of step S512 may be the same value as the threshold of the step S204 in FIG. 11, or may be a different value therefrom.

In step S514, in the same manner as in step S314 illustrated in FIG. 12, the lane selection unit LSEL illustrated in FIG. 5 specifies the physical lane PHLr having the greatest number of parity BIP errors within the predetermined period, as the lane to be degraded. In addition, the lane selection unit LSEL may specify the physical lane PHLr to be degraded on the reception side and the physical lane PHLs on the transmission side corresponding to the physical lane PHLr to be degradation, as degradation targets. After the step S514, the operation proceeds to step S520.

Meanwhile, in step S518, in the same manner as in step S418 illustrated in FIG. 13, since there is no difference in the number of the parity BIP errors between the physical lanes PHLr through which data is received, the lane selection unit LSEL specifies the specific physical lane PHLr as a lane to be degraded. For example, the specific physical lanes PHLr are selected according to a predetermined order. In addition, in step S518, if the number of parity BIP errors within the predetermined period is one or more and is a threshold or less, the lane selection unit LSEL may specify the physical lane PHLr having the greatest number of parity BIP errors within the predetermined period, as the lane to be degraded. In addition, lane selection unit LSEL may specify the physical lanes PHLr to be degraded on the reception side, and the physical lanes PHLs corresponding to the physical lanes PHLr to be degraded on the transmission side, as degradation targets.

Next, in step S520, the frame transfer unit FTR transmits the degradation information DINFS indicating the physical lane PHL (physical lane PHL to be degraded) that has been specified in step S514 or step S518, as a packet DLLP, to the information processing apparatus PDEV of a communication destination. The operation of step S520 is similar to the operation of step S208 illustrated in FIG. 11. The link control unit LCLT of the information processing apparatus PDEV of the communication destination which is notified of the lane to be degraded outputs the enable signal LEN to stop the use of the physical lane PHL which is indicated by the packet DLLP (degradation request) including the degradation information DINFS.

In step S522, in the same manner as in step S210 illustrated in FIG. 11, the link control unit LCLT performs the lane degradation, and instructs the interface unit PHY to restart. For example, the lane selection unit LSEL outputs the enable signal LEN to stop the use of the physical lane PHL (physical lane PHL to be degraded) specified in step S514 or step S518. In addition, the lane selection unit LSEL selects the physical lane PHL through which data is received or transmitted, among the physical lanes PHLr excluding the physical lane PHL to be degraded, and outputs an enable signal LEN to enable the selected physical lane PHL.

Alternatively, the lane selection unit LSEL outputs the enable signal LEN to stop the use of the physical lane PHL for which degradation is specified, and which is included in the degradation request packet DLLP which has been received in step S510. In addition, the lane selection unit LSEL selects the physical lane PHL through which data is transmitted or received to or from the information processing apparatus PDEV of the communication destination, among the physical lanes PHL other than the physical lane PHL to be degraded, and outputs an enable signal LEN to enable the selected physical lane PHL. Then, the frame transfer unit FTR restarts the interface unit PHY.

In addition, for example, when the operation illustrated in FIG. 14 is performed after the degradation of the physical lane PHL is already performed, the physical lane PHL for which use has been stopped before the execution of the operation of FIG. 14 is not included in the selection target physical lane PHL. In this case, the selection target physical lane PHL is the physical lane PHL obtained by excluding the physical lanes PHL specified in step S514 or step S518 (physical lane PHL to be degraded) from the physical lanes PHL that have been used before the execution of the operation of FIG. 14.

Further, the degradation instruction unit DCLT outputs a notification for instructing the restart of the interface unit PHY, to the start instruction unit SCLT. Then, the start instruction unit SCLT instructs the interface unit PHY to perform restart, in response to, for example, the instruction of the restart from the degradation instruction unit DCLT.

In addition, in the restart of the interface unit PHY which is performed during the degradation of the physical lane PHL, the contents which have been set in step S522 are taken over to the setting for enabling the physical lane PHL (the value of the enable signal LEN). Further, in the link-up after the restart of the interface unit PHY which is performed during the degradation of the physical lane PHL, since the physical lane PHL to be degraded is determined before the restart, the operation illustrated in FIG. 9 is not performed.

From the above, even when using the interface unit PHY without a function of specifying a failed lane, the frame transfer unit FTR can specify the physical lane PHLr to be degraded after link-up, based on the reception of the degradation lane specification request. Further, the information processing apparatus PDEV of the request source can be notified of the information indicating the physical lane PHLr for which degradation is specified. Alternatively, even when using the interface unit PHY without a function of specifying a failed lane, the frame transfer unit FTR can perform the degradation of the physical lane PHLs after link-up, based on the reception of the degradation request.

The operation after the link-up of the information processing apparatus PDEV is not limited to this example. For example, the process of step S518 may be omitted. In this case, for example, step S512 may be repeated until the parity BIP error is detected. In addition, in step S512, if there is no physical lane PHL having the number of parity BIP errors exceeding the threshold, the frame transfer unit FTR may execute the same operations as step S318 and S320 illustrated in FIG. 12, instead of step S518.

From the above, even when using the interface unit PHY without a function of specifying a failed lane, the frame transfer unit FTR can cause the physical lane PHL to be degraded after link-up by referring to the error information EINF or the like for indicating an error in the reception data.

For example, the frame transfer unit FTR performs the processes of detecting the trigger of lane degradation such as steps S200 to S204 in FIG. 11, steps S302 to S304 in FIG. 12, steps S402 to S404 in FIG. 13, and steps S502 to S504 in FIG. 14, in parallel to each other. In this case, since the physical lane PHL to be degraded is specified when any of a plurality of triggers of lane degradation is detected, the frame transfer unit FTR can efficiently specify the physical lane PHL to be degraded.

In addition, the frame transfer unit FTR may omit a part of the process of detecting the trigger of lane degradation illustrated in FIG. 11 to FIG. 14. For example, the frame transfer unit FTR may omit "the number of BIP errors within predetermined period exceeds threshold" depicted in FIG. 6 from the triggers of lane degradation. Alternatively, "deterioration of bit error", "detection of retry-out", "detection of flow control protocol error" and "switching to low power mode" depicted in FIG. 6 may be omitted from the triggers of lane degradation.

FIG. 15 illustrates an example of a specification method of a physical lane PHL to be degraded, in the operation after link-up illustrated in FIGS. 11 to 14. "Presence" and "absence" which are depicted in the area of the parity BIP error illustrated in FIG. 15 are examples of a detection result of the parity BIP error when a part of period is excerpted from a predetermined period (for example, 80 milliseconds).

Furthermore, a threshold for determining whether or not the physical lane PHL is the physical lane PHL to be degraded is, for example, "3".

In the example illustrated in FIG. 15, the total numbers of respective parity BIP errors of five PCS lanes PLr which are detected during the past 80 ms are "5", "1", "2", "4", in the respective physical lanes PHLr0, PHLr1, PHLr2, and PHLr3. For this reason, for example, in step S206 illustrated in FIG. 11, the lane selection unit LSEL specifies the physical lanes PHLr0 and PHLr3 for which the number of parity BIP errors within the predetermined period exceeds the threshold (="3"), as the lane to be degraded. The physical lanes PHLr1 and PHLr2 are determined as the normal physical lane PHLr. Alternatively, in step S314 illustrated in FIG. 12, in step S414 illustrated in FIG. 13, and in step S514 illustrated in FIG. 14, the lane selection unit LSEL specifies the physical lane PHLr0 having the greatest number of parity BIP errors within the predetermined period, as the lane to be degraded. The physical lanes PHLr1 to PHLr3 are determined to be the normal physical lane PHLr. In this manner, the lane selection unit LSEL specifies the physical lane PHL to be degraded, based on the error information EINF indicating that there is an error in the data which is transferred from the information processing apparatus PDEV of a communication destination to the interface unit PHY.

Figure 16:
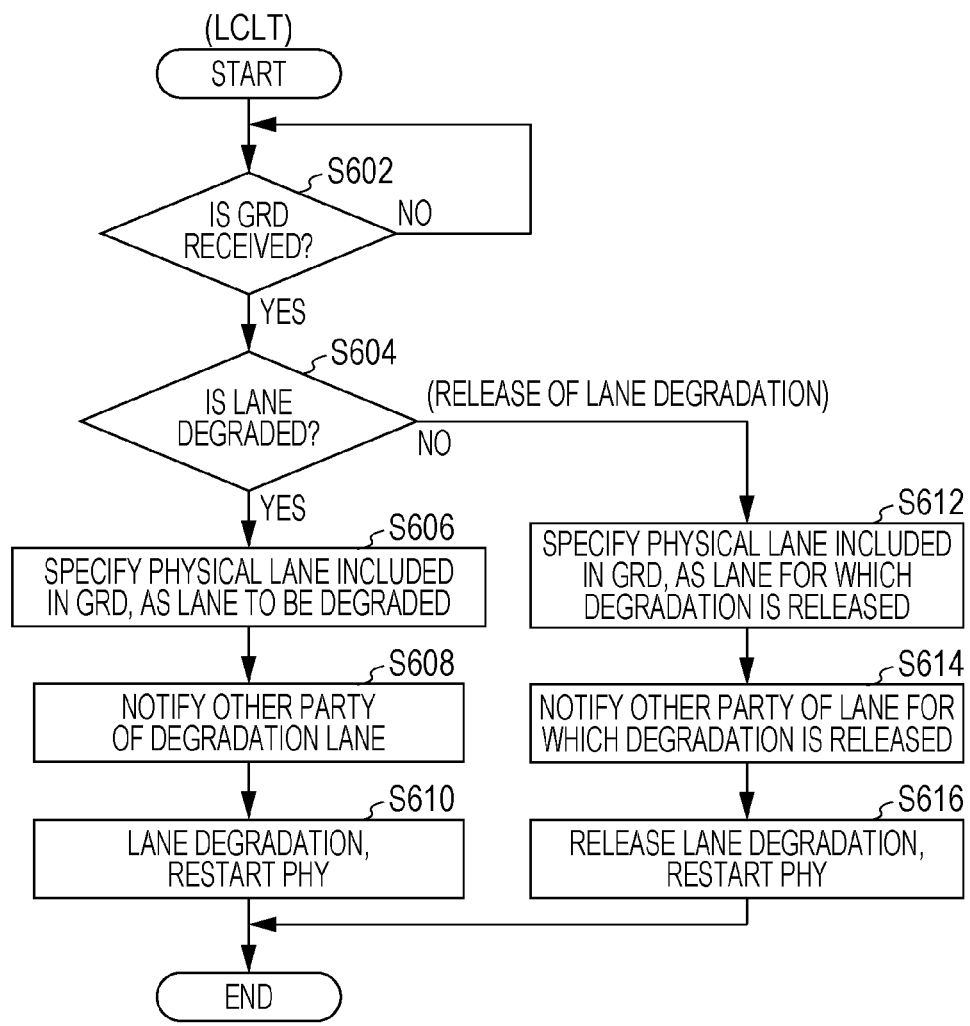
FIG. 16 is a diagram illustrating another example of the operation of the information processing apparatus illustrated in FIG. 2.

FIG. 16 illustrates another example of the operation of the information processing apparatus PDEV illustrated in FIG. 2. In the operation of FIG. 16, the lane degradation or the release of lane degradation is performed based on the reception of switching notification GRD from the CPU.

Both the information processing apparatuses PDEV1 and PDEV2 illustrated in FIG. 2 perform the operation illustrated in FIG. 16 independently of each other. The operation illustrated in FIG. 16 is performed by the link control unit LCLT illustrated in FIG. 4 and FIG. 5. In addition, the operation illustrated in FIG. 16 may be implemented only by hardware, or may be implemented by software such as the control program performed by the CPU mounted in the frame transfer unit FTR.

In step S602, the degradation instruction unit DCLT determines whether or not the switching notification GRD is received from the CPU mounted in the frame transfer unit FTR and the information processing apparatus PDEV. If the switching notification GRD is received, the operation proceeds to step S604, and if the switching notification GRD is not received, the operation returns to step S602.

In step S604, the degradation instruction unit DCLT determines whether or not information indicating the physical lane PHL to be degraded is included in the switching notification GRD. If the information indicating the physical lane PHL to be degraded is included in the switching notification GRD, the degradation instruction unit DCLT notifies the lane selection unit LSEL of information indicating the physical lane PHL to be degraded, and the operation proceeds to step S606. If the information indicating the physical lane PHL to be degraded is not included in the switching notification GRD, information indicating an instruction to release the degraded physical lane PHL is included in the switching notification GRD. For this reason, the degradation instruction unit DCLT notifies the lane selection unit LSEL of information indicating an instruction to release the degraded physical lane PHL. Then, the operation proceeds to step S612.

In addition, the information included in the switching notification GRD indicates the physical lane PHLr through which data is received from the information processing apparatus PDEV of a communication destination or the physical lane PHLs through which data is transmitted to the information processing apparatus PDEV of a communication destination. In addition, the information included in the switching notification GRD may indicate both the physical lanes PHLr and PHLs. The information included in the switching notification GRD is determined according to the specification of the physical lanes PHLr and PHLs to be degraded in the low power mode. In addition, the CPU which outputs the switching notification GRD may be the CPU of one of the information processing apparatuses PDEV1 and PDEV2 illustrated in FIG. 2.

In step S606, the lane selection unit LSEL specifies the physical lane PHL that is included in the switching notification GRD as the physical lane PHL to be degraded.

Next, in step S608, the frame transfer unit FTR transmits the degradation information DINFS indicating the physical lane PHL specified in step S606 as a packet DLLP, to the information processing apparatus PDEV of a communication destination. The link control unit LCLT of the information processing apparatus PDEV of a communication destination outputs the enable signal LEN to stop the use of the physical lane PHL indicated by the packet DLLP (degradation request) including the degradation information DINFS.

Next, in step S610, in the same manner as in step S160 illustrated in FIG. 9, the link control unit LCLT outputs the enable signal LEN so as to cause the interface unit PHY to perform the lane degradation, instructs the interface unit PHY to restart, and ends the operation.

Meanwhile, in step S612, the lane selection unit LSEL specifies the physical lane PHL that is included in the switching notification GRD, as the lane for which the degradation is released.

Next, in step S614, the frame transfer unit FTR transmits the degradation information DINFS indicating the physical lane PHL for which the release of the degradation is specified in step S612 as packet DLLP, to the information processing apparatus PDEV of the communication destination. The link control unit LCLT of the information processing apparatus PDEV of the communication destination outputs an enable signal LEN to restart the use of the physical lane PHL indicated by the packet DLLP (degradation request) including the degradation information DINFS. An example in which the information processing apparatus PDEV of the communication destination restarts the use of the physical lane PHL (in other words, the release of the degradation of the physical lane PHL) is illustrated in FIG. 17.

Next, in step S616, the link control unit LCLT causes the interface unit PHY to perform a process for releasing the degradation of the physical lane PHL, by outputting the enable signal LEN. Further, the link control unit LCLT, in the same manner as in step S160 illustrated in FIG. 9, instructs the interface unit PHY to restart and ends the operation.

In addition, as illustrated in FIGS. 7 and 8, when the information processing apparatus PDEV which is executing the lane degradation restoration process detects the timeout and the like due to non-detection of the alignment marker AM, the restoration process is interrupted, and the degradation process of returning the physical lane PHL to the original degradation state is performed.

Figure 17:
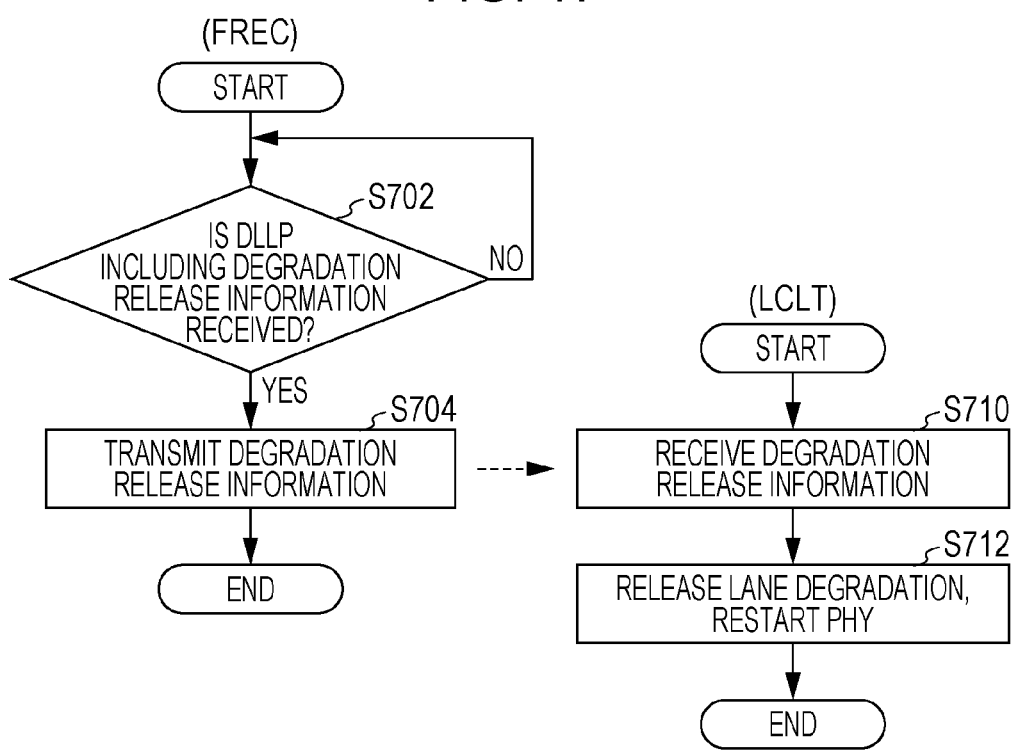
FIG. 17 is a diagram illustrating another example of the operation of the information processing apparatus illustrated in FIG. 2.

FIG. 17 illustrates another example of the operation of the information processing apparatus PDEV illustrated in FIG. 2. FIG. 17 illustrates an operation in which the information processing apparatus PDEV of the communication destination receives the packet DLLP including the degradation information DINFS indicating the physical lane PHL of which the degradation is to be released, and restores the degraded physical lane PHL.

First, in step S702, the frame reception unit FREC determines whether or not the control packet DLLP (command DGRD_REQ illustrated in FIG. 7) including the degradation release information DINFR for releasing the degradation is received. If the control packet DLLP including the degradation release information DINFR is received, the operation of the frame reception unit FREC proceeds to step S704. Meanwhile, the control packet DLLP including the degradation release information DINFR is not received, the operation of the frame reception unit FREC returns to step S702.

In step S704, the frame reception unit FREC outputs the control packet DLLP that has been received in step S702 to the link control unit LCLT illustrated in FIG. 4. As a result, the link control unit LCLT, in step S710, receives the control packet DLLP including the degradation release information DINFR. The link control unit LCLT starts the process of restarting the use of the degraded physical lane PHL.

Next, in step S712, the link control unit LCLT releases the degradation of the degraded physical lane PHL based on the degradation release information DINFR, and instructs the interface unit PHY to restart. For example, the lane selection unit LSEL outputs the enable signal LEN corresponding to the physical lane PHL for which the degradation is released. Then, the operation for releasing the degradation of the physical lane PHL is ended.

In addition, as illustrated in FIGS. 7 and 8, when the information processing apparatus PDEV which is executing the lane degradation restoration process detects the timeout and the like due to non-detection of the alignment marker AM, the restoration process is interrupted, and the degradation process of returning the physical lane PHL to the original degradation state is performed.

FIG. 18 illustrates an example of the degradation control packet DLLP to be used for lane degradation and releasing of the degraded lane. The degradation control packet DLLP has an area for storing the type of packet DLLP, degradation information on the physical lane PHLs on the transmission side, degradation information on the physical lane PHLr on the reception side, and credit information indicating a free space of the buffer unit RBUF.

The degradation information on the physical lane PHLs on the transmission side and the degradation information on the physical lane PHLr on the reception side are determined with the information processing apparatus PDEV that transmits the degradation control packet DLLP as a reference. For example, when the information processing apparatus PDEV transmits the degradation control packet DLLP instructing the degradation of the physical lane PHLr through which data is received, to the information processing apparatus PDEV of a communication destination, the degradation information is stored in the area of the physical lane PHLr on the reception side.

Figure 19:
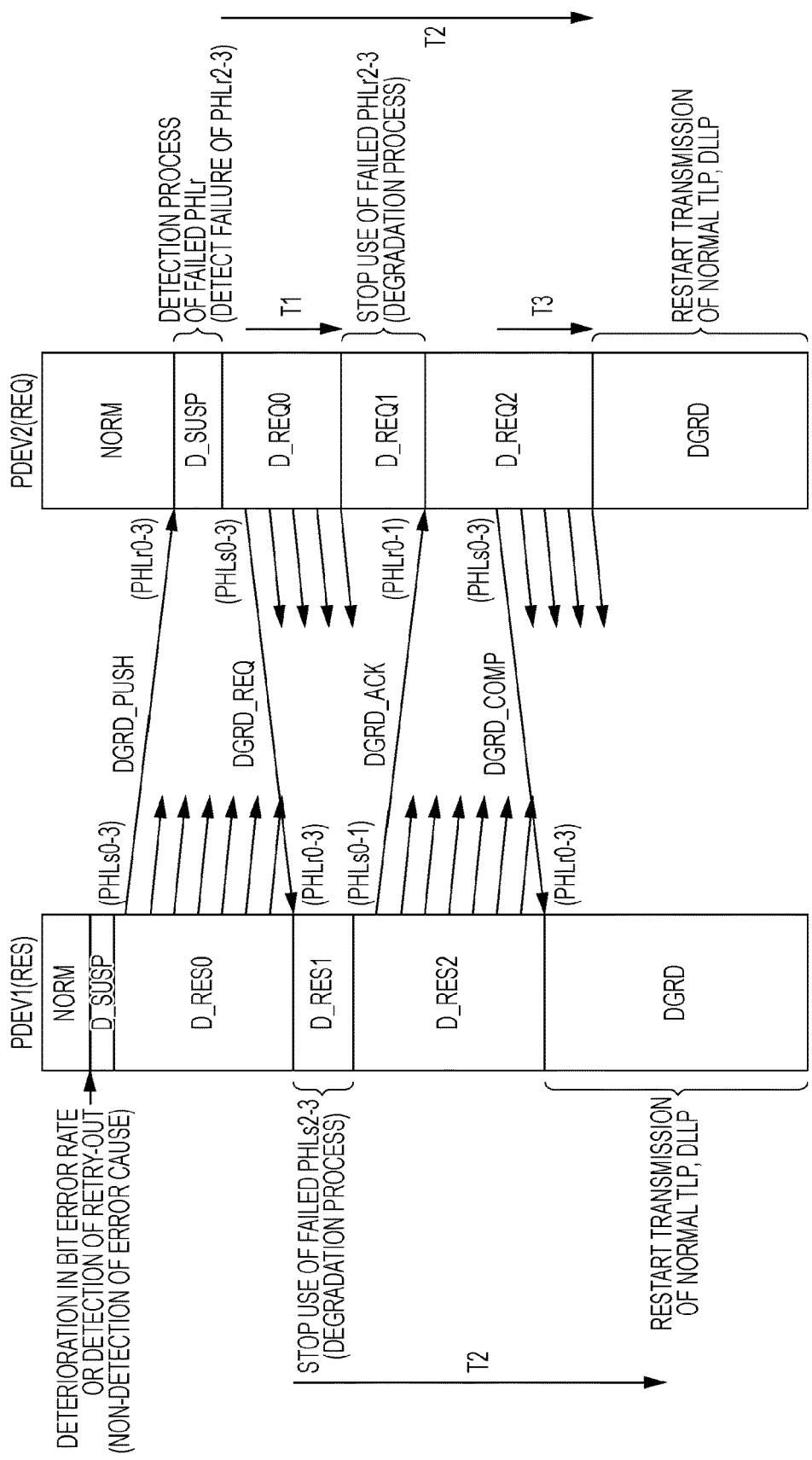
FIG. 19 is a diagram illustrating an example of an operation of the information processing system when a request for specification of a physical lane to be degraded is made to an information processing apparatus of a communication destination (degradation lane specification request).

The area of the type of the packet DLLP stores any of information pieces for identifying commands DGRD_PUSH, DGRD_REQ, DGRD_ACK, and DGRD_COMP, which are illustrated in FIG. 19 or the like. The command DGRD_PUSH is used to make a request for the specification of the physical lane PHLs to be degraded, to the information processing apparatus PDEV of a communication destination (degradation lane specification request). The command DGRD_REQ is used to make a request for the degradation of the physical lane PHLr, to the information processing apparatus PDEV of a communication destination (degradation request). In addition, the command DGRD_REQ is used to make a request for the degradation of the physical lane PHL, to the information processing apparatus PDEV of a communication destination, in order to switch the operation mode from the normal operation mode to the low power mode (degradation request). In addition, the command DGRD_REQ is used to make a request for the release of the degradation of the physical lane PHL, to the information processing apparatus PDEV of a communication destination, in order to switch the operation mode from the low power mode to the normal operation mode (restoration request).

The command DGRD_ACK is used to notify the information processing apparatus PDEV of the issuer of the command DGRD_REQ of the completion of the degradation or the completion of the release of degradation of the physical lane PHL. The command DGRD_COMP is used to notify the information processing apparatus PDEV of the issuer of the command DGRD_ACK of the response of the reception of the command DGRD_ACK. Examples of the use of the commands DGRD_PUSH, DGRD_REQ, DGRD_ACK, and DGRD_COMP are illustrated in FIG. 19 to FIG. 26.

The degradation information area of the physical lane PHLs has a degradation information area for lane failure, with an element as a failure in the physical lane PHL, and a degradation information area for an operation mode, with an element as an operation mode (low power mode). Each degradation information area has a flag area in which logic 0 is set for degradation and logic 1 is set for non-degradation, for each of the physical lanes PHLs0 to PHLs3.

The degradation information area of the physical lane PHLr on the reception side has a degradation information area for a lane failure, with an element as a failure in the physical lane PHL, and a degradation information area for an operation mode, with an element as an operation mode (low power mode). Each degradation information area has a flag area in which logic 0 is set for degradation and logic 1 is set for non-degradation, for each of the physical lanes PHLr0 to PHLr3. The cause of a failure in the physical lane PHL includes a failure in the PCS lane PL corresponding to each physical lane PHL, and a failure in circuits and components connected to the physical lane PHL or the PCS lane PL, in addition to the failure in the physical lane PHL itself.

In addition, the degradation information area, with an element as a failure in the physical lane PHL, and the degradation information area, with an element as an operation mode (low power mode) may be shared in the degradation information area of the physical lane PHLs on the transmission side and the degradation information area of the physical lane PHLr on the reception side. Further, the degradation control packet DLLP may not include an area for storing credit information.

FIG. 19 illustrates an example of an operation of the information processing system SYS1 when making a request for specification of a degraded physical lane PHLs to be degraded to the information processing apparatus PDEV of a communication destination (degradation lane specification request). In FIG. 19, the information processing apparatus PDEV1 illustrated in FIG. 2 issues a degradation lane specification request to the information processing apparatus PDEV2. In other words, the information processing apparatus PDEV1 operates as the responder RES, and the information processing apparatus PDEV2 operates as the requester REQ. The states of the state machine SM illustrated in FIGS. 7 and 8 are represented in the frames representing the information processing apparatuses PDEV1, PDEV2. In FIG. 19, an aspect of transmission and reception of each of the commands DGRD_PUSH, DGRD_REQ, DGRD_ACK, and DGRD_COMP between the information processing apparatuses PDEV1, PDEV2 is illustrated, and an aspect of transmission and reception of the alignment marker AM is omitted.

In addition, the operation performed in the case where the information processing apparatus PDEV2 operates as a responder RES and issues a degradation lane specification request (DGRD_PUSH) to the information processing apparatus PDEV1 is implemented by replacing the reference numerals PDEV1, PDEV2 with each other. In the following description, the degradation control packet DLLP using commands DGRD_PUSH, DGRD_REQ, DGRD_ACK or DGRD_COMP are referred to as commands DGRD_PUSH, DGRD_REQ, DGRD_ACK or DGRD_COMP.

For example, although deterioration in a bit error rate or retry-out is determined, when the number of BIP errors does not exceed the threshold and the cause of an error is not found, the information processing apparatus PDEV1 transmits the command DGRD_PUSH to the information processing apparatus PDEV2. When the timer TM2 (FIG. 5) of the information processing apparatus PDEV1 starts the measurement of the predetermined time T2 at the time of transition to the state D_RES1. When the timer TM2 of the information processing apparatus PDEV2 starts the measurement of the predetermined time T2 at the time of transition to the state D_REQ0.

For example, a dummy value (for example, logic 1) is stored in the degradation information area of the physical lane PHLs and the degradation information area of the physical lane PHLr, which are included in the packet DLLP of the command DGRD_PUSH (FIG. 18). The command DGRD_PUSH is repeatedly transmitted until the command DGRD_PUSH is received from the information processing apparatus PDEV2. For example, the command DGRD_PUSH is transmitted in step S318 illustrated in FIG. 12.

Next, the information processing apparatus PDEV2 that has received the command DGRD_PUSH detects, for example, a failure in the physical lanes PHLr2 to PHLr3, by comparing the number of parity BIP errors of the physical lane PHLr through which data is received from the information processing apparatus PDEV1 with a threshold. The example of the operation of the information processing apparatus PDEV2 that receives the command DGRD_PUSH is illustrated in steps S512, S514, and S518 of FIG. 14 (a process of degradation lane specification request). In addition, the information processing apparatus PDEV2 ignores the reception of the second and subsequent command DGRD_PUSH.

The information processing apparatus PDEV2 notifies the information processing apparatus PDEV1 of information indicating the detected physical lanes PHLr2 and PHLr3, using the command DGRD_REQ. The command DGRD_REQ is repeatedly transmitted, until a predetermined time T1 has elapsed. For example, logic "1" indicating no degradation is stored in an area indicating the physical lanes PHLr0 and PHLr1, in the degradation information area of the physical lane PHLr which is included in the packet DLLP (FIG. 18) of the command DGRD_REQ. Logic "0" indicating degradation is stored in an area indicating the physical lanes PHLr2 and PHLr3. Meanwhile, a dummy (for example, information indicating the current degradation situation) is stored in the degradation information area of the physical lane PHLs which is included in the packet DLLP of the command DGRD_REQ (FIG. 18).

After repeating the transmission of command DGRD_REQ until a predetermined time T1 has elapsed, the information processing apparatus PDEV2 generates an enable signal LEN corresponding to the failure-detected physical lanes PHLr2 and PHLr3. Then, the information processing apparatus PDEV2 performs the degradation process of stopping the use of the failure-detected physical lanes PHLr2 and PHLr3. In addition, as illustrated in FIG. 5, the lane selection unit LSEL of the information processing apparatus PDEV2 outputs the stop signal PCSSTP to the PCS before changing the register REG in order to generate the enable signal LEN, and causes the PCS to stop the data transmission operation and data reception operation. In addition, the lane selection unit LSEL outputs the start signal PCSSTT to the PCS after changing the register REG and stopping the use of the physical lanes PHLr2 and PHLr3, and causes the PCS to start the data transmission operation and data reception operation.

For example, the information processing apparatus PDEV2 performs the operation illustrated in FIG. 11, based on the reception of the command DGRD_PUSH, and the detection of a failure in the physical lane PHLr, the degradation of the physical lane PHLr, and an operation of notifying the information processing apparatus PDEV1 of the degraded physical lane PHLr. Step S208 in FIG. 11 is performed using the command DGRD_REQ.

The information processing apparatus PDEV1 that has received the command DGRD_REQ ends the transmission of the command DGRD_PUSH. The information processing apparatus PDEV1 detects the physical lanes PHLr2 and PHLr3 for which use is stopped by the information processing apparatus PDEV2, from the information that is included in the command DGRD_REQ. Then, the information processing apparatus PDEV1 performs a degradation process of stopping the use of physical lanes PHLs2 and PHLs3 corresponding to the physical lanes PHLr2 and PHLr3 for which use is stopped by the information processing apparatus PDEV2. In addition, as illustrated in FIG. 5, the lane selection unit LSEL of the information processing apparatus PDEV1 outputs the stop signal PCSSTP to the PCS before changing the register REG in order to generate the enable signal LEN, and causes the PCS to stop the data transmission operation and data reception operation. In addition, the lane selection unit LSEL outputs the start signal PCSSTT to the PCS after changing the register REG and stopping the use of the physical lanes PHLr2 and PHLr3, and causes the PCS to start the data transmission operation and data reception operation.

The information processing apparatus PDEV1 restarts the interface unit PHY after the degradation process, and transmits the command DGRD_ACK indicating the completion of the degradation process to the information processing apparatus PDEV2, by using the physical lanes PHLr0 and PHLr1 that are successively used, after the restart is completed. The command DGRD_ACK is repeatedly transmitted from the information processing apparatus PDEV2 until the reception of a command DGRD_COMP. In addition, in the example illustrated in FIG. 19, the information processing apparatus PDEV1 does not issue the timeout illustrated in FIG. 7, in order to successfully detect the alignment markers AM corresponding to all of the PCSs before the predetermined time T2 has elapsed, in the state D_RES1.

For example, a dummy value (for example, information indicating the current degradation state) is stored in the degradation information area of the physical lane PHLs and the degradation information area of the physical lane PHLr, which are included in the packet DLLP (FIG. 18) of the command DGRD_ACK. The degradation process of the physical lane PHLr and the restart process of the interface unit PHY by the information processing apparatus PDEV1 are performed by step S522 illustrated in FIG. 14.

The information processing apparatus PDEV2 that has received the command DGRD_ACK transmits the command DGRD_COMP indicating the completion of the degradation process, to the information processing apparatus PDEV1. In addition, in the example illustrated in FIG. 19, the information processing apparatus PDEV2 does not issue the timeout illustrated in FIG. 7, in order to successfully receive the command DGRD_ACK before the predetermined time T2 has elapsed, in the state D_REQ1.

In addition, a failure is not detected in the physical lanes PHLs0 to PHLs3 through which data is transmitted from the information processing apparatus PDEV2 to the information processing apparatus PDEV1. For this reason, the information processing apparatus PDEV2 transmits the command DGRD_COMP, using all of the physical lanes PHLs0 to PHLs3. The command DGRD_COMP is repeatedly transmitted, until a predetermined time T3 has elapsed. For example, a dummy value (for example, information indicating the current degradation state) is stored in the degradation information area of the physical lane PHLs and the degradation information area of the physical lane PHLr, which are included in the packet DLLP (FIG. 18) of the command DGRD_COMP.

The information processing apparatus PDEV2 that has completed the transmission of the command DGRD_COMP restarts the transmission of a normal packet (transaction layer packet: TLP) and a control packet DLLP. Similarly, the information processing apparatus PDEV1 that has received the command DGRD_COMP restarts the transmission of the normal packet TLP and the control packet DLLP. Here, the information processing apparatus PDEV1 does not issue the timeout illustrated in FIG. 7, in order to successfully receive the command DGRD_COMP before the predetermined time T2 has elapsed, in the state D_RES2.

In addition, the information processing apparatus PDEV2 may execute a degradation process of stopping the use of the failure-detected physical lanes PHLr2 and PHLr3, and the physical lanes PHLs2 and PHLs3 on the transmission side corresponding to the physical lanes PHLr2 and PHLr3, after elapse of a predetermined time T1. In this case, the information processing apparatus PDEV1 that has received the command DGRD_REQ performs the degradation process of stopping the use of the physical lanes PHLr2 and PHLr3 corresponding to the physical lanes PHLs2 and PHLs3 for which use is stopped. Then, the command DGRD_COMP is transmitted using the physical lanes PHL0 and PHL1 other than the degraded physical lanes PHL2 and PHL3.

Figure 20:
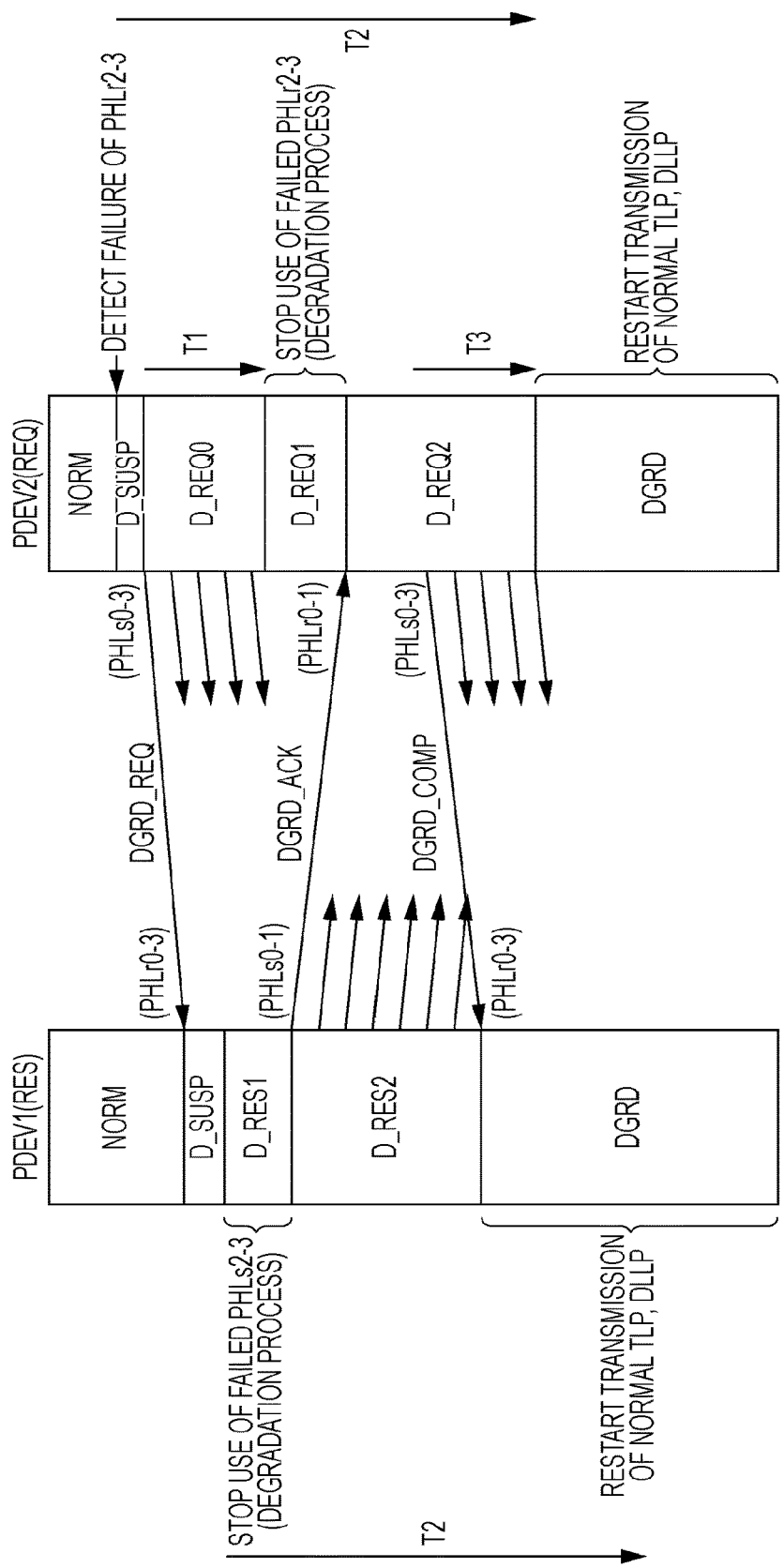
FIG. 20 is a diagram illustrating an example of an operation of the information processing system when an information processing apparatus that has detected a failure in a physical lane notifies the information processing apparatus of the communication destination of a physical lane to be degraded (degradation request).

FIG. 20 illustrates an example of an operation of the information processing system SYS1 when the information processing apparatus PDEV that has detected a failure of the physical lane PHLr notifies the information processing apparatus PDEV of the communication destination of the physical lane PHLr to be degraded (degradation request). With respect to the operation which is the same as or similar to FIG. 19, the detailed description thereof is omitted.

In FIG. 20, the information processing apparatus PDEV2 illustrated in FIG. 2 detects the number of BIP error exceeding the threshold and issues a degradation request of the physical lane PHLs to the information processing apparatus PDEV1. In other words, the information processing apparatus PDEV1 operates as a responder RES, and the information processing apparatus PDEV2 operates as a requester REQ. In addition, the information processing apparatus PDEV1 operates as a requester REQ, and the operation when the degradation request (DGRD_REQ) is issued to the information processing apparatus PDEV2 is realized by replacing the codes PDEV1, PDEV2 with each other.

The operation illustrated in FIG. 20 is started, for example, when the information processing apparatus PDEV2 detects a failure in the physical lanes PHLr2 and PHLr3. The detection of the failure in the physical lanes PHLr2 and PHLr3 is performed by step S206 illustrated in FIG. 11, step S314 illustrated in FIG. 12, and steps S414 and S418 illustrated in FIG. 13. The operation illustrated in FIG. 20 is similar to the operation illustrated in FIG. 19, excluding the command DGRD_PUSH.

In addition, also in FIG. 20, in the same manner as in FIG. 19, the information processing apparatus PDEV2 may perform the degradation process of stopping the use of the physical lanes PHLs2 and PHLs3 on the transmission side corresponding to the failure-detected physical lanes PHLr2 and PHLr3, after the elapse of the predetermined time T1. In this case, the information processing apparatus PDEV1 that has received the command DGRD_REQ performs the degradation process of stopping the use of the physical lanes PHLr2 and PHLr3 on the reception side corresponding to the physical lanes PHLs2 and PHLs3 for which use has been stopped. Then, the command DGRD_COMP is transmitted using physical lanes PHL0 and PHL1 excluding the degraded physical lanes PHL2 and PHL3.

Figure 21:
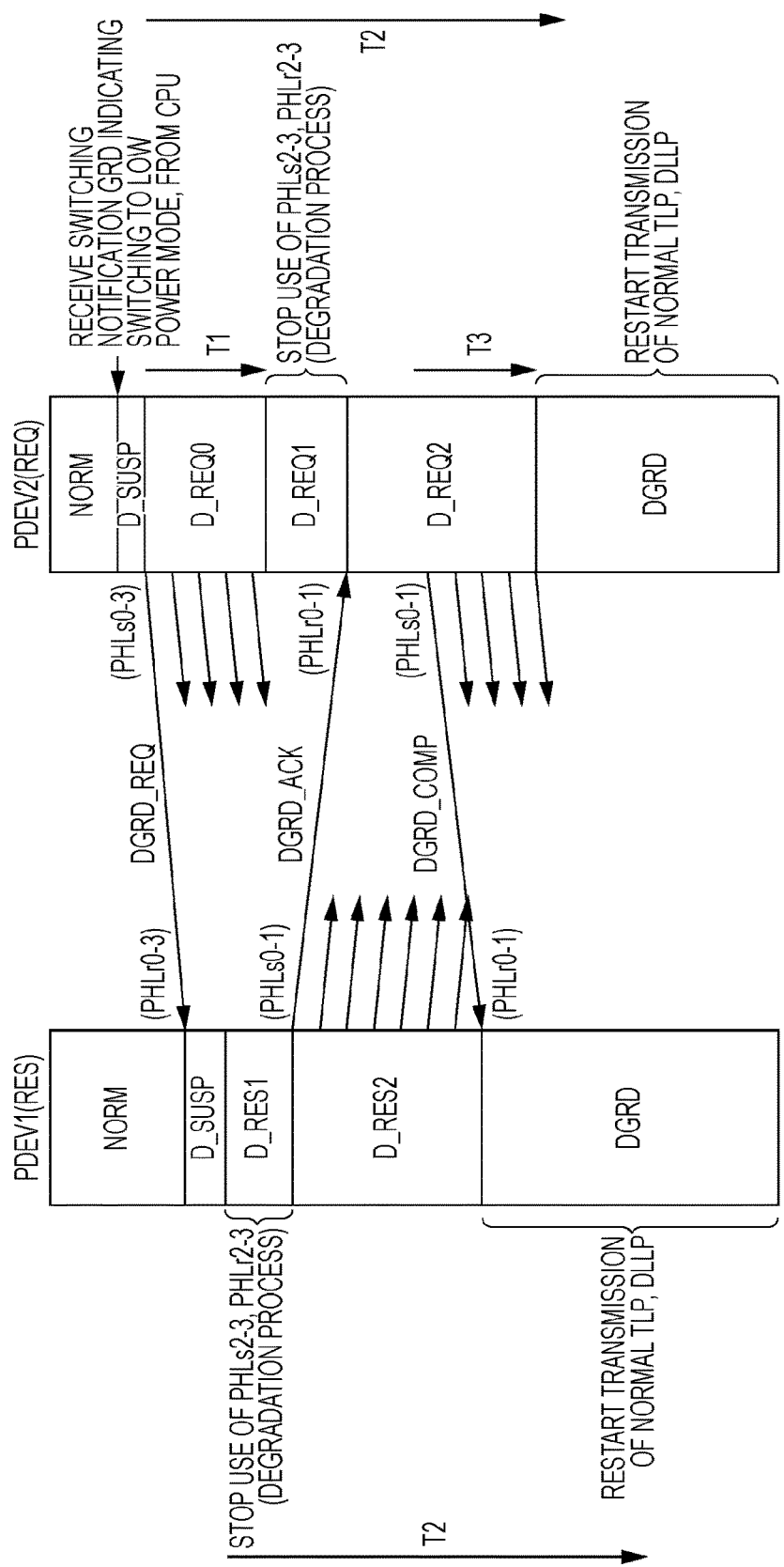
FIG. 21 is a diagram illustrating an example of an operation of the information processing system that causes a physical lane to be degraded based on reception of switching notification indicating switching to a low power mode.

FIG. 21 illustrates an example of the operation of the information processing system SYS1 that causes the physical lane PHL to be degraded, based on reception of a switching notification GRD indicating the switching to the low power mode. With respect to the operation which is the same as or similar to FIG. 19, the detailed description thereof is omitted.

In FIG. 21, the CPU of the information processing apparatus PDEV2 illustrated in FIG. 2 outputs the switching notification GRD. In other words, the information processing apparatus PDEV1 operates as a responder RES, and the information processing apparatus PDEV2 operates as a requester REQ. In addition, the information processing apparatus PDEV1 operates as a requester REQ, and the operation when the degradation request (DGRD_REQ) is issued to the information processing apparatus PDEV2 is realized by replacing the codes PDEV1, PDEV2 with each other. In this case, the CPU of the information processing apparatus PDEV1 outputs the switching notification GRD indicating the switching to the low power mode.

If the information processing apparatus PDEV2 receives the switching notification GRD indicating switching from the normal operation mode to the low power mode from the CPU, the operation illustrated in FIG. 21 is started. For example, the switching notification GRD contains information for stopping the use of the physical lanes PHLr2 and PHLr3 through which data is received from the information processing apparatus PDEV of a communication destination. The operation illustrated in FIG. 21 is performed by steps S606 to S610 illustrated in FIG. 16. The operation illustrated in FIG. 21 is similar to the operation obtained by excluding the command DGRD_PUSH from the operation illustrated in FIG. 19, except that the degradation of the physical lane PHL is performed based on the switching of the operation mode rather than a failure.

The information processing apparatus PDEV2 notifies the information processing apparatus PDEV1 of information indicating the physical lanes to be degraded PHLr2 and PHLr3 and PHLs2 and PHLs3, by using the command DGRD_REQ, based on the switching notification GRD. In addition, the information processing apparatus PDEV2 performs the degradation process of stopping the use of the physical lanes PHLr2 and PHLr3 and the physical lanes PHLs2 and PHLs3, based on the switching notification GRD. The information processing apparatus PDEV1 performs the degradation process of stopping the use of the physical lanes PHLr2 and PHLr3 and the physical lanes PHLs2 and PHLs3, based on the command DGRD_REQ. The command DGRD_COMP is transmitted using the physical lanes PHL0 and PHL1 excluding the degraded physical lanes PHL2 and PHL3.

In the example illustrated in FIG. 21, it is possible to perform the degradation of the physical lane PHL in both of a plurality of information processing apparatuses PDEV1, PDEV2 which are connected to each other through physical lanes PHL, based on the change of the operation mode of the information processing apparatus PDEV (switching to the low power mode). Thus, the physical lanes PHL to be degraded according to the change of the operation mode can be matched in the plurality of information processing apparatuses PDEV1, PDEV2. As a result, it is possible to suppress that the communication error occurs between the information processing apparatuses PDEV1, PDEV2 due to the mismatch of the physical lanes PHL to be degraded.

Figure 22:
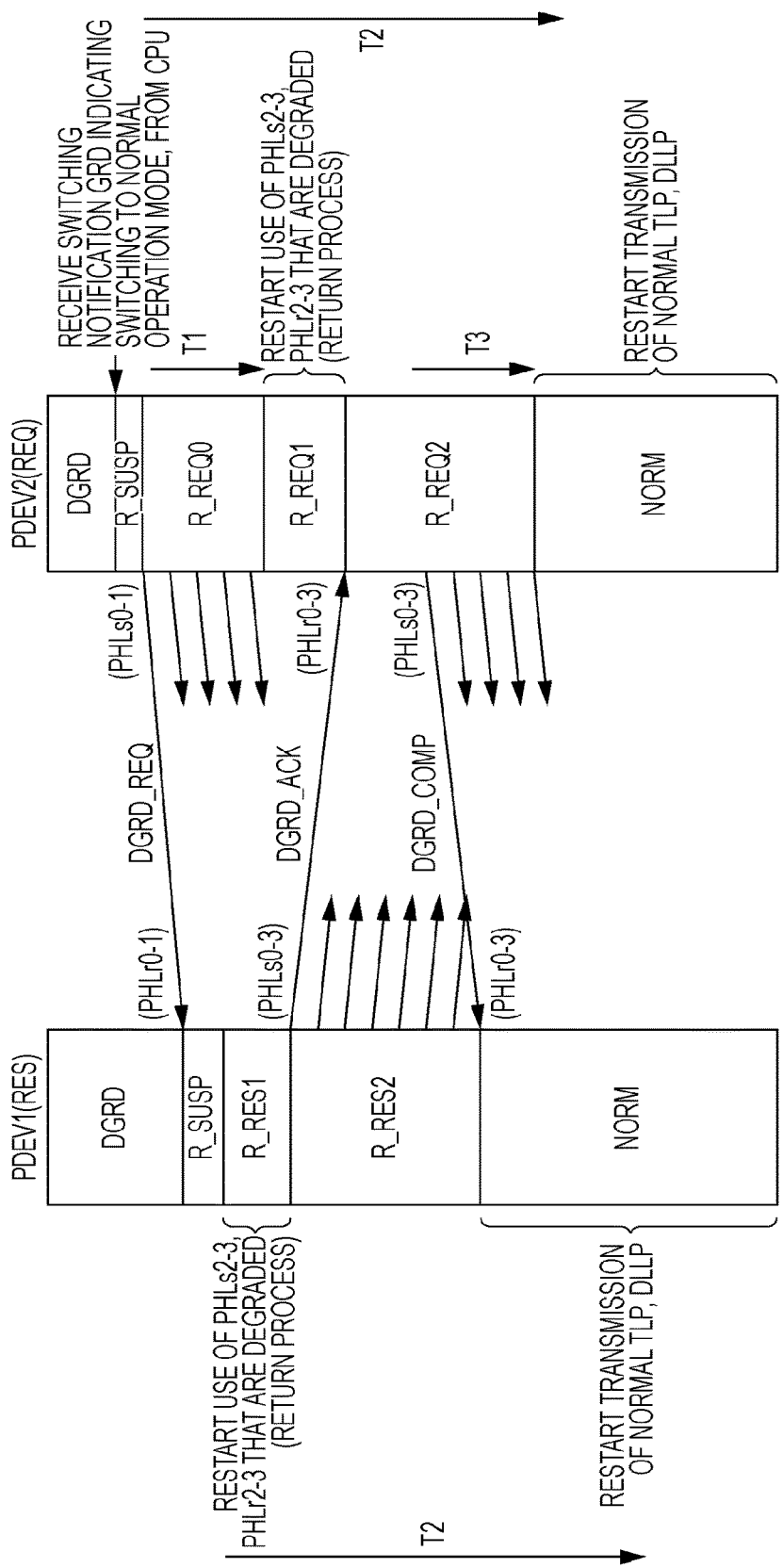
FIG. 22 is a diagram illustrating an example of an operation of the information processing system that releases the degradation of a physical lane based on reception of switching notification indicating switching to a normal operation mode.

FIG. 22 illustrates an example of an operation of the information processing system SYS1 that releases the degradation of a physical lane PHL based on the reception of the switching notification GRD indicating switching to a normal operation mode. With respect to the operation which is the same as or similar to FIG. 19, the detailed description thereof is omitted. Even in FIG. 22, an aspect of transmission and reception of each of the commands DGRD_REQ, DGRD_ACK, and DGRD_COMP between the information processing apparatuses PDEV1, PDEV2 is illustrated, and an aspect of transmission and reception of the alignment marker AM is omitted.

The information processing apparatus PDEV2 notifies the information processing apparatus PDEV1 of information indicating the physical lanes PHLr2 and PHLr3, and PHLs2 and PHLs3 for which degradation is to be released, by using the command DGRD_REQ, in the state R_REQ0, based on the switching notification GRD. The command DGRD_REQ indicating the physical lane PHL for which degradation is to be released is an example of the restoration request information causing another information processing apparatus PDEV to resume the use of the physical lane PHL for which use has been stopped. Further, the information processing apparatus PDEV2 performs the restoration process of resuming the use of the physical lanes PHLr2 and PHLr3, and PHLs2 and PHLs3, in the state R_REQ1, based on the switching notification GRD.

The information processing apparatus PDEV1 performs the restoration process of resuming the use of the physical lanes PHLr2 and PHLr3, and PHLs2 and PHLs3, in the state R_RES1, based on the command DGRD_REQ. In other words, it is possible to release the degradation of the physical lane PHL based on the switching notification GRD that is generated in the information processing apparatus PDEV2 in a plurality of information processing apparatuses PDEV1, PDEV2 which are connected to each other through the physical lanes PHL. Thus, the physical lanes PHL for which degradation is to be released according to the change of the operation mode can be matched in the plurality of information processing apparatuses PDEV1, PDEV2. As a result, it is possible to suppress that the communication error occurs between the information processing apparatuses PDEV1, PDEV2 due to the mismatch of the physical lanes PHL for which degradation is to be released.

The information processing apparatus PDEV1 outputs the command DGRD_ACK to the information processing apparatus PDEV1, in the state R_RES2, based on the resumption of the use of the physical lanes to be degraded PHLs2 and PHLs3, and PHLr2 and PHLr3. The information processing apparatus PDEV2 that has received the command DGRD_ACK outputs the command DGRD_COMP to the information processing apparatus PDEV1, based on the completion of the degradation restoration process, in the state R_REQ2.

In FIG. 22, the CPU of the information processing apparatus PDEV2 illustrated in FIG. 2 outputs the switching notification GRD. In other words, the information processing apparatus PDEV1 operates as the responder RES, and the information processing apparatus PDEV2 operates as the requester REQ. In addition, the operation performed in the case where the information processing apparatus PDEV1 operates as a requester REQ and issues a restoration request (DGRD_REQ) to the information processing apparatus PDEV2 is implemented by replacing the reference numerals PDEV1, PDEV2 with each other. In this case, the CPU of the information processing apparatus PDEV1 outputs the switching notification GRD indicating the switching to the normal operation mode.

The operation illustrated in FIG. 22 is started by the information processing apparatus PDEV2 receiving the switching notification GRD indicating the switching from the low power mode to the normal operation mode, from the CPU. For example, the switching notification GRD contains information for resuming the use of the physical lanes PHLr2 and PHLr3 which have been degraded. Therefore, the information processing apparatus PDEV2 performs the restoration process of resuming the use of the physical lanes which have been degraded PHLs2 and PHLs3, and PHLr2 and PHLr3, in the state R_REQ1. The information processing apparatus PDEV1 performs the restoration process of resuming the use of the physical lanes which have been degraded PHLs2 and PHLs3, and PHLr2 and PHLr3, in the state R_RES1.

The operation illustrated in FIG. 22 is performed in steps S612 to S616 illustrated in FIG. 16. The operation illustrated in FIG. 22 is the same as the operation obtained by excluding the command DGRD_PUSH from the operation illustrated in FIG. 19, except that the physical lane PHL to be used and the physical lane PHL for which use is to be stopped are different.

In addition, when the information processing apparatus PDEV2 stops the use of the physical lane PHLs based on the reception of the switching notification GRD in FIG. 21, the information processing apparatus PDEV2 may resume the use of the physical lane PHLs for which use has been stopped based on the switching notification GRD in FIG. 22. Further, in FIG. 21, it is assumed that the information processing apparatus PDEV2 stops both the physical lanes PHLr, PHLs based on the switching notification GRD. In this case, as illustrated in FIG. 22, the information processing apparatus PDEV2 resumes the uses of both the physical lanes PHLr, PHLs for which use has been stopped, based on the switching notification GRD.

Figure 23:
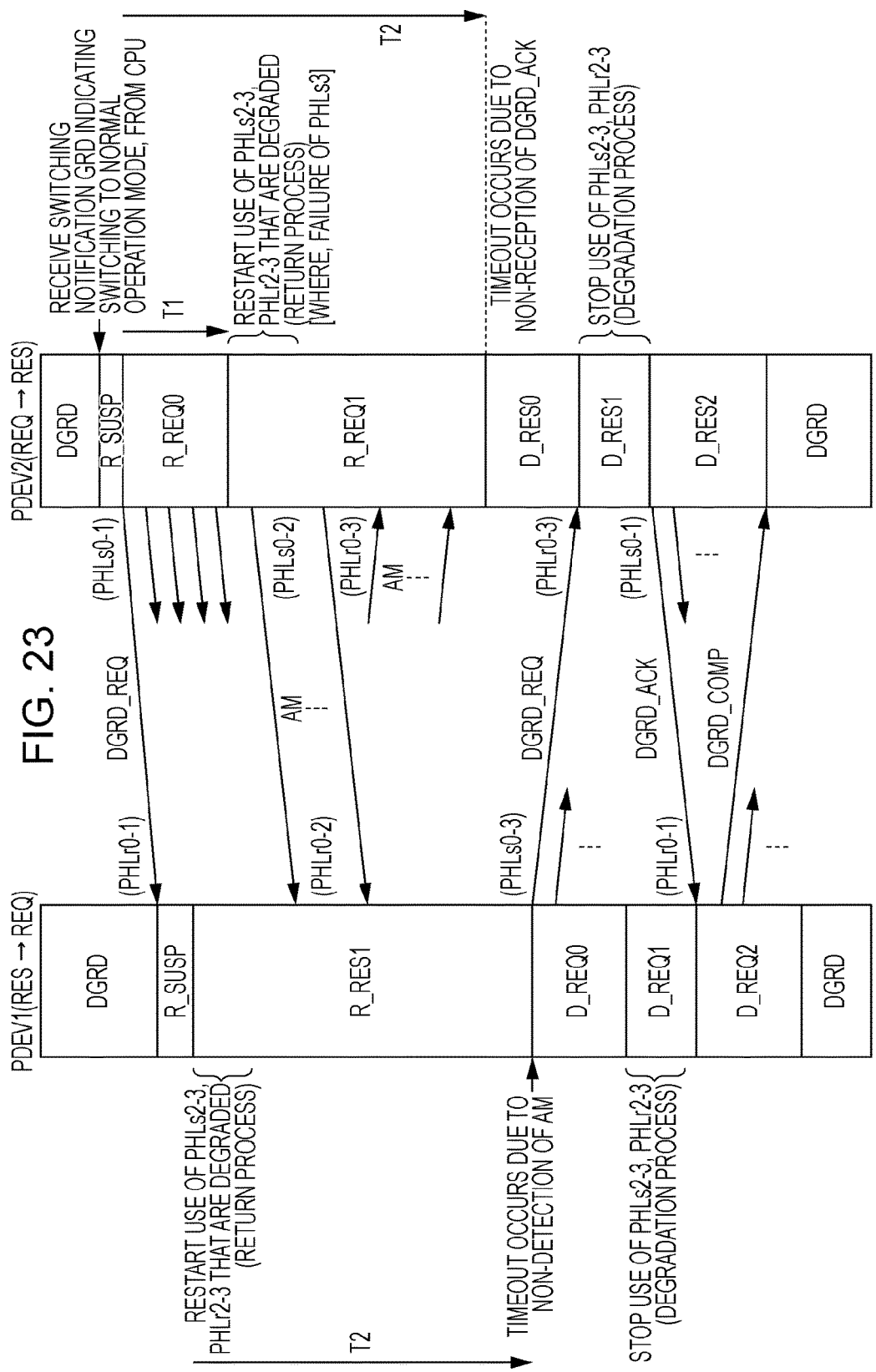
FIG. 23 is a diagram illustrating an example of an operation of the information processing system when a failure has been detected in a physical lane for which the degradation is to be released.

FIG. 23 illustrates an example of an operation of the information processing system SYS1 when a failure is detected in a physical lane PHL for which degradation is to be released. With respect to the operation which is the same as or similar to FIGS. 19 and 22, the detailed description thereof is omitted. In FIG. 23, in a state where a failure occurs in a physical lane PHL3 through data is transmitted from the information processing apparatus PDEV2 to the information processing apparatus PDEV1, a command DGRD_REQ to release the lane degradation is issued from the information processing apparatus PDEV2, similar to the FIG. 22. The physical lanes PHL0 to PHL3 through which data is transmitted from the information processing apparatus PDEV1 to the information processing apparatus PDEV2 has not failed.

The information processing apparatus PDEV1 that has received the command DGRD_REQ from the information processing apparatus PDEV2 performs the restoration process of resuming the use of the physical lanes which have been degraded PHLs2 and PHLs3, and PHLr2 and PHLr3, in the state R_RES1. Since the physical lane PHL3 through which data is transmitted from the information processing apparatus PDEV2 to the information processing apparatus PDEV1 has not failed, the information processing apparatus PDEV1 does not detect the alignment marker AM of the PCS lane corresponding to the physical lane PHLr3. Therefore, the information processing apparatus PDEV1 that has resumed the use of the physical lanes PHLs2 and PHLs3, and PHLr2 and PHLr3 maintains the state R_RES1, without transition to the state R_RES2 illustrated in FIG. 22.

In the information processing apparatus PDEV1, a predetermined time T2 has elapsed (timeout), and the occurrence of a failure is detected in the physical lane PHLr3 for which use is resumed, without detecting the alignment marker AM of the PCS lane corresponding to the physical lane PHLr3. Then, the state of the information processing apparatus PDEV1 transitions from the state R_RES1 to the state D_REQ0. In other words, the information processing apparatus PDEV1 that performs the restoration process starts the degradation process of returning the state to the original degradation state, based on the non-detection of the alignment marker AM. In this manner, since the occurrence of a failure is detected in the physical lane PHLr for which use is resumed, using the alignment marker AM that is periodically transmitted between the information processing apparatuses PDEV, it is possible to interrupt the restoration process and resume the degradation process.

Further, since the state does not transition the state R_RES2 illustrated in FIG. 22, the information processing apparatus PDEV1 does not transmit the command DGRD_ACK to the information processing apparatus PDEV2. Since the physical lanes PHL0 to PHL3 through which data is transmitted from the information processing apparatus PDEV1 to the information processing apparatus PDEV2 has not been failed, the information processing apparatus PDEV2 successfully detects the alignment markers AM of all of the valid PCS lanes PL. However, since a predetermined time T2 has elapsed (timeout) without receiving the command DGRD_ACK, the information processing apparatus PDEV2 transitions from the state R_REQ1 to the state D_RES0.

When timeout occurs, despite of the successful detection of the alignment marker AM, the information processing apparatus PDEV2 transitions to the state D_RES0, and can wait for the command DGRD_REQ from the information processing apparatus PDEV1. This allows the information processing system SYS1 to successfully perform the subsequent degradation process for returning the physical lane PHL to the original degradation state.

If the predetermined time T2 has elapsed while the alignment marker AM of the PCS lane corresponding to the physical lane PHLr3 is not detected (timeout), the information processing apparatus PDEV1 transitions from the state R_RES1 to the state D_REQ0. Then, the information processing apparatus PDEV1 is switched from the responder RES to the requester REQ, and outputs a command DGRD_REQ to demand for degradation of the physical lane PHL to the information processing apparatus PDEV1. The command DGRD_REQ to stop the use of the physical lane PHL for which use has been resumed is an example of the degradation request information. The information processing apparatus PDEV2 is switched from the requester REQ to the responder RES, and receives the command DGRD_REQ in the state D_RES0.

Thereafter, similar to FIG. 21, the information processing apparatus PDEV2 performs the degradation process of stopping the use of the physical lanes PHLs2 and PHLs3, and PHLr2 and PHLr3 in the state D_RES1, and returns to the degradation state DGRD. The information processing apparatus PDEV1 performs the degradation process of stopping the use of the physical lanes PHLs2 and PHLs3, and PHLr2 and PHLr3 in the state D_REQ1, and returns to the degradation state DGRD.

In this manner, the information processing apparatus PDEV1 that does not detect the alignment marker AM, even when the predetermined time T2 has elapsed, transmits the degradation instruction to stop the use of the physical lanes PHLs2 and PHLs3, and PHLr2 and PHLr3 to the information processing apparatus PDEV2. The information processing apparatus PDEV2 that has received the degradation instruction from the information processing apparatus PDEV1 performs the degradation process of stopping the use of the physical lane PHL for which the use has been resumed. Thus, the degradation process of stopping the use of the physical lane PHL for which the use has been resumed can be performed in both the information processing apparatuses PDEV1, PDEV2, and the degradation state of the physical lane PHL can be matched in both the information processing apparatuses PDEV1, PDEV2. As a result, it is possible to cause the information processing system SYS1 to operate normally.

In addition, when a failure of the physical lane PHL is detected during the restoration process, and the physical lane PHL is to be returned to the original degradation state, it is preferable that the command DGRD_REQ is transmitted using the physical lane PHL which has not failed, between the information processing apparatuses PDEV1, PDEV2. Therefore, the information processing apparatus PDEV1 that has detected a failure of the physical lane PHLr3 on the reception side transitions to a requester REQ that issues the command DGRD_REQ, and the information processing apparatus PDEV2 transitions to the responder RES. Even when a failure of the physical lane PHL is detected during the lane degradation restoration process, it is possible to return the physical lane PHL to the original degradation state, by replacing the requester REQ and the responder RES.

Figure 24:
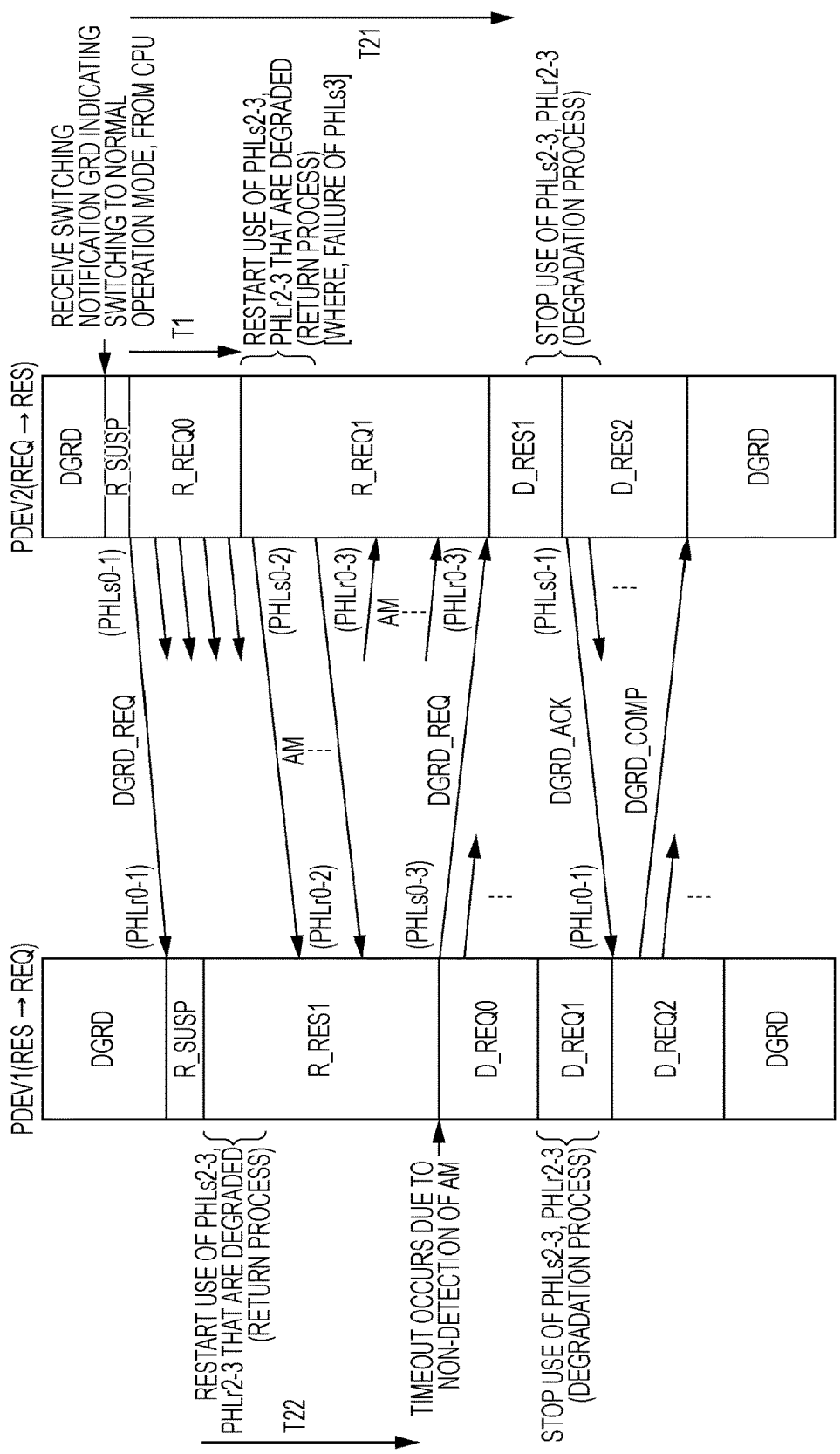
FIG. 24 is a diagram illustrating another example of an operation of the information processing system when a failure has been detected in a physical lane for which the degradation is to be released.

FIG. 24 illustrates an example of an operation of the information processing system SYS1 when a failure is detected in a physical lane PHL for which degradation is to be released. With respect to the operation which is the same as or similar to FIGS. 19, 22 and 23, the detailed description thereof is omitted. In FIG. 24, in a state where a failure occurs in a physical lane PHL3 through data is transmitted from the information processing apparatus PDEV2 to the information processing apparatus PDEV1, a command DGRD_REQ to release the lane degradation is issued from the information processing apparatus PDEV2, similar to the FIG. 22. Similar to FIG. 23, the physical lanes PHL0 to PHL3 through which data is transmitted from the information processing apparatus PDEV1 to the information processing apparatus PDEV2 have not failed. The operation until the information processing apparatus PDEV1 transitions to the state R_RES1 and the operation until the information processing apparatus PDEV2 transitions to the state R_REQ1 are the same as in FIG. 23.

In FIG. 24, a predetermined time T22 that the timer TM2 of the information processing apparatus PDEV1 measures based on the transition to the state R_RES1 is shorter as compared to a predetermined time T21 that the timer TM2 of the information processing apparatus PDEV2 measures based on the transition to the state R_REQ0. Therefore, the information processing apparatus PDEV1 detects the timeout caused by non-detection of the alignment marker AM due to a failure of the physical lane PHL3 before the timeout due to the predetermined time T21 of the information processing apparatus PDEV2 occurs. Thereafter, similar to FIG. 23, the information processing apparatus PDEV1 transitions to the state D_REQ0, and outputs the command DGRD_REQ to release the lane degradation to the information processing apparatus PDEV2. The operation of the information processing apparatus PDEV1 after this is the same as in FIG. 23.

Meanwhile, since the command DGRD_REQ to release lane degradation is received in the state R_REQ1, the information processing apparatus PDEV2 does not transition to the state D_RES0 in which the reception of the command DGRD_REQ is waited, but rather transitions to the state D_RES1. When the command DGRD_REQ is received in the state R_REQ1, the information processing apparatus PDEV2 transitions to the state D_RES1 without passing through the state D_RES0, such that the information processing system SYS1 can successfully perform the following process for returning the physical lane PHL to the original degradation state. The operation of the information processing apparatus PDEV2 after this is the same as in FIG. 23.

Figure 25:
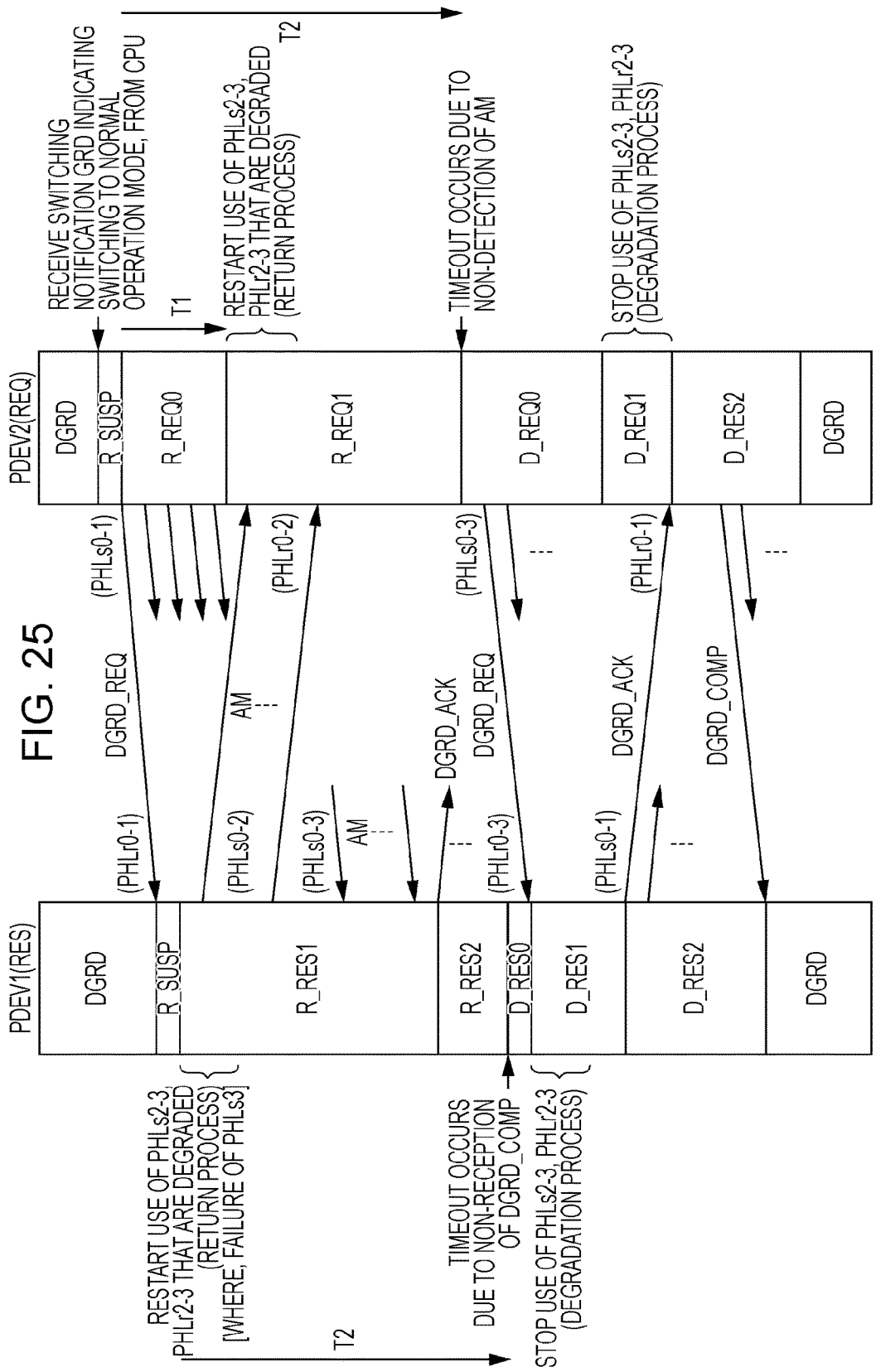
FIG. 25 is a diagram illustrating still another example of an operation of the information processing system when a failure has been detected in a physical lane for which the degradation is to be released.

FIG. 25 illustrates still another example of an operation of the information processing system SYS1 when a failure is detected in a physical lane PHL for which degradation is to be released. With respect to the operation which is the same as or similar to FIGS. 19, 22, and 23, the detailed description thereof is omitted. In FIG. 25, in a state where a failure occurs in a physical lane PHL3 through data is transmitted from the information processing apparatus PDEV1 to the information processing apparatus PDEV2, a command DGRD_REQ to release the lane degradation is issued from the information processing apparatus PDEV2, similar to the FIG. 22. The physical lanes PHL0 to PHL3 through which data is transmitted from the information processing apparatus PDEV2 to the information processing apparatus PDEV1 have not failed. The operation until the information processing apparatus PDEV1 transitions to the state R_RES1 and the operation until the information processing apparatus PDEV2 transitions to the state R_REQ1 are the same as in FIG. 23.

The information processing apparatus PDEV1 performs a restoration process of resuming the uses of the physical lanes PHLs2 and PHLs3, and PHLr2 and PHLr3 which have been degraded, based on a reception of the command DGRD_REQ to instruct the release of the lane degradation, after transition to the state R_RES1. The information processing apparatus PDEV1 successfully detects the alignment markers AM of all of the valid PCS lanes PL before the predetermined time T2 has elapsed, and transitions to the state R_RES2.

The information processing apparatus PDEV2 performs a restoration process of resuming the uses of the physical lanes PHLs2 and PHLs3, and PHLr2 and PHLr3 which have been degraded, based on a reception of the command DGRD_REQ to instruct the release of the lane degradation, after transition to the state R_REQ1. The information processing apparatus PDEV2 waits for the reception of the command DGRD_ACK indicating the completion of the release of the lane degradation from the information processing apparatus PDEV1. Here, since the physical lane PHL3 through data is transmitted from the information processing apparatus PDEV1 to the information processing apparatus PDEV2 has failed, the information processing apparatus PDEV2 does not detect the alignment marker AM of the PCS lane corresponding to the physical lane PHLr3.

Then, the information processing apparatus PDEV2 generates timeout due to non-detection of the alignment marker AM, and transitions to the state D_REQ0. In addition, even when the command DGRD_ACK indicating the completion of the release of the lane degradation is received, the information processing apparatus PDEV2 transitions to the state D_REQ0 based on the occurrence of timeout due to non-detection of the alignment marker AM. The information processing apparatus PDEV2 that has gone to the state D_REQ0 outputs a command DGRD_REQ to demand for degradation of the physical lane PHL in the state D_REQ0 in order to return the physical lane PHL to the original degradation state, and then transitions to the state D_REQ1.

Meanwhile, the information processing apparatus PDEV1 that has gone to the state R_RES2 transmits the command DGRD_ACK indicating the completion of the release of the lane degradation, and waits for the reception of the command DGRD_COMP indicating the completion of the release of the lane degradation from the information processing apparatus PDEV2. However, the information processing apparatus PDEV2 transitions to the state D_REQ0 due to timeout, and does not transmit the command DGRD_COMP indicating the completion of the release of the lane degradation. Therefore, the information processing apparatus PDEV1 generates timeout due to non-reception of the command DGRD_COMP, and transitions to the state D_RES0. Due to the transition to the state D_RES0, the information processing apparatus PDEV1 can wait for the command DGRD_REQ to demand for degradation of the physical lane PHL from the information processing apparatus PDEV2.

The information processing apparatus PDEV1 that has gone to the state D_RES0 transitions to the state D_RES1 based on the reception of the command DGRD_REQ to demand for degradation of the physical lane PHL. Then, the information processing apparatus PDEV1 transitions to the state D_RES2 after the execution of the degradation process of stopping the use of the physical lanes PHLs2 and PHLs3, and PHLr2 and PHLr3 for which use has been resumed, and outputs the command DGRD_ACK indicating the completion of the degradation process.

The information processing apparatus PDEV2 transitions to the state D_REQ2, based on the reception of the command DGRD_ACK in the state D_REQ1. Then, the information processing apparatus PDEV2 outputs the command DGRD_COMP indicating the completion of the degradation process of stopping the use of the physical lanes PHLs2 and PHLs3, and PHLr2 and PHLr3, and returns to the degradation state DGRD. The information processing apparatus PDEV1 returns to the degradation state DGRD based on the reception of the command DGRD_COMP.

Here, similar to FIG. 23, since the command DGRD_REQ to demand for the lane degradation is transmitted using the physical lane PHL which has not failed, the information processing apparatus PDEV2 that has detected a failure of the physical lane PHLr3 on the reception side is maintained to the requester REQ, and the information processing apparatus PDEV1 is maintained to the responder RES. Thus, even when a failure of the physical lane PHL is detected during the lane degradation restoration process, it is possible to return the physical lane PHL to the original degradation state.

Figure 26:
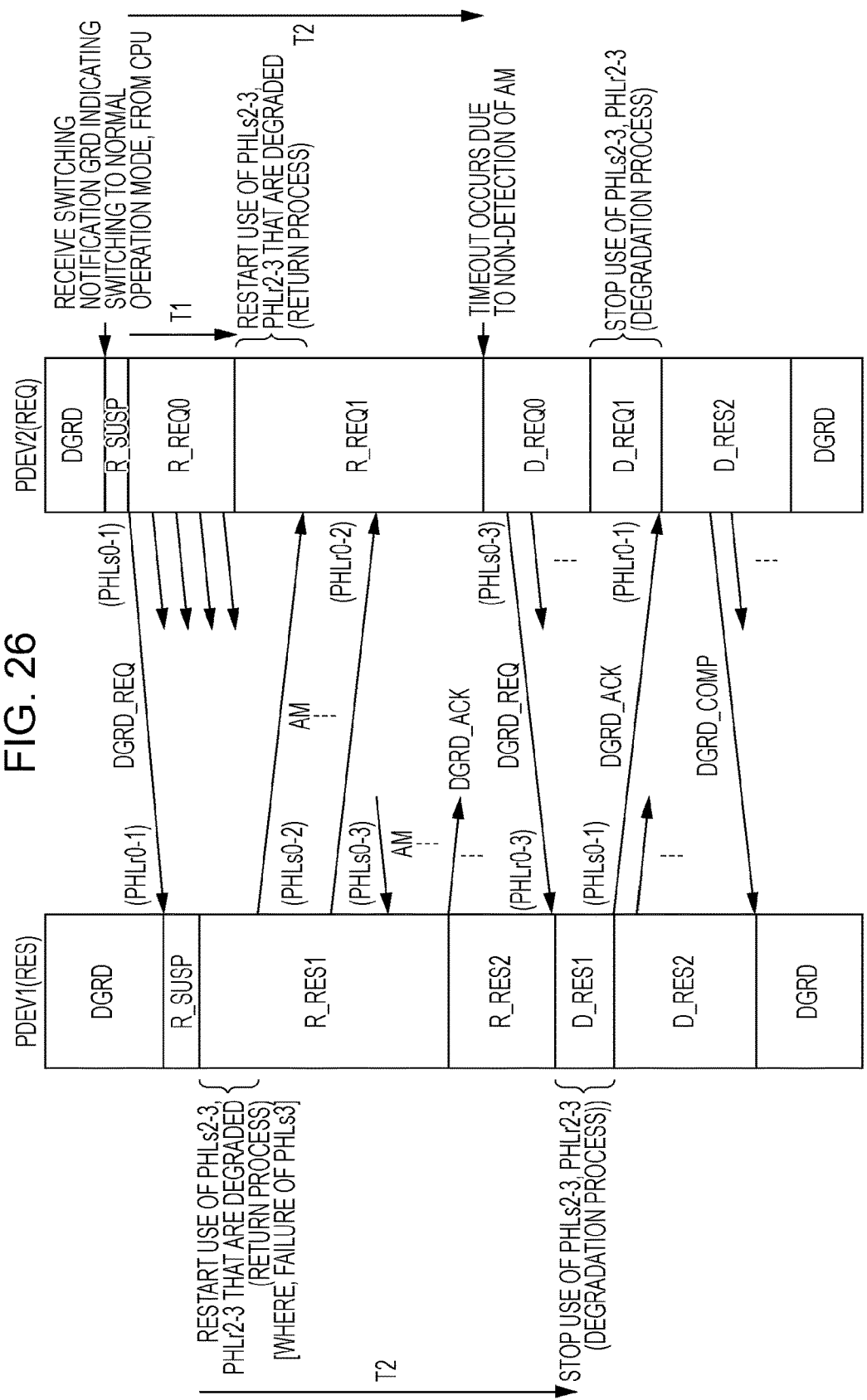
FIG. 26 is a diagram illustrating still another example of an operation of the information processing system when a failure has been detected in a physical lane for which the degradation is to be released.

FIG. 26 illustrates still another example of an operation of the information processing system SYS1 when a failure is detected in a physical lane PHL for which degradation is to be released. With respect to the operation which is the same as or similar to FIGS. 19, 22, 23, and 25, the detailed description thereof is omitted. In FIG. 26, in a state where a failure occurs in a physical lane PHL3 through data is transmitted from the information processing apparatus PDEV1 to the information processing apparatus PDEV2 similar to FIG. 25, a command DGRD_REQ to release the lane degradation is issued from the information processing apparatus PDEV2, similar to the FIG. 22. The physical lanes PHL0 to PHL3 through which data is transmitted from the information processing apparatus PDEV2 to the information processing apparatus PDEV1 have not failed. The operation of the information processing apparatus PDEV2 and the operation until the information processing apparatus PDEV1 transitions to the state R_RES2 are the same as in FIG. 25.

In FIG. 26, the information processing apparatus PDEV1 receives the command DGRD_REQ to release the lane degradation of the physical lane PHL before the predetermined time T2 has elapsed in the state R_RES2, and transitions to the state D_RES1. The operation of the information processing apparatus PDEV1 after this is the same as in FIG. 26.

Here, since the command DGRD_REQ to demand lane degradation is received from the information processing apparatus PDEV2 in the state R_RES2, the information processing apparatus PDEV1 does not transition to the state D_RES0 in which the reception of the command DGRD_REQ is waited for, but rather transitions to the state D_RES1. When the command DGRD_REQ is received in the state R_RES2, since the information processing apparatus PDEV1 transitions to the state D_RES1 without passing through the state D_RES0, the information processing system SYS1 can successfully perform the following process for returning the physical lane PHL to the original degradation state.

Even in FIG. 26, similar to FIG. 25, since the command DGRD_REQ to demand for the lane degradation is transmitted using the physical lane PHL which has not failed, the information processing apparatus PDEV2 that has detected a failure of the physical lane PHLr3 on the reception side is maintained to the requester REQ, and the information processing apparatus PDEV1 is maintained to the responder RES. Thus, even when a failure of the physical lane PHL is detected during the lane degradation restoration process, it is possible to return the physical lane PHL to the original degradation state.

Figure 27:
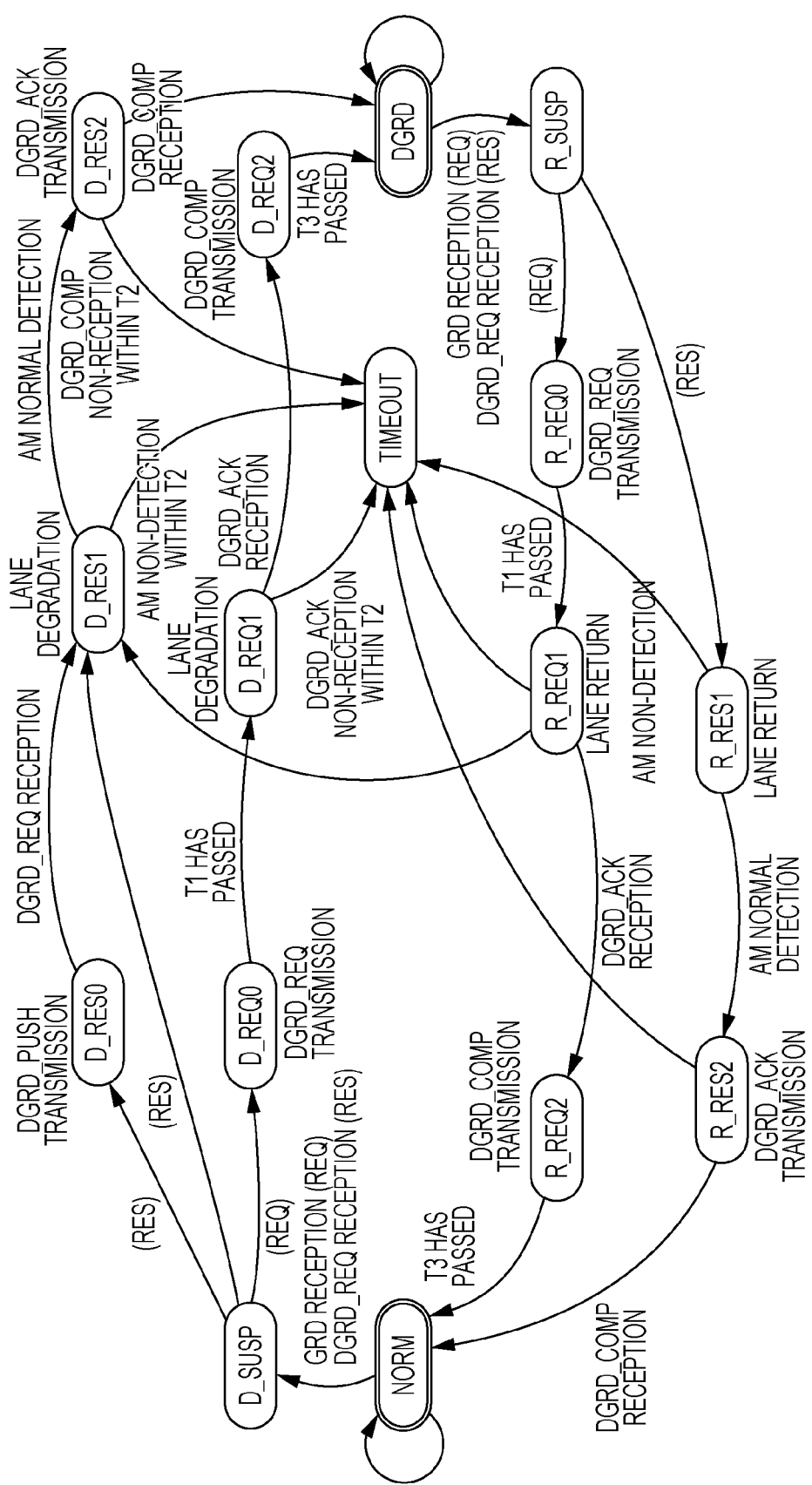
FIG. 27 is a diagram illustrating an example of a state machine when a failure is not considered in a physical lane for which the degradation is to be released.

FIG. 27 illustrates an example of a state machine SM when a failure is not considered in a physical lane PHL for which degradation is to be released. When a failure is not considered in the physical lane PHL for which degradation is to be released, if timeout occurs in the states R_REQ1, R_RES1, and R_RES2, the information processing system SYS1 illustrated in FIG. 2 performs the timeout process. Thus, the information processing system SYS1 stops the communication using the physical lane PHL, and notifies the higher device of the occurrence of a communication error. In other words, the link between the information processing apparatuses PDEV1, PDEV2 is disconnected and the communication is stopped. In contrast, in FIG. 7, the state machine SM transitions from the states R_REQ1, R_RES1, and R_RES2 to any one of the states D_RES0, D_RES1, and D_REQ0 in order to perform the degradation process of returning the physical lane PHL to the original degradation state.

As described above, even in the embodiments illustrated in FIGS. 2 to 26, it is possible to achieve the same effects as in the embodiment illustrated in FIG. 1. In other words, when a failure occurs in the physical lane PHL for which use has been stopped due to degradation, even if the restoration of the physical lane PHL is instructed, the degradation state of the physical lane PHL is maintained. Thus, it is possible to suppress the use of the failed physical lane PHL based on the restoration request, and it is possible to suppress that the communication between the information processing apparatuses PDEV1 and PDEV2 is interrupted. As a result, it is possible to suppress that the reliability of the information processing system SYS1 is decreased.

Further, in the embodiments illustrated in FIGS. 2 to 26, when the switching notification GRD of changing the operation mode in one of the information processing apparatuses PDEV1, PDEV2 is generated, the change of the operation mode also in the other of the information processing apparatuses PDEV1, PDEV2 is instructed. Thus, the degradation process or the restoration process of the physical lane PHL can be performed in both information processing apparatuses PDEV1, PDEV2, and the physical lanes PHL to be degraded or restored according to the change of the operation mode can be matched in the information processing apparatuses PDEV1, PDEV2. As a result, it is possible to suppress that the communication error occurs between the information processing apparatuses PDEV1, PDEV2 due to the mismatch of the physical lanes PHL to be degraded.

Since the occurrence of a failure is detected in the physical lane PHLr for which use is resumed, using the alignment marker AM that is control information to be periodically transmitted between the information processing apparatuses PDEV1, PDEV2, it is possible to interrupt the restoration process and resume the degradation process. At this time, since the information processing apparatus PDEV that has detected the failure of the physical lane PHL operates as the requester REQ that issues the restoration request information (command DGRD_REQ), a degradation process for returning the physical lane PHL to the original degradation state can be normally performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
one or more processors coupled to the memory, the one or more processors being configured to:
receive data from another information processing apparatus through a plurality of first lanes,
detect a failure of the plurality of first lanes,
perform a first degradation process of stopping use of any one of the plurality of first lanes, based on a degradation request,
start, based on a restoration request, a restoration process of resuming use of a first lane for which use has been stopped and transmitting restoration request information to the other information processing apparatus repeatedly for a first predetermined time period,
perform a second degradation process of stopping use of a first lane for which use has been resumed, when a failure of the first lane for which use has been resumed is detected during performance of the restoration process, by not detecting control information, transmitted from the other information processing apparatus through each of the plurality of first lanes at a transmission interval, within a second predetermined time period longer than the transmission interval, or after a degradation request from the other information processing apparatus is received, and
transmit degradation request information for stopping use of the first lane for which use has been resumed to the other information processing apparatus through a plurality of second lanes, when the second degradation process is performed based on detection of the failure.

2. The information processing apparatus according to claim 1, wherein the one or more processors are configured to stop use of the first lane for which use has been resumed, when the degradation request information for stopping use of the first lane for which use has been resumed is received from the other information processing apparatus.

3. The information processing apparatus according to claim 1,
wherein the degradation request and the restoration request are output from the one or more processors based on a change of an operation mode of the information processing apparatus between a normal operation mode and a low power mode, and
wherein the one or more processors are configured to transmit degradation request information for causing the other information processing apparatus to perform the first degradation process to the other information processing apparatus, when the degradation request is received.

4. The information processing apparatus according to claim 3, wherein the one or more processors are configured to transmit restoration request information for causing the other information processing apparatus to perform a restoration process of resuming use of a lane for which use has been stopped, to the other information processing apparatus, when the restoration request is received.

5. The information processing apparatus according to claim 1, wherein the one or more processors are configured to start measurement of time based on the restoration request, stop the measurement based on detection of the control information, and determine that time is out when the predetermined time has elapsed from the start of the measurement while the control information is not detected, and determines occurrence of the failure based on the determination of timeout.

6. An information processing system, comprising:
a first information processing apparatus; and
a second information processing apparatus configured to transmit data to and receive data from the first information processing apparatus through a plurality of first lanes, the second information processing apparatus including a memory and one or more processors coupled to the memory, detect a failure of the plurality of first lanes, perform a first degradation process of stopping use of any one of the plurality of first lanes, based on a degradation request, start, based on a restoration request, a restoration process of resuming use of a first lane for which use has been stopped, and transmitting restoration request information to the other information processing apparatus repeatedly for a first predetermined time period, perform a second degradation process of stopping use of a first lane for which use has been resumed, when a failure of the first lane for which use has been resumed is detected during performance of the restoration process, by not detecting control information, transmitted from the other information processing apparatus through each of the plurality of first lanes at a transmission interval, within a second predetermined time period longer than the transmission interval, or after a degradation request from the other information processing apparatus is received, and transmit degradation request information for stopping use of the first lane for which use has been resumed to the first information processing apparatus through a plurality of second lanes, when the second degradation process is performed based on detection of the failure.

7. A communication device that is provided in an information processing apparatus that is configured to receive data from another information processing apparatus through a plurality of first lanes and to output the received data, the communication device comprising:

a memory; and one or more processors coupled to the memory, the one or more processors being configured to:

detect a failure of the plurality of first lanes, perform a first degradation process of stopping use of any one of the plurality of first lanes, based on a degradation request, start, based on a restoration request, a restoration process of resuming use of a first lane for which use has been stopped, and transmitting restoration request information to the other information processing apparatus repeatedly for a first predetermined time period, perform a second degradation process of stopping use of a first lane for which use has been resumed, when a failure of the first lane for which use has been resumed is detected during performance of the restoration process, by not detecting control information, transmitted from the other information processing apparatus through each of the plurality of first lanes at a transmission interval, within a second predetermined time period longer than the transmission interval, or after a degradation request from the other information processing apparatus is received, and transmit degradation request information for stopping use of the first lane for which use has been resumed to the other information processing apparatus through a plurality of second lanes, when the second degradation process is performed based on detection of the failure.

* * * * *